(12) United States Patent
Jung et al.

(10) Patent No.: US 10,187,945 B2
(45) Date of Patent: Jan. 22, 2019

(54) LED DRIVE CIRCUIT WITH IMPROVED FLICKER PERFORMANCE, AND LED LIGHTING DEVICE COMPRISING SAME

(71) Applicant: Seoul Semiconductor Co., Ltd., Ansan-si (KR)

(72) Inventors: Young Do Jung, Ansan-si (KR); Sung Ho Jin, Ansan-si (KR); Sang Wook Han, Ansan-si (KR); Hye Man Jung, Ansan-si (KR)

(73) Assignee: Seoul Semiconductor Co., Ltd., Ansan-si (KR)

( * ) Notice: Subject to any disclaimer, the term of this patent is extended or adjusted under 35 U.S.C. 154(b) by 0 days.

(21) Appl. No.: 15/322,005

(22) PCT Filed: Dec. 1, 2015

(86) PCT No.: PCT/KR2015/012958
§ 371 (c)(1),
(2) Date: Dec. 23, 2016

(87) PCT Pub. No.: WO2016/093534
PCT Pub. Date: Jun. 16, 2016

(65) Prior Publication Data
US 2017/0135171 A1    May 11, 2017

(30) Foreign Application Priority Data

Dec. 12, 2014  (KR) .......................... 10-2014-0179485
Dec. 18, 2014  (KR) .......................... 10-2014-0183283
(Continued)

(51) Int. Cl.
*H05B 33/08* (2006.01)
*F21S 2/00* (2016.01)
*H05B 37/02* (2006.01)

(52) U.S. Cl.
CPC ............ *H05B 33/0845* (2013.01); *F21S 2/00* (2013.01); *H05B 33/08* (2013.01); *H05B 33/083* (2013.01);
(Continued)

(58) Field of Classification Search
CPC .. F21S 2/00; G09G 3/32; G09G 3/342; G09G 3/3696; H05B 33/08; H05B 33/0809;
(Continued)

(56) References Cited

U.S. PATENT DOCUMENTS 8,742,682 B1   6/2014  Wang et al.
9,247,599 B2   1/2016  Lee
(Continued)

FOREIGN PATENT DOCUMENTS

CN        205336575       6/2016
KR   10-2013-0069516      6/2013
(Continued)

OTHER PUBLICATIONS

International Search Report dated Mar. 23, 2016, in International Application No. PCT/KR2015/012958.
(Continued)

*Primary Examiner* — Seokjin Kim
(74) *Attorney, Agent, or Firm* — H.C. Park & Associates, PLC

(57) ABSTRACT

An alternating current sequential drive type LED lighting device having improved flicker performance and being capable of reducing the light output deviation of the LED lighting device generated during operation intervals by removing nonluminous intervals of the LED lighting device by means of a loop-back compensation unit.

18 Claims, 41 Drawing Sheets

(30) Foreign Application Priority Data

Aug. 27, 2015 (KR) .................. 10-2015-0121219
Nov. 18, 2015 (KR) .................. 10-2015-0161890

(52) U.S. Cl.
CPC ..... *H05B 33/0809* (2013.01); *H05B 33/0815* (2013.01); *H05B 33/0848* (2013.01); *H05B 37/02* (2013.01)

(58) Field of Classification Search
CPC ............ H05B 33/0812; H05B 33/0815; H05B 33/0818; H05B 33/0824; H05B 33/0827; H05B 33/083; H05B 33/0842; H05B 33/0845; H05B 33/0848; H05B 33/0851; H05B 33/0884; H05B 33/0887; H05B 33/089; H05B 37/02; H05B 37/0227; H05B 37/0281; H05B 37/39
See application file for complete search history.

(56) References Cited

U.S. PATENT DOCUMENTS

| | | | |
|---|---|---|---|
| 2011/0227489 A1 | 9/2011 | Huynh | |
| 2013/0026924 A1* | 1/2013 | Jong | H05B 33/0818 315/113 |
| 2013/0313984 A1 | 11/2013 | Maiwald | |
| 2014/0015441 A1 | 1/2014 | Radermacher | |
| 2014/0042925 A1* | 2/2014 | Wang | H05B 33/083 315/232 |
| 2015/0181659 A1 | 6/2015 | Kang et al. | |
| 2015/0216003 A1* | 7/2015 | Chien | H05B 33/0845 315/201 |
| 2016/0183340 A1* | 6/2016 | Lee | H05B 33/0809 315/186 |

FOREIGN PATENT DOCUMENTS

| | | |
|---|---|---|
| WO | 2012137103 | 10/2012 |
| WO | 2012/153947 | 11/2012 |
| WO | 2013/089506 | 6/2013 |
| WO | 2014/185585 | 11/2014 |
| WO | 2014/189298 | 11/2014 |

OTHER PUBLICATIONS

Written Opinion dated Mar. 23, 2016, in International Application No. PCT/KR2015/012958.
Non-Final Office Action dated Jan. 24, 2018 in U.S. Appl. No. 15/475,003.
Extended European Search Report dated Jul. 16, 2018, issued in European Patent Application No. 15868277.8.
Final Office Action dated Sep. 11, 2018, issued in U.S. Appl. No. 15/475,003.

* cited by examiner

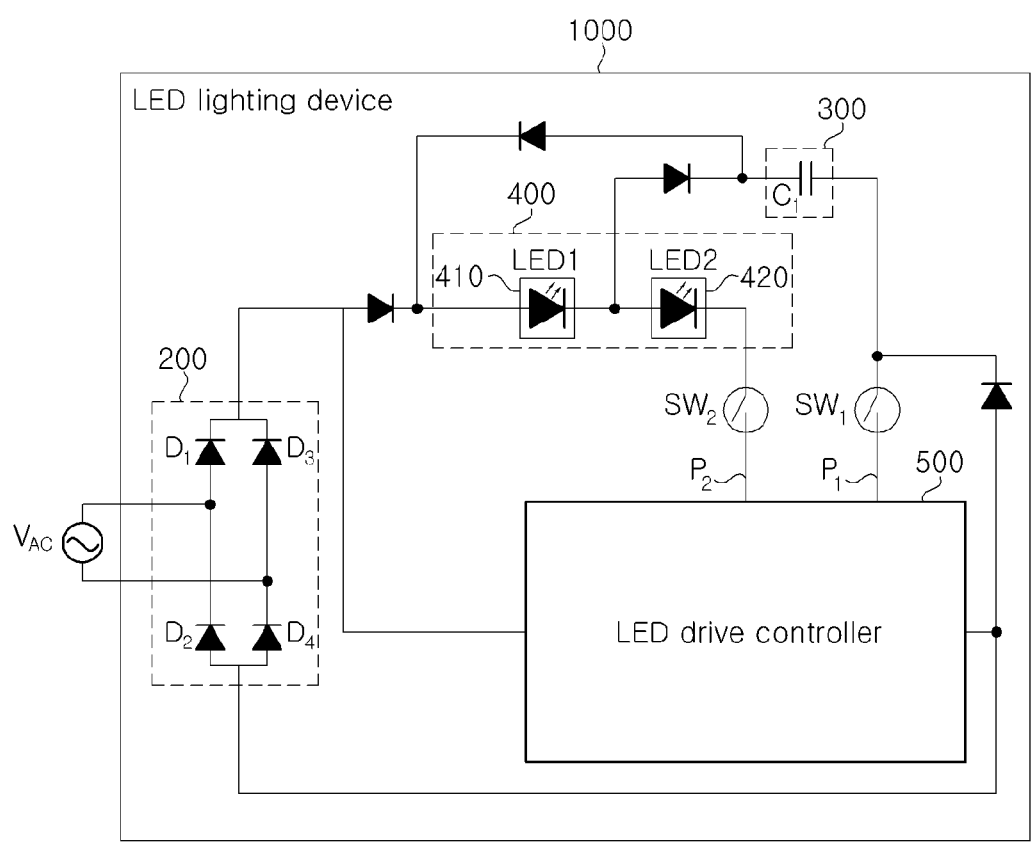

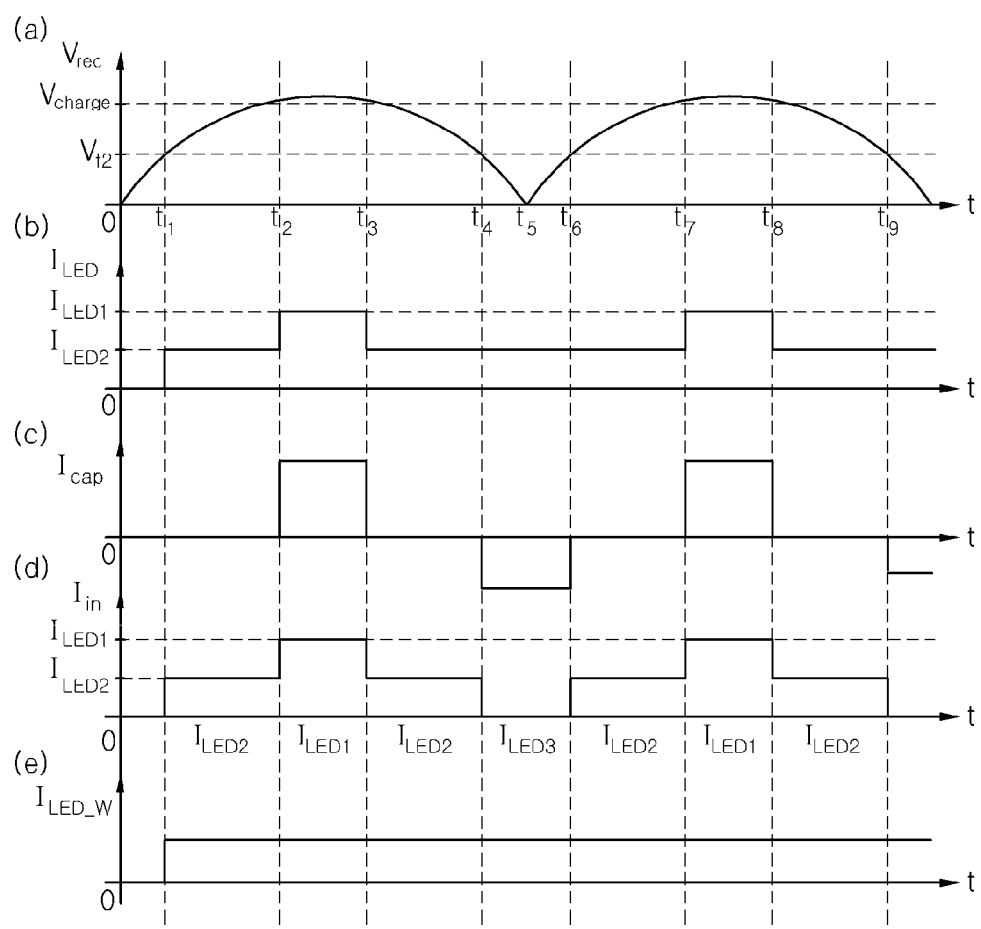

LED DRIVE CIRCUIT WITH IMPROVED FLICKER PERFORMANCE, AND LED LIGHTING DEVICE COMPRISING SAME

CROSS REFERENCE TO RELATED APPLICATIONS

This application is the National Stage Entry of International Application PCT/KR2015/012958, filed on Dec. 1, 2015, and claims priority from KR 10-2014-0179485, filed on Dec. 12, 2014, KR 10-2014-0183283, filed on Dec. 18, 2014, KR 10-2015-0121219, filed Aug. 27, 2015, and KR 10-2015-0161890, filed Nov. 18, 2015, each of which is incorporated herein by references for all purposes as if fully set forth herein.

BACKGROUND

Field

Exemplary embodiments of the disclosure relate to a light emitting diode (LED) drive circuit with improved flicker performance and an LED lighting device including the same. More particularly, exemplary embodiments of the present disclosure relate to a light emitting diode (LED) drive circuit with improved flicker performance, which can reduce deviation in light output during operation intervals of a sequential driving type alternating current (AC) LED lighting device by removing non-luminous intervals of LEDs, and an LED lighting device including the same.

Discussion of the Background

LEDs are generally driven by direct current (DC). DC driving requires an AC-DC converter such as an SMPS and the like, and such a power converter causes various problems such as increase in manufacturing costs of lighting devices, difficulty in size reduction of the lighting devices, deterioration in energy efficiency of the lighting devices, and reduction in lifespan of the lighting devices due to short lifespan of such power converters.

In order to resolve such problems of DC driving, AC driving of LEDs has been suggested. However, an AC driving circuit causes not only a problem of reduction in power factor due to mismatch between input voltage and output power of the LEDs, but also severe flickering perceived by a user in the case where non-luminous intervals of the LEDs are extended.

FIG. 1 is a conceptual view illustrating a flicker index. A definition and regulation of the flicker index as a reference flicker level in accordance with the Energy Star specifications will be described hereinafter.

(1) Definition of Flicker

Flicker means a phenomenon that brightness of lighting is changed for a certain period of time, and severe flicker can be perceived as shaking or flickering light by a user. Flicker is generally generated due to a difference between a maximum light output and a minimum light output for a certain period of time.

(2) Types of Flicker Index a) Flicker Index: As shown in FIG. 1, the flicker index means a value obtained by dividing an area (Area1) above the level of average light output by the total light output area (Area1+Area2) on a light output waveform of one cycle. Thus, the flicker index is a value numerically indicating frequency of illumination above the level of average light output in one cycle and a lower flicker index indicates a better flicker level.

b) Percent Flicker or Modulation Depth: Percent flicker refers to a value numerically indicating a minimum intensity of light and a maximum intensity of light for a certain period of time. Such a percent flicker can be calculated by 100* (maximum intensity of light−minimum intensity of light)/ (maximum intensity of light+minimum intensity of light).

(3) Flicker Level in Accordance with Energy Star specifications

Light output waveform ≥120 Hz

Flicker index ≤frequency×0.001 (at Max. Dimmer, excluding flicker index at 800 Hz or more) (thus, flicker index at 120 Hz≤0.12)

(4) Study Result on Percent Flicker

Study reports regarding the percent flicker say that

Percent flicker <0.033×2× frequency or less indicates no-influence intervals, and Percent flicker <0.033×2× frequency or less indicates low danger intervals.

As described above, the issue of flicker level is of increasing concern in performance of LED lighting devices.

FIG. 2 is a block diagram of a conventional four-stage sequential driving type LED lighting device and FIG. 3 is a waveform diagram depicting relationship between drive voltage and LED drive current of the conventional four-stage sequential driving type LED lighting device shown in FIG. 2. Next, problems of the conventional LED lighting device will be described with reference to FIG. 2 and FIG. 3.

First, as shown in FIG. 2, a conventional LED lighting device 100 may include a rectification unit 10, an LED light emitting unit 20, and an LED drive controller 30.

In the conventional LED lighting device 100, the rectification unit 10 generates rectified voltage Vrec through rectification of AC voltage supplied from an external power source, and outputs the rectified voltage Vrec to the LED light emitting unit 20 and the LED drive controller 30. As the rectification unit 10, any well-known rectification circuit, such as a full-wave rectification circuit or a half-wave rectification circuit, may be used. In FIG. 2, a bridge full-wave rectification circuit composed of four diodes D1, D2, D3, D4 is shown. In addition, the LED light emitting unit 20 is composed of four LED groups including first to fourth LED groups 21 to 24, which may be sequentially turned on or off under control of the LED drive controller 30. On the other hand, the conventional LED drive controller 30 is configured to control the first to fourth LED groups 21 to 24 to be sequentially turned on or off according to a voltage level of the rectified voltage Vrec.

Particularly, the conventional LED drive controller 30 increases or decreases the LED drive current according to a voltage level of input voltage (that is, rectified voltage (Vrec)) to perform constant current control in each sequential driving interval. As a result, the LED drive current has a stepped waveform approaching a sine wave, whereby power factor (PF) and total harmonic distortion (THD) of the LED lighting device can be enhanced, thereby improving power quality of the LED lighting device.

Here, operation of the conventional LED lighting device 100 will be described in more detail with reference to FIG. 3. Referring to FIG. 3, the LED drive controller 30 may include a first constant current switch SW1, a second constant current switch SW2, a third constant current switch SW3, and fourth constant current switch SW4 in order to control sequential driving of the LED groups. Specifically, in an operation interval in which the voltage level of the rectified voltage Vrec is higher than or equal to a first forward voltage level Vf1 and less than a second forward voltage level Vf2 (a first stage operation interval), the conventional LED drive controller 30 performs constant current control such that only the first LED group 21 is turned on and an LED drive current $I_{LED}$ becomes a first LED drive current $I_{LED1}$. Similarly, in an operation interval in which the voltage level of the rectified voltage Vrec is higher than or equal to the second forward voltage level Vf2 and less than a third forward voltage level Vf3 (a second stage operation interval), the conventional LED drive controller 30 performs constant current control such that only the first LED group 21 and the second LED group 22 are turned on and the LED drive current $I_{LED}$ becomes a second LED drive current $I_{LED2}$. Further, in an operation interval in which the voltage level of the rectified voltage Vrec is higher than or equal to the third forward voltage level Vf3 and less than a fourth forward voltage level Vf4 (a third stage operation interval), the conventional LED drive controller 30 performs constant current control such that the first to third LED groups 21 to 23 are turned on and the LED drive current $I_{LED}$ becomes a third LED drive current $I_{LED3}$. Last, in an operation interval in which the voltage level of the rectified voltage Vrec is higher than or equal to the fourth forward voltage level Vf4 (a fourth stage operation interval), the conventional LED drive controller 30 performs constant current control such that the third constant current switch SW3 is turned off and the fourth constant current switch SW4 is turned on so as to turn on all of the first to fourth LED groups 21 to 24 and the LED drive current $I_{LED}$ becomes a fourth LED drive current $I_{LED4}$. As shown in FIG. 3, the LED lighting device is controlled such that the LED drive current (that is, the first LED drive current $I_{LED1}$) in the first stage operation interval is greater than the LED drive current (that is, the second LED drive current $I_{LED2}$) in the second stage operation interval. Likewise, the LED lighting device is controlled such that the third LED drive current $I_{LED3}$ is greater than the second LED drive current $I_{LED2}$ and the fourth LED drive current $I_{LED4}$ becomes the greatest drive current. Accordingly, the entire light output of the conventional LED lighting device 100 has a stepped waveform, as shown in FIG. 3. Accordingly, since the total number and drive current of LEDs turned on to emit light differ according to the operation intervals, the conventional LED lighting device 100 provides different light outputs according to the operation intervals, thereby causing user inconvenience due to difference in light output according to the operation intervals, and sever flicker as described above. Namely, since the conventional sequential driving type LED lighting device 100 as described above has a percent flicker of 100%, there is a need for improvement in flicker performance.

Further, the conventional LED lighting device 100 is configured to control sequential driving based on drive voltage supplied to the LED light emitting unit 20, that is, based on the voltage level of the rectified voltage Vrec. However, such a voltage detection type has a problem in that it does not satisfactorily reflect current/voltage characteristics based on temperature of LEDs. Namely, since the voltage detection type does not satisfactorily reflect I/V characteristics depending upon the temperatures of the LEDs regardless of different forward voltages of the LED groups according to "operation temperatures of LEDs", there is a problem in that the LED drive current (LED light output) is instantaneously dropped or overshot at a time point that the operation interval is changed (for example, at a time point of changing the operation interval from the first stage operation interval to the second stage operation interval), thereby causing uneven light output of the LED lighting device 100.

SUMMARY

Exemplary embodiments of the disclosure have been conceived to solve the problems in the related art.

Exemplary embodiments of the disclosure provide an LED drive circuit with improved flicker performance, which can provide natural light to a user through reduction in light output deviation by removing non-luminous intervals of a sequential driving type AC LED lighting device, and an LED lighting device including the same.

Exemplary embodiments of the disclosure provide an LED drive circuit with improved flicker performance, which can reduce light output deviation during operation intervals of a sequential driving type AC LED lighting device by controlling LED drive current supplied to LEDs based on the number of LEDs turned on in each operation interval of the LED lighting device, and an LED lighting device including the same.

Exemplary embodiments of the disclosure provide an LED drive circuit with improved flicker performance, which can supply constant light output by controlling sequential driving of LED groups based on a method of detecting LED drive current, and an LED lighting device including the same.

Exemplary embodiments of the disclosure provide an LED drive circuit with improved flicker performance, which can improve circuit efficiency and light quantity using a loop-back compensation unit capable of performing double discharge through a double-discharge path in a sequential driving type AC LED lighting device, and an LED lighting device including the same.

The above and other objects and the following advantageous effects of the disclosure can be achieved by features of exemplary embodiments of the disclosure, which will be described hereinafter.

In accordance with one aspect of the disclosure, a light emitting diode (LED) lighting device includes: a rectification unit connected to an AC power source and outputting a rectified voltage as a first drive voltage to an LED light emitting unit through full-wave rectification of AC voltage applied thereto; the LED light emitting unit including a first LED group to an $n^{th}$ LED group (n being a positive integer of 2 or more) and turned on to emit light upon receiving the rectified voltage as the first drive voltage from the rectification unit in a non-compensation interval and to emit light upon receiving a second drive voltage from a loop-back compensation unit in a compensation interval; the loop-back compensation unit connected at one end thereof to a cathode of one of the first LED group to the $(n-1)^{th}$ LED group through a charge path and to an anode of one of the first LED group to the $(n-1)^{th}$ LED group through a discharge path, and connected at the other end thereof to an LED drive controller, the loop-back compensation unit being charged with energy using the rectified voltage in a charge interval and supplying the second drive voltage to the LED light emitting unit in the compensation interval; and an LED drive controller detecting an LED drive current flowing through constant current switches connected to the first LED group to the $n^{th}$ LED group, respectively, and controlling sequential driving of the first LED group to the $n^{th}$ LED group based on the detected LED drive current.

The loop-back compensation unit may be connected to an anode of the first LED group to supply the second drive voltage to the first LED group in the compensation interval.

The LED drive controller may set the LED drive current (a first LED drive current to an $n^{th}$ LED drive current) in each operation interval based on a total number of LEDs emitting light in each operation interval, and controls the LED drive current to become a constant drive current in a corresponding operation interval according to the set LED drive current in each operation interval such that the first LED drive current to the $n^{th}$ LED drive current are sequentially decreased.

The LED drive controller may set the LED drive current (a first LED drive current to an $n^{th}$ LED drive current) in each operation interval to be inversely proportional to a total number of LEDs emitting light in each operation interval, and controls the LED drive current to become a constant drive current in a corresponding operation interval according to the set LED drive current in each operation interval.

The LED light emitting unit may include a first LED group and a second LED group, and a difference between light output of the first LED group during a first operation interval and light output of the first LED group and the second LED group during a second operation interval may be less than or equal to a preset light output deviation.

The LED light emitting unit may include a first LED group and a second LED group, and the second drive voltage may be higher than or equal to a forward voltage level of the first LED group.

The LED light emitting unit may include a first LED group and a second LED group, and a peak value of the rectified voltage may be two or more times a forward voltage level of the first LED group.

The LED drive controller may further include a first LED drive current setting unit to an $n^{th}$ LED drive current setting unit configured to set corresponding LED drive current values among a first LED drive current to an $n^{th}$ LED drive current, respectively.

Each of the first to $n^{th}$ LED drive current setting units may be composed of a variable resistor.

The LED drive controller may include a first constant current switch to an $n^{th}$ constant current switch connected to cathodes of the first LED group to the $n^{th}$ LED group, respectively, so as to connect or disconnect first to $n^{th}$ current paths according to an operation interval and configured to control the LED drive current to become a constant current in each operation interval.

The LED drive controller may further include an $(n+1)^{th}$ constant current switch disposed between the loop-back compensation unit and the LED drive controller to connect or disconnect an $(n+1)^{th}$ current path between the loop-back compensation unit and the LED drive controller and configured to control an $(n+1)^{th}$ LED drive current to become a constant current in the charge interval.

The LED drive controller may determine whether the LED light emitting unit enters or leaves the charge interval based on detection of a charge current flowing through the $(n+1)^{th}$ constant current switch connected to the loop-back compensation unit, turns off the $n^{th}$ constant current switch upon entrance to the charge interval, and turns on the $n^{th}$ constant current switch upon leaving the charge interval.

The LED drive controller may turn on the $(n+1)^{th}$ constant current switch connected to the loop-back compensation unit while detecting the charge current flowing therethrough upon entrance from an $(n-1)^{th}$ operation interval to an $n^{th}$ operation interval as the rectified voltage increases, turns off the $n^{th}$ LED group to enter the charge interval by turning off the $n^{th}$ constant current switch when the detected charge current increases to a preset value or more, and turns on the $n^{th}$ LED group to enter the $n^{th}$ operation interval again by turning on the $n^{th}$ constant current switch when the detected charge current decreases to a preset value or less after entering the charge interval.

The $(n+1)^{th}$ LED drive current may be set to be the same as an $(n-1)^{th}$ drive current.

The LED light emitting unit may include a first LED group and a second LED group, and a forward voltage level of the first LED group may be higher than that of the second LED group.

The LED lighting device may further include an $(n+2)^{th}$ switch disposed between a node between the $(n-1)^{th}$ LED group and the $n^{th}$ LED group and the loop-back compensation unit to be turned on or off under control of the LED drive controller, wherein the LED drive controller turns on the $(n+2)^{th}$ switch upon entrance to an $n^{th}$ operation interval and turns off the $(n+2)^{th}$ switch upon entrance to the compensation interval.

The LED lighting device may further include a second compensation unit connected to the $n^{th}$ LED group in parallel and configured to be charged during an $n^{th}$ operation interval and to supply a drive voltage to the $n^{th}$ LED group during a non-luminous interval of the $n^{th}$ LED group.

The loop-back compensation unit may be connected to the $n^{th}$ LED group in parallel and the other end of the loop-back compensation unit may be connected together with a cathode of the $n^{th}$ LED group to the LED drive controller through the $n^{th}$ constant current switch.

The LED light emitting unit may include a first LED group and a second LED group, and a forward voltage level of the first LED group may be less than or equal to that of the second LED group.

The LED light emitting unit may include a first LED group, a second LED group and a third LED group; the loop-back compensation unit may be connected to the second LED group and the third LED group in parallel; and the loop-back compensation unit may be connected at one end thereof to an anode of the first LED group to be charged during a second operation interval and a third operation interval and to supply the second drive voltage to the first LED group in the compensation interval.

The LED light emitting unit may include a dummy load instead of the third LED group.

The LED lighting device may further include a second compensation unit connected to the $n^{th}$ LED group in parallel and configured to be charged during an $n^{th}$ operation interval and to supply a drive voltage to the $n^{th}$ LED group during a non-luminous interval of the $n^{th}$ LED group.

Preferably, the LED lighting device further includes a second compensation unit connected to the $n^{th}$ LED group in series and configured to be charged in an interval in which a voltage level of the rectified voltage may be higher than or equal to an $n^{th}$ forward voltage level and to supply a drive voltage to the $n^{th}$ LED group through a discharge path connected to the $n^{th}$ LED group in parallel during a non-luminous interval of the $n^{th}$ LED group.

Preferably, the LED light emitting unit includes a first LED group, a second LED group and a third LED group; a node between the second LED group and the third LED group may be connected to an anode of the rectification unit; and the loop-back compensation unit may be connected to the second LED group and the third LED group in parallel such that the one end of the loop-back compensation unit may be connected to an anode of the first LED group, and may be configured to be charged during a second operation interval and a third operation interval and to supply the second drive voltage to the first LED group and the third LED group during a discharge interval.

In accordance with another aspect of the disclosure, an LED drive circuit configured to control driving of an LED light emitting unit including a first LED group to an $n^{th}$ LED group (n being a positive integer of 2 or more) and receiving a rectified voltage as a first drive voltage from a rectification unit through full-wave rectification, and includes a loop-back compensation unit connected at one end thereof to a cathode of one of the first LED group to the $(n-1)^{th}$ LED group through a charge path and to an anode of one of the first LED group to the $(n-1)^{th}$ LED group through a discharge path, and connected at the other end thereof to an LED drive controller, the loop-back compensation unit being charged with energy using the rectified voltage in a charge interval and supplying a second drive voltage to the LED light emitting unit in a compensation interval; and an LED drive controller detecting an LED drive current flowing through constant current switches connected to the first LED group to the $n^{th}$ LED group, respectively, and controlling sequential driving of the first LED group to the $n^{th}$ LED group based on the detected LED drive current.

The loop-back compensation unit may be connected to an anode of the first LED group to supply the second drive voltage to the first LED group in the compensation interval.

The LED drive controller may set the LED drive current (a first LED drive current to an $n^{th}$ LED drive current) in each operation interval based on a total number of LEDs emitting light in each operation interval, and controls the LED drive current to become a constant drive current in a corresponding operation interval according to the set LED drive current in each operation interval such that the first LED drive current to the $n^{th}$ LED drive current are sequentially decreased.

The LED drive controller may set the LED drive current (a first LED drive current to an $n^{th}$ LED drive current) in each operation interval to be inversely proportional to a total number of LEDs emitting light in each operation interval, and controls the LED drive current to become a constant drive current in a corresponding operation interval according to the set LED drive current in each operation interval.

The LED light emitting unit may include a first LED group and a second LED group, and a difference between light output of the first LED group during a first operation interval and light output of the first LED group and the second LED group during a second operation interval may be less than or equal to a preset light output deviation.

The LED light emitting unit may include a first LED group and a second LED group, and the second drive voltage may be higher than or equal to a forward voltage level of the first LED group.

The LED light emitting unit may include a first LED group and a second LED group, and a peak value of the rectified voltage may be two or more times a forward voltage level of the first LED group.

The LED drive controller may further include a first LED drive current setting unit to an $n^{th}$ LED drive current setting unit configured to set corresponding LED drive current values among a first LED drive current to an $n^{th}$ LED drive current, respectively.

Each of the first to $n^{th}$ LED drive current setting units may be composed of a variable resistor.

The LED drive controller may include a first constant current switch to an $n^{th}$ constant current switch connected to cathodes of the first to $n^{th}$ LED groups, respectively, so as to connect or disconnect first to $n^{th}$ current paths according to an operation interval and controlling the LED drive current to become a constant current in each operation interval.

The LED drive controller further includes an $(n+1)^{th}$ constant current switch disposed between the loop-back compensation unit and the LED drive controller to connect or disconnect an $(n+1)^{th}$ current path between the loop-back compensation unit and the LED drive controller and controlling an $(n+1)^{th}$ LED drive current to become a constant current in the charge interval.

The LED drive controller may determine whether the LED light emitting unit enters or leaves the charge interval based on detection of a charge current flowing through the $(n+1)^{th}$ constant current switch connected to the loop-back compensation unit, may turn off the $n^{th}$ constant current switch upon entrance to the charge interval, and may turn on the $n^{th}$ constant current switch upon leaving the charge interval.

The LED drive controller may turn on the $(n+1)^{th}$ constant current switch connected to the loop-back compensation unit while detecting the charge current flowing therethrough upon entrance from an $(n-1)^{th}$ operation interval to an $n^{th}$ operation interval as the rectified voltage increases, may turn off the $n^{th}$ LED group to enter the charge interval by turning off the $n^{th}$ constant current switch when the detected charge current increases to a preset value or more, and turns on the $n^{th}$ LED group to enter the $n^{th}$ operation interval again by turning on the $n^{th}$ constant current switch when the detected charge current decreases to a preset value or less after entering the charge interval.

The $(n+1)^{th}$ LED drive current may be set to be the same as an $(n-1)^{th}$ drive current.

The LED light emitting unit includes a first LED group and a second LED group, and a forward voltage level of the first LED group may be higher than that of the second LED group.

The LED drive circuit may further include an $(n+2)^{th}$ switch disposed between a node between the $(n-1)^{th}$ LED group and the $n^{th}$ LED group and the loop-back compensation unit to be turned on or off under control of the LED drive controller, wherein the LED drive controller turns on the $(n+2)^{th}$ switch upon entrance to an $n^{th}$ operation interval and turns off the $(n+2)^{th}$ switch upon entrance to the compensation interval.

The LED drive circuit further includes a second compensation unit connected to the $n^{th}$ LED group in parallel and configured to be charged during an $n^{th}$ operation interval and to supply a drive voltage to the $n^{th}$ LED group during a non-luminous interval of the $n^{th}$ LED group.

Preferably, the loop-back compensation unit may be connected to the $n^{th}$ LED group in parallel and the other end of the loop-back compensation unit may be connected together with a cathode of the $n^{th}$ LED group to the LED drive controller through the $n^{th}$ constant current switch.

Preferably, the LED light emitting unit includes a first LED group and a second LED group, and a forward voltage level of the first LED group may be less than or equal to that of the second LED group.

Preferably, the LED light emitting unit includes a first LED group, a second LED group and a third LED group; the loop-back compensation unit may be connected to the second LED group and the third LED group in parallel; and the loop-back compensation unit may be connected at one end thereof to an anode of the first LED group to be charged during a second operation interval and a third operation interval and to supply the second drive voltage to the first LED group in the compensation interval.

The LED light emitting unit may include a dummy load instead of the third LED group.

The LED drive circuit may further include a second compensation unit connected to the $n^{th}$ LED group in parallel and configured to be charged during an $n^{th}$ operation interval and to supply a drive voltage to the $n^{th}$ LED group during a non-luminous interval of the $n^{th}$ LED group.

The LED drive circuit may further include a second compensation unit connected to the $n^{th}$ LED group in series and configured to be charged in an interval in which a voltage level of the rectified voltage may be higher than or equal to an $n^{th}$ forward voltage level and to supply a drive voltage to the $n^{th}$ LED group through a discharge path connected to the $n^{th}$ LED group in parallel during a non-luminous interval of the $n^{th}$ LED group.

The LED light emitting unit may include a first LED group, a second LED group, and a third LED group, a node between the second LED group and the third LED group may be connected to an anode of the rectification unit, and the loop-back compensation unit may be connected to the second LED group and the third LED group in parallel such that the one end of the loop-back compensation unit may be connected to an anode of the first LED group, and may be configured to be charged during a second operation interval and a third operation interval and to supply the second drive voltage to the first LED group and the third LED group during a discharge interval.

In accordance with a further aspect of the disclosure, an LED lighting device includes: a rectification unit connected to an AC power source and outputting a rectified voltage as a first drive voltage to an LED light emitting unit through full-wave rectification of AC voltage applied thereto; the LED light emitting unit including a first LED group and a second LED group and turned on to emit light upon receiving the rectified voltage as the first drive voltage from the rectification unit in a non-compensation interval and to emit light upon receiving a second drive voltage from a loop-back compensation unit in a compensation interval; the loop-back compensation unit disposed between a node between the first LED group and the second LED group and an LED drive controller and charged with energy using the rectified voltage in a charge interval (first operation interval) while supplying the second drive voltage to the first LED group and the second LED group in the compensation interval; and the LED drive controller detecting an LED drive current flowing through constant current switches connected to the first LED group and the second LED group, respectively, and controlling modified sequential driving of the first LED group and the second LED group based on the detected LED drive current, wherein the LED drive controller determines whether the LED light emitting unit enters or leaves the charge interval based on detection of a charge current flowing through a constant current switch connected to the loop-back compensation unit, turns off the constant current switch connected to the second LED group upon entrance to the charge interval, and turns on the constant current switch connected to the second LED group upon leaving the charge interval.

In accordance with yet another aspect of the disclosure, an LED drive circuit configured to control driving of an LED light emitting unit including a first LED group and a second LED group and receiving a rectified voltage as a first drive voltage from a rectification unit through full-wave rectification includes: a loop-back compensation unit disposed between a node between the first LED group and the second LED group and an LED drive controller, and charged with energy using the rectified voltage in a charge interval (first operation interval) and supplying a second drive voltage to the first LED group and the second LED group in a compensation interval; and the LED drive controller detecting an LED drive current flowing through constant current switches connected to the first LED group to the second LED group, respectively, and controlling modified sequential driving of the first LED group and the second LED group based on the detected LED drive current, wherein the LED drive controller determines whether the LED light emitting unit enters or leaves the charge interval based on detection of a charge current flowing through a constant current switch connected to the loop-back compensation unit, turns off the constant current switch connected to the second LED group upon entrance to the charge interval, and turns on the constant current switch connected to the second LED group upon leaving the charge interval.

In accordance with yet another aspect of the disclosure, an LED lighting device includes: a rectification unit connected to an AC power source and outputting a rectified voltage as a first drive voltage to an LED light emitting unit through full-wave rectification of AC voltage applied thereto; the LED light emitting unit including a first LED group to an $n^{th}$ LED group (n being a positive integer of 2 or more) and turned on to emit light upon receiving the rectified voltage as the first drive voltage from the rectification unit in a non-compensation interval and to emit light upon receiving a second drive voltage from a loop-back compensation unit in a compensation interval; the loop-back compensation unit disposed between a node between an $m^{th}$ LED group (m being a positive integer of less than n) and an $(m+1)^{th}$ LED group and an LED drive controller and charged with energy using the rectified voltage in a charge interval, supplying the second drive voltage to a second set of LED groups ($(m+1)^{th}$ to $n^{th}$ LED groups) in a first compensation interval of the compensation interval, and supplying the second drive voltage to each of the second set of LED groups and a first set of LED groups (first to $m^{th}$ LED groups) in a second compensation interval of the compensation interval; and the LED drive controller controlling sequential driving of the first LED group to the $n^{th}$ LED group based on a voltage level of the rectified voltage.

The loop-back compensation unit may be connected to an anode of the $(m+1)^{th}$ LED group through a first discharge path and to an anode of the first LED group through a second discharge path.

The first set of LED groups may be driven by the first drive voltage during the first compensation interval.

The first set of LED groups and the second set of LED groups are independently driven during the first compensation interval and the second compensation interval.

A forward voltage level of the first set of LED groups may be less than or equal to that of the second set of LED groups.

The LED drive controller may further include a first LED drive current setting unit to an $n^{th}$ LED drive current setting unit configured to set corresponding LED drive current values among a first LED drive current to an $n^{th}$ LED drive current, respectively.

Each of the first to $n^{th}$ LED drive current setting units may be composed of a variable resistor.

In accordance with yet another aspect of the disclosure, an LED drive circuit configured to control driving of an LED light emitting unit including a first LED group to an $n^{th}$ LED group (n being a positive integer of 2 or more) and receiving a rectified voltage as a first drive voltage from a rectification unit through full-wave rectification includes: a loop-back compensation unit disposed between a node between an $m^{th}$ LED group (m being a positive integer of less than n) and an $(m+1)^{th}$ LED group and an LED drive controller and charged with energy using the rectified voltage in a charge interval, supplying the second drive voltage to a second set of LED groups ($(m+1)^{th}$ to $n^{th}$ LED groups) in a first compensation interval of the compensation interval, and supplying the second drive voltage to each of the second set of LED groups and a first set of LED groups (first to $m^{th}$ LED groups) in a second compensation interval of the compensation interval; and the LED drive controller controlling sequential driving of the first LED group to the $n^{th}$ LED group based on a voltage level of the rectified voltage.

The loop-back compensation unit may be connected to an anode of the $(m+1)^{th}$ LED group through a first discharge path and to an anode of the first LED group through a second discharge path.

The first set of LED groups may be driven by the first drive voltage during the first compensation interval.

The first set of LED groups and the second set of LED groups may be independently driven during the first compensation interval and the second compensation interval.

A forward voltage level of the first set of LED groups may be less than or equal to that of the second set of LED groups.

The LED drive controller may further include a first LED drive current setting unit to an $n^{th}$ LED drive current setting unit configured to set corresponding LED drive current values among a first LED drive current to an $n^{th}$ LED drive current, respectively.

Each of the first to $n^{th}$ LED drive current setting units may be composed of a variable resistor.

Exemplary embodiments of the disclosure can provide natural light to a user through reduction in light output deviation by removing non-luminous intervals using a loop-back compensation unit.

Exemplary embodiments of the disclosure can reduce light output deviation during operation intervals of a sequential driving type AC LED lighting device by controlling LED drive current supplied to LEDs based on the number of LEDs turned on in each operation interval of the LED lighting device.

Exemplary embodiments of the disclosure can supply more constant light output by controlling sequential driving of LED groups based on a method of detecting LED drive current than a typical LED lighting device that controls sequential driving between LED groups based on a method of detecting LED drive voltage.

Exemplary embodiments of the disclosure can improve circuit efficiency and light quantity using a loop-back compensation unit capable of performing double discharge through a double-discharge path in a sequential driving type AC LED lighting device.

BRIEF DESCRIPTION OF THE DRAWINGS

FIG. 11 is a schematic block diagram of an LED lighting device according to a fifth exemplary embodiment of the disclosure.

FIG. 13 shows waveform diagrams (a) to (e) depicting time-related variation in rectified voltage, LED drive current, input current, and light output from an LED light emitting unit of the LED lighting device shown in FIG. 11.

DETAILED DESCRIPTION OF THE ILLUSTRATED EMBODIMENTS

Figure 1:
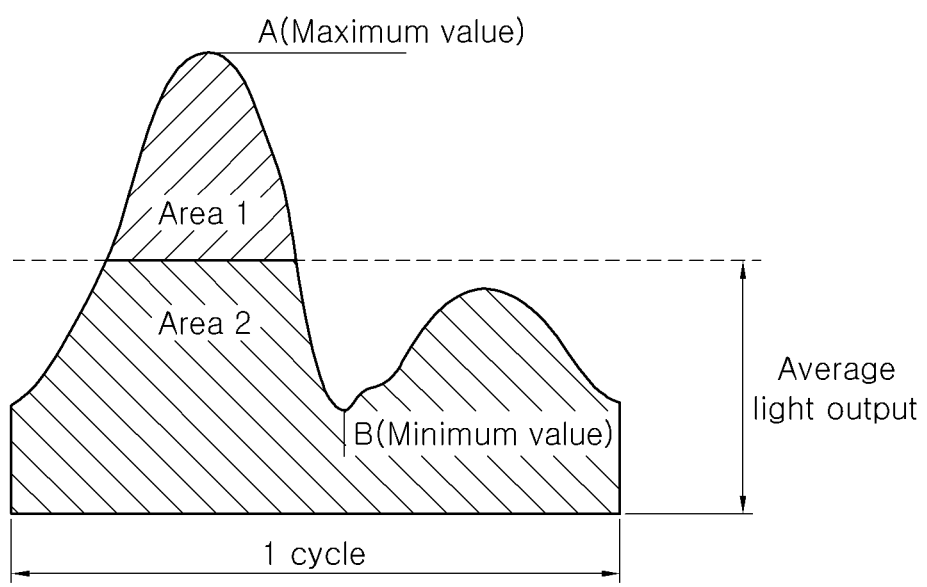
FIG. 1 is a graphical view of flicker index.

Hereinafter, exemplary embodiments of the disclosure will be described in detail with reference to the accompanying drawings. The following embodiments are provided by way of example so as to fully convey the spirit of the disclosure to those skilled in the art to which the disclosure pertains. Although various embodiments are disclosed herein, it should be understood that these embodiments are not intended to be exclusive. For example, individual structures, elements or features of a particular embodiment are not limited to that particular embodiment and can be applied to other embodiments without departing from the spirit and scope of the disclosure. In addition, it should be understood that locations or arrangement of individual components in each of the embodiments can be changed without departing from the spirit and scope of the invention. Therefore, the following embodiments are not to be construed as limiting the disclosure, and the disclosure should be limited only by the claims and equivalents thereof. Like components having the same or similar functions will be denoted by like reference numerals.

Hereinafter, exemplary embodiments of the disclosure will be described in detail with reference to the accompanying drawings so as to be easily practiced by those skilled in the art.

As used herein, the term "LED group" means a set of plural LEDs (or plural light emitting cells), which are interconnected in series/parallel/series-parallel such that operation of the LEDs (or light emitting cells) can be controlled as a single unit (that is, simultaneously turned on/turned off) by an LED drive module.

In addition, the term "first forward voltage level Vf1" means a critical voltage level capable of driving a first LED group, the term "second forward voltage level Vf2" means a critical voltage level capable of driving a first LED group and a second LED group connected to each other in series (that is, the sum of a forward voltage level of the first LED group and a forward voltage level of the second LED group), and the term "third forward voltage level Vf3" means a critical voltage level capable of driving the first to third LED groups connected to each other in series. Namely, the term "$n^{th}$ forward voltage level Vfn" means a critical voltage level capable of driving the first to $n^{th}$ LED groups connected to each other in series (that is, the sum of the forward voltage levels of the first to $n^{th}$ LED groups).

Further, the term "sequential driving type based on drive voltage detection" or "drive voltage detection-based multistage driving type" means sequentially turning on a plurality of LED groups by an LED drive module, which drives LEDs upon receiving an input voltage varying over time, to emit light as the input voltage applied to the LED drive module increases, while sequentially turning off the plurality of LED groups as the input voltage decreases. In addition, "sequential driving type based on drive current detection" or "multistage driving type based on drive current detection" mean sequentially turning on a plurality of LED groups constituting an LED light emitting unit by the LED drive module, which drives LEDs upon receiving an input voltage varying over time, to emit light as an LED drive current flowing through the LED light emitting unit or a constant current switch connected to the LED light emitting unit increases, while sequentially turning off the plurality of LED groups as the LED drive current decreases. On the other hand, regardless of drive voltage detection or drive current detection, in the sequential driving type or multistage driving type, the term "first operation interval" means an operation interval in which the first LED group emits light alone, and the term "second operation interval" means an operation interval in which only the first LED group and the second LED group emit light. Likewise, the term "$n^{th}$ operation interval" means an operation interval in which all of the first to $n^{th}$ LED groups emit light.

Further, the term "first drive voltage" means an input voltage or a drive voltage obtained from the input voltage processed through a certain device (for example, through a rectification circuit) and primarily supplied to LED groups. Further, the term "second drive voltage" means a drive voltage obtained from the input voltage stored in an energy storage device and secondarily supplied from the energy storage device to the LED groups. By way of example, such a second drive voltage may be a drive voltage obtained from the input voltage stored in a capacitor and then supplied from the charged capacitor to the LED groups. Accordingly, unless specifically referred to as the "first drive voltage" or the "second drive voltage", the term "drive voltage" generally includes the first drive voltage and/or the second drive voltage supplied to the LED groups.

Further, the term "LED group drive current" means an LED drive current flowing through a specific LED group regardless of an operation interval. For example, the term "first LED group drive current" means an LED drive current flowing through the first LED group and the term "second LED group drive current" means an LED drive current flowing through the second LED group. Likewise, the term "$n^{th}$ LED group drive current" means an LED drive current flowing through the $n^{th}$ LED group. The LED group drive current can be changed over time.

On the other hand, the term "LED drive current" means a drive current flowing through LED group(s) in a specific operation interval. For example, the term "first LED drive current" means an LED drive current flowing therethrough during the first operation interval and the term "second LED drive current" means an LED drive current flowing therethrough during the second operation interval. Likewise, the term "$n^{th}$ LED drive current" means an LED drive current flowing therethrough during an $n^{th}$ operation interval. The LED drive current does not change over time and becomes a constant current value preset through constant current control of a constant current switch.

Further, the term "first drive voltage" means an input voltage or a drive voltage obtained from the input voltage processed through a certain device (for example, through a rectification circuit) and primarily supplied to LED groups. Further, the term "second drive voltage" means a drive voltage obtained from the input voltage stored in an energy storage device and secondarily supplied from the energy storage device to the LED groups. By way of example, such a second drive voltage may be a drive voltage obtained from the input voltage stored in a capacitor and then supplied from the charged capacitor to the LED groups. Accordingly, unless specifically referred to as the "first drive voltage" or the "second drive voltage", the term "drive voltage" generally includes the first drive voltage and/or the second drive voltage supplied to the LED groups.

Further, the term "compensation interval" means an interval in which the level of an input voltage (rectified voltage) is less than a preset forward voltage level in sequential driving and drive current is not supplied to an LED group.

For example, a first forward voltage level Vf1 compensation interval means an interval in which the voltage level of the rectified voltage is less than Vf1. In this case, the compensation interval becomes a non-luminous interval. Further, a second forward voltage level Vf2 compensation interval means an interval in which the voltage level of the rectified voltage is less than Vf2. Thus, an $n^{th}$ forward voltage level Vfn compensation interval means an interval in which the voltage level of the rectified voltage is less than Vfn. Further, the term "first forward voltage level Vf1 compensation" means an operation of supplying the second drive voltage to the LED group to supply drive current to the LED group in the first forward voltage level Vf1 compensation interval, and the term "second forward voltage level Vf2 compensation" means an operation of supplying the second drive voltage to the LED group in the second forward voltage level Vf2 compensation interval. Thus, the term "$n^{th}$ forward voltage level Vfn compensation" means an operation of supplying the second drive voltage to the LED group in the $n^{th}$ forward voltage level Vfn compensation interval Further, the term "first compensation interval" means an interval in which an energy storage device primarily supplies the second drive voltage to LED group(s), and the term "second compensation interval" means an interval in which the energy storage device secondarily supplies the second drive voltage to the LED group(s). For example, herein, the loop-back compensation unit may primarily supply the second drive voltage to the second to $n^{th}$ LED groups in the second forward voltage level (Vf2) compensation interval, and secondarily supply the second drive voltage to the first to $n^{th}$ LED groups in the first forward voltage level Vf1 compensation interval. In this case, the first compensation interval means an interval in which the voltage level of the rectified voltage is less than Vf2 and the second compensation interval means an interval in which the voltage level of the rectified voltage is less than Vf1. Such a first compensation interval and a second compensation interval can be modified in various ways depending upon a design of an LED drive circuit and are not to be construed as having absolute meanings.

Further, the term "set of LED groups" means LED groups to which the second drive voltage is supplied through the same discharge path (circuit) during a specific compensation interval.

Further, the term "non-compensation interval" (or "normal operation interval") means an interval in which the second drive voltage is not supplied by the loop-back compensation unit, and the term "charge interval" means an interval in which the loop-back compensation unit is charged. The non-compensation interval can be the same as the charge interval or the charge interval can be part of the non-compensation interval.

Further, as used herein, terms V1, V2, V3, . . . , t1, t2, . . . , T1, T2, T3, and the like used to indicate certain voltages, certain time points, certain temperatures, and the like are relative values for differentiation from one another rather than absolute values.

Configuration and Function of First Exemplary Embodiment of LED Lighting Device 1000

Figure 4:
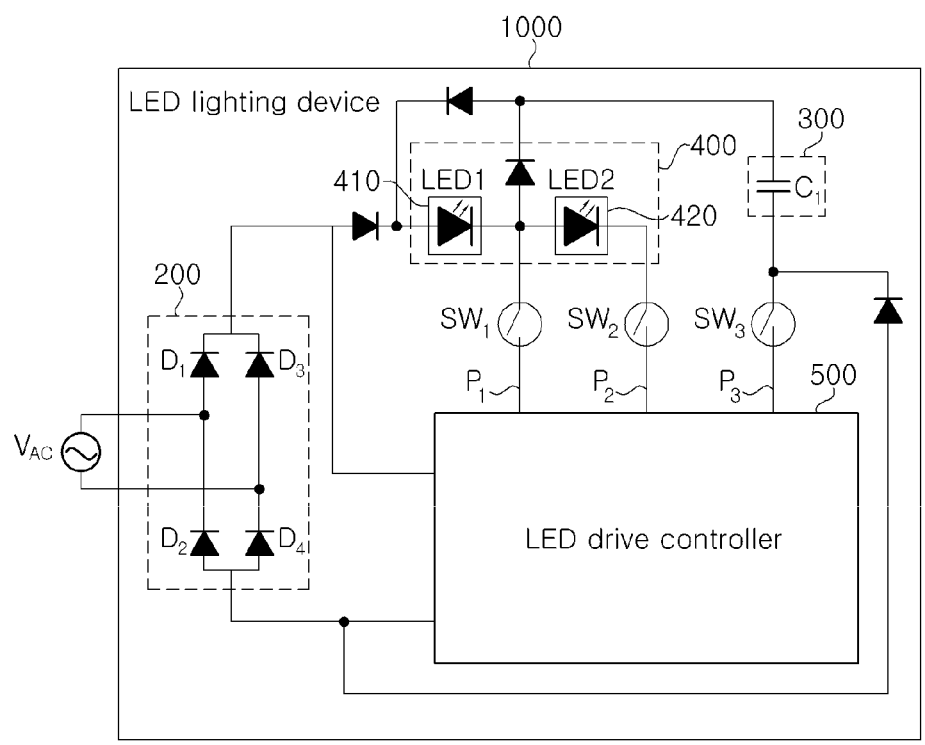
FIG. 4 is a schematic block diagram of an LED lighting device according to a first exemplary embodiment of the disclosure.

FIG. 4 is a schematic block diagram of an LED lighting device with improved flicker performance (hereinafter, "LED lighting device") according to a first exemplary embodiment of the disclosure. Hereinafter, the configuration and functions of the LED lighting device 1000 according to the first exemplary embodiment will be described in brief with reference to FIG. 4.

First, the overall technical features of the LED lighting apparatus 1000 according to the first exemplary embodiment will be described. As described above, in a conventional sequential driving type AC LED lighting device, since LED groups are sequentially turned on or turned off according to the voltage level of drive voltage supplied to an LED light emitting unit 20, a non-luminous interval in which no LED group emits light is generated in an interval in which the voltage level of the drive voltage is less than the first forward voltage level Vf1. Moreover, in the conventional sequential driving type AC LED lighting device, the number of LEDs turned on to emit light increases with increasing voltage level of the drive voltage supplied to the LED light emitting unit 400, and the number of LEDs turned on to emit light decreases with decreasing voltage level of the drive voltage supplied to the LED light emitting unit 400. The sequential driving type AC LED lighting device has a problem of poor flicker performance due to such characteristics thereof.

Therefore, the most fundamental goal of the disclosure is to improve flicker performance of the LED lighting device 1000 by removing a non-light emitting interval, that is, a non-luminous interval, of the LED light emitting unit 400 of the LED lighting device 1000 during operation of the LED lighting device 1000. In order to perform such a function, the disclosure suggests a loop-back type compensation unit and provides an LED light emitting device configured to remove the non-luminous interval by supplying the second drive voltage to the LED light emitting unit 400 through a loop-back compensation unit 300 in the non-luminous interval.

In addition, poor flicker performance of the conventional sequential driving type AC LED lighting device results from the structure wherein the LED drive current is controlled proportional to the number of LEDs emitting light in each operation interval. Thus, in order to solve this problem, the disclosure suggests an LED lighting device configured to control the LED drive current in each operation interval so as to be inversely proportional to the number of LEDs emitting light in each operation interval. With such a method of controlling the LED drive current, when the number of LEDs turned on to emit light is relatively small, the LED drive current is controlled to be relatively large in the corresponding operation interval, and when the number of LEDs turned on to emit light is relatively large, the LED drive current is controlled to be relatively small in the corresponding operation interval, thereby providing substantially uniform light output in each operation interval. The method of controlling the LED drive current according to the disclosure will be described below with reference to FIG. 5A to FIG. 5D, and FIG. 6.

First, referring to FIG. 4, the LED lighting device 1000 according to this exemplary embodiment includes a rectification unit 200, a loop-back compensation unit 300, an LED light emitting unit 400, and an LED drive controller 500. Among these components, the loop-back compensation unit 300 and the LED drive controller 500 may constitute an LED drive circuit.

First, the LED light emitting unit 400 may be composed of a plurality of LED groups, which are sequentially turned on or off under control of the LED drive controller 500. Although the LED light emitting unit 400 is illustrated as including a first LED group 410 and a second LED group 420 in FIG. 4, it will be apparent to those skilled in the art that the number of LED groups included in the LED light emitting unit 400 can be changed, as needed. In the following, for convenience of description and understanding, the LED light emitting unit 400 will be illustrated as being composed of two LED groups, without being limited thereto. For example, the LED light emitting unit 400 may be composed of four LED groups including a first LED group 410 to a fourth LED group (not shown), or n LED groups including a first LED group 410 to an $n^{th}$ LED group (not shown), and it will be apparent to those skilled in the art that any LED light emitting unit including the subject matter of the disclosure falls within the scope of the disclosure.

In some exemplary embodiments, the first LED group 410 and the second LED group 420 may have different forward voltage levels. For example, when each of the first and second LED groups 410, 420 includes a different number of LEDs or has a different series connection, parallel connection or series/parallel connection relationship, the first and second LED groups 410, 420 will have different forward voltage levels. In the exemplary embodiments, the first LED group 410 is designed to have a forward voltage level that allows the first LED group 410 to be driven by the second drive voltage supplied from the loop-back compensation unit 300 in the compensation interval. In the exemplary embodiments, the first LED group 410 may be configured such that a peak value Vrec_peak of a rectified voltage is two or more times the forward voltage level of the first LED group 410. Further, in the exemplary embodiments, the first LED group 410 and the second LED group 420 may be configured such that the forward voltage level of the first LED group 410 is equal to or less than the forward voltage level of the second LED group 420. With such design, the first LED group 410 is kept in a turned-on state in the overall cycle of AC voltage $V_{AC}$.

In other exemplary embodiments, in order to improve flicker performance, the number of LEDs constituting the first LED group 410 kept in a turned-on state in the overall cycle of AC voltage $V_{AC}$ may be greater than the number of LEDs constituting the second LED group 420 turned on to emit light only in the second operation interval. In this case, the forward voltage level of the first LED group 410 may be much higher than that of the second LED group 420.

Referring to FIG. 4, the rectification unit 200 according to this exemplary embodiment is configured to generate and output a rectified voltage Vrec by rectifying AC voltage $V_{AC}$ input from an external power source. As the rectification unit 200, any rectification circuit known in the art, such as a full-wave rectification circuit or a half-wave rectification circuit, may be used. The rectification unit 200 is configured to supply the rectified voltage Vrec to the loop-back compensation unit 300, the LED light emitting unit 400, and the LED drive controller 500. FIG. 4 shows a bridge full-wave rectification circuit composed of four diodes D1, D2, D3, D4.

The loop-back compensation unit 300 according to this exemplary embodiment is configured to be charged with energy using the rectified voltage Vrec in the charge interval and to supply the second drive voltage to the LED light emitting unit 400 in the compensation interval. In FIG. 4, a first capacitor C1 is shown as the loop-back compensation unit 300 according to this exemplary embodiment. However, it should be understood that other implementations are also possible and any one of various compensation circuits (for example, a valley-fill circuit and the like) known in the art may be used, as needed.

In addition, as shown in FIG. 5, the loop-back compensation unit 300 is connected at one end thereof to an anode of the first LED group 410 and at the other end thereof to the LED drive controller 500 through a third constant current switch SW3. In alternative exemplary embodiments, the loop-back compensation unit 300 may be connected at one end thereof to an anode of another LED group. For example, in an exemplary embodiment wherein the LED light emitting unit 400 is composed of four LED groups, the loop-back compensation unit 300 may be connected at one end thereof to an anode of a second LED group. In this exemplary embodiment, the loop-back compensation unit 300 is configured to supply the second drive voltage to the second LED group (or to the second and third LED groups) in the compensation interval. Herein, the loop-back compensation unit 300 will be described as being connected at one end thereof to the anode of the first LED group 410 so as to supply the second drive voltage to the first LED group 410 in the compensation interval.

Further, in the exemplary embodiment of FIG. 4, the loop-back compensation unit 300 is configured to be charged in the second operation interval (that is, an interval in which the voltage level of the rectified voltage Vrec is higher than or equal to the second forward voltage level Vf2) and to be discharged to supply the second drive voltage to the first LED group 410 in the non-luminous interval (that is, an interval in which the voltage level of the rectified voltage Vrec is less than the first forward voltage level Vf1). However, it should be understood that other implementations are also possible. In an exemplary embodiment wherein the LED lighting device 1000 includes four LED groups composed of a first LED group 410 to a fourth LED group (not shown), the loop-back compensation unit 300 may be charged in a fourth operation interval (that is, an interval in which the voltage level of the rectified voltage Vrec is higher than or equal to the fourth forward voltage level Vf4). Likewise, it should be noted that, in exemplary embodiments in which the LED lighting device 1000 includes n LED groups composed of a first LED group 410 to an $n^{th}$ LED group (not shown), the loop-back compensation unit 300 may be charged in the $n^{th}$ operation interval (that is, an interval in which the voltage level of the rectified voltage Vrec is higher than or equal to the $n^{th}$ forward voltage level Vfn).

Further, the forward voltage level compensated by the look-back compensation unit 300 according to this exemplary embodiment may be set in various ways according to capacitance of charge/discharge devices (for example, the first capacitor C1 of FIG. 4), which constitute the look-back compensation unit 300. In one exemplary embodiment, the look-back compensation unit 300 may be configured to compensate for a voltage level corresponding to ½ of the total forward voltage level (the sum of forward voltage levels of the LED groups). Thus, in the exemplary embodiments wherein the forward voltage level of the first LED group 410 is less than or equal to that of the second LED group 420, the look-back compensation unit 300 may supply a voltage of the first forward voltage level Vf1 in the compensation interval. In this case, as described above, the first LED group 410 is kept in a turned-on state regardless of cycles of AC power.

Figure 2:
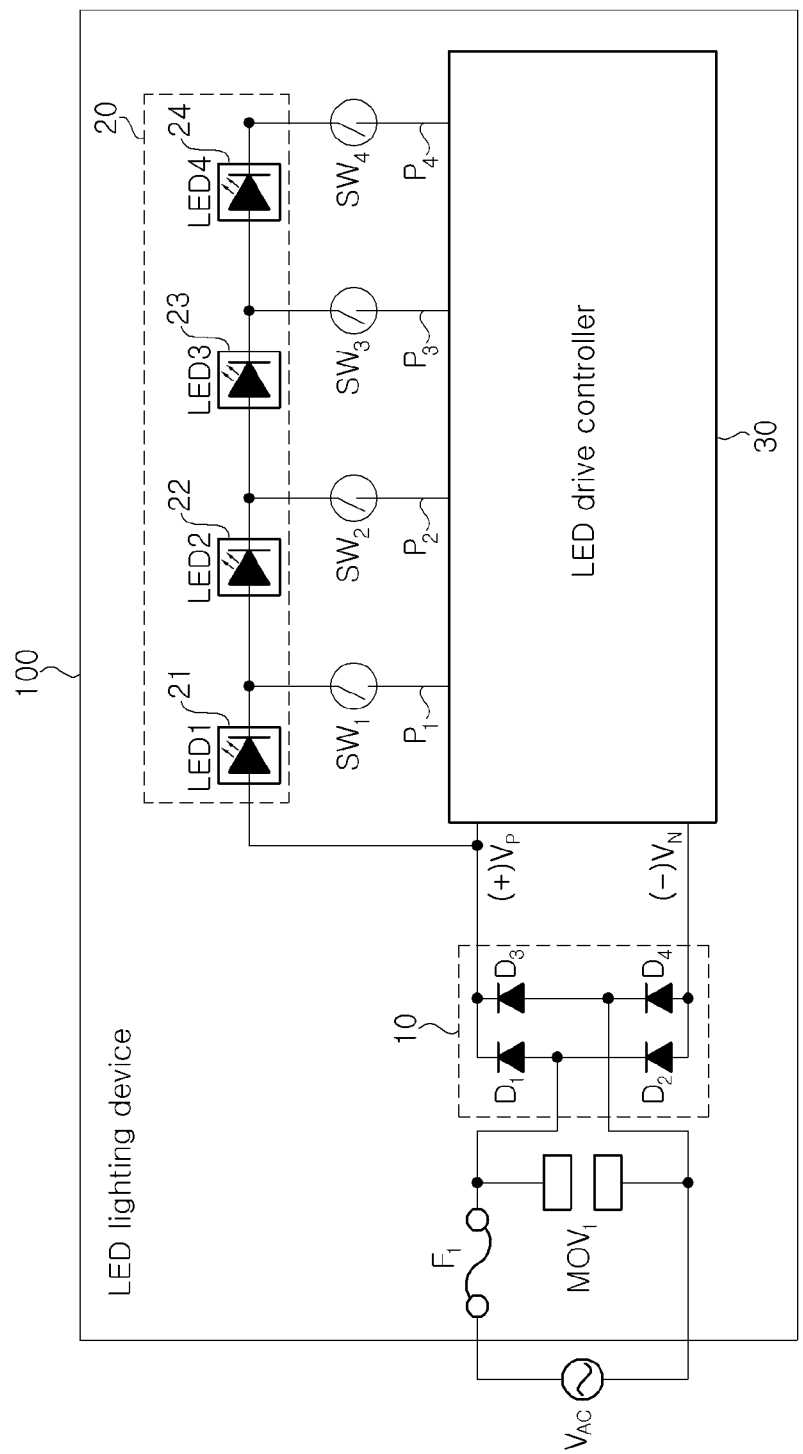
FIG. 2 is a schematic block diagram of a conventional four-stage sequential driving type LED lighting device.

On the other hand, the conventional LED drive controller 500 shown in FIG. 2 is configured to control sequential driving of the plurality of LED groups based on drive voltage detection, whereas the LED drive controller 500 according to the disclosure may be configured to detect the LED drive current $I_{LED}$ flowing through the LED light emitting unit 400 or through constant current switch(es) (SW1 to SW3) connected to the LED light emitting unit 400, and to control sequential driving of the first LED group 410 and the second LED group 420 based on the detected LED drive current $I_{LED}$. However, it should be understood that the disclosure may also be applied to an LED lighting device configured to control sequential driving of the plurality of LED groups based on the drive current detection method as described above.

More specifically, in the LED lighting device 1000 according to the exemplary embodiments of the disclosure, the LED drive controller 500 may include a first constant current switch SW1, a second constant current switch SW2, and a third constant current switch SW3, which are provided for sequential driving through drive current detection as described above. Although the first to third constant current switches SW1 to SW3 are illustrated as being realized as separate switches outside the LED drive controller 500 in FIG. 4, it will be apparent to those skilled in the art that the first to third constant current switches SW1 to SW3 may be included in the LED drive controller 500.

In addition, each of the first to third constant current switches SW1 to SW3 is configured to be turned on or off so as to connect or disconnect a current path under control of the LED drive controller 500, and to detect the LED drive current $I_{LED}$ flowing through the connected current path so as to control the LED drive current $I_{LED}$ to a preset current value through constant current control. More specifically, as shown in FIG. 4, the first constant current switch SW1 is disposed between a node between the first LED group 410 and the second LED group 420 and the LED drive controller 500 to connect or disconnect a first current path P1 under control of the LED drive controller 500. Likewise, the second constant current switch SW2 is disposed between the second LED group 420 and the LED drive controller 500 to connect or disconnect a second current path P2 under control of the LED drive controller 500. Further, the third constant current switch SW3 is disposed between the loop-back compensation unit 300 and the LED drive controller 500 to connect or disconnect a third current path P3 under control of the LED drive controller 500. In the disclosure, the first to third constant current switches SW1 to SW3 may be realized using various techniques known in the art. For example, with regard to the constant current control function as described above, each of the first to third constant current switches SW1 to SW3 according to the disclosure may include a sensing resistor for current detection, a differential amplifier for comparing a currently detected current value with a reference current value, and a switching device configured to control connection of a path depending upon output from the differential amplifier and to control an LED drive current flowing through the path to a constant current value when the path is connected. In addition, for example, the switching device constituting the first to third constant current switches SW1 to SW3 may be realized using one of a metal oxide semiconductor field effect transistor (MOSFET), an insulated gate bipolar transistor (IGBT), a bipolar junction transistor (BJT), a junction type field effect transistor (JFET), a thyristor (silicon controlled rectifier), and triac.

Referring to FIG. 4 again, the LED drive controller 500 according to this exemplary embodiment is configured to detect the LED drive current $I_{LED}$ and to control sequential driving of the first LED group 410 and the second LED group 420 by controlling the first to third constant current switches SW1 to SW3 based on the detected LED drive current $I_{LED}$. Details of such functions of the LED drive controller 500 will now be described with reference to FIG. 5 and FIG. 6.

FIG. 5A to FIG. 5D are block diagrams showing switch control states in operation intervals and LED drive current of the LED lighting device shown in FIG. 4. Hereinafter, operation of the LED lighting device 1000 according to the first exemplary embodiment shown in FIG. 4 will be described in detail with reference to FIG. 5A to FIG. 5D.

Figure 5A:
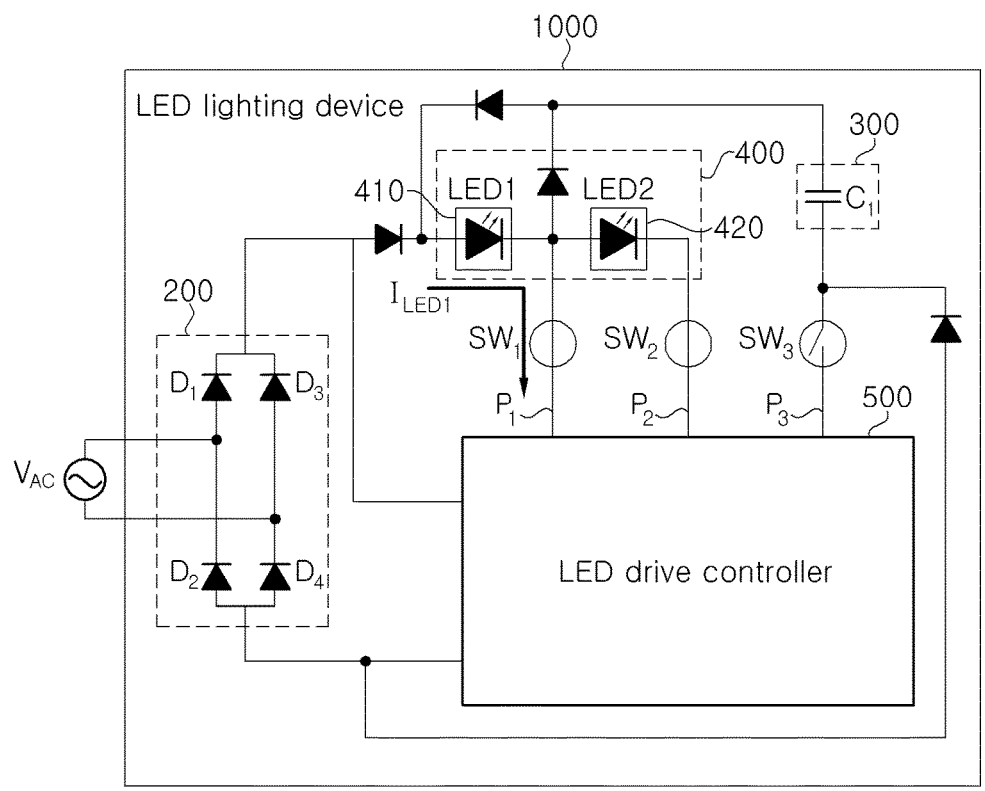
FIG. 5A to FIG. 5D are block diagrams showing switch control states in operation intervals and LED drive current of the LED lighting device shown in FIG. 4.

First, FIG. 5A shows a relationship between switch control states of the first to third constant current switches SW1 to SW3 and an LED drive current $I_{LED}$ in the first operation interval. Referring to FIG. 5A, in the first operation interval, the first constant current switch SW1 and the second constant current switch SW2 are in a turned-on state and the third constant current switch SW3 is in a turned-off state. In the LED lighting device 1000 according to this exemplary embodiment, the LED drive current $I_{LED}$ flows through the first LED group 410 such that the first LED group 410 is turned on, when the voltage level of the drive voltage (the first drive voltage (rectified voltage Vrec) supplied from the rectification unit 200 in the non-compensation interval and the second drive voltage supplied from the loop-back compensation unit 300 in the compensation interval) supplied to the LED light emitting unit 400 is higher than or equal to the forward voltage level of the first LED group 410, that is, the first forward voltage level Vf1. Here, the LED drive current $I_{LED}$ flowing through the first LED group 410 becomes a preset first LED drive current $I_{LED1}$ through constant current control of the first constant current switch SW1.

Figure 5B:
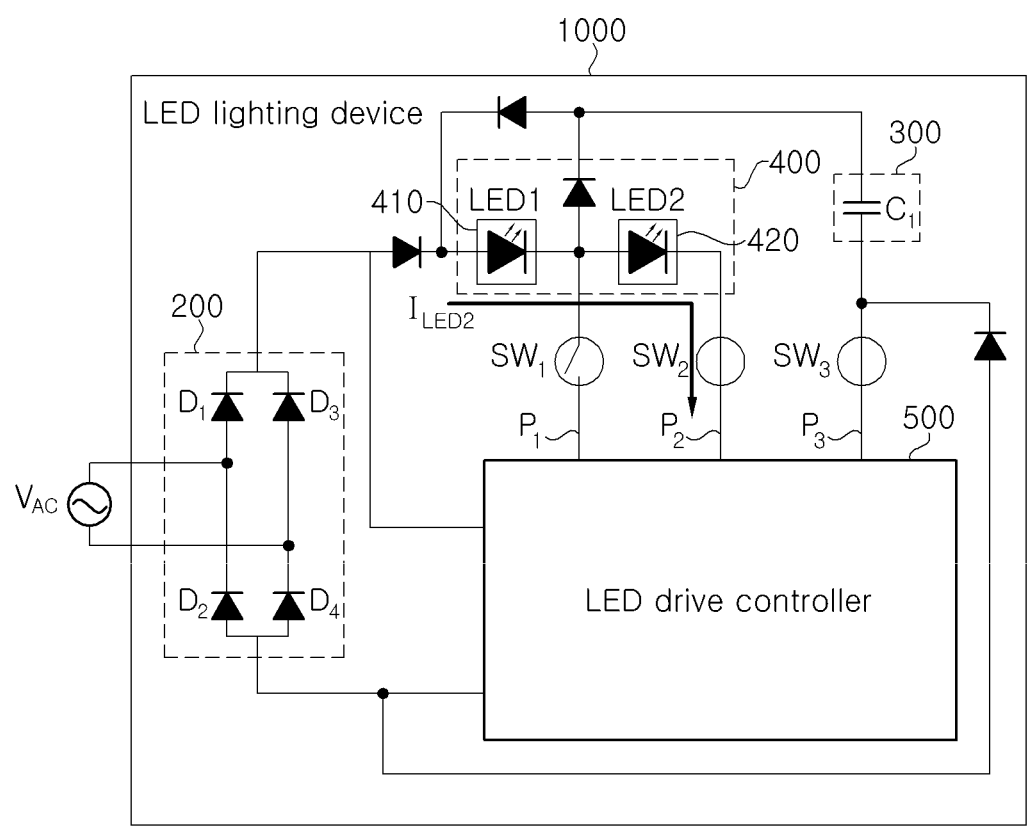

Next, FIG. 5B shows a relationship between switch control states of the first to third constant current switches SW1 to SW3 and the LED drive current $I_{LED}$ in the second operation interval. The LED drive current $I_{LED}$ also flows through the second LED group 420 such that the second LED group 420 is also turned on, when the drive voltage supplied to the LED light emitting unit 400 increase from the state shown in FIG. 5A and reaches the sum of the forward voltage level of the first LED group 410 and the forward voltage level of the second LED group 420, that is, the second forward voltage level Vf2. As described above, in the first operation interval, the second constant current switch SW2 connecting the second LED group 420 to the LED drive controller 500 through the second current path P2 is in a turned-on state, whereby the LED drive current $I_{LED}$ flowing through the second constant current switch SW2 can be detected. The LED drive controller 500 detects the LED drive current $I_{LED}$ flowing through the second constant current switch SW2, and determines whether the LED drive current $I_{LED}$ flowing through the second constant current switch SW2 is maintained in a normal constant current state after a transient state (in which current increases and/or decreases). When the LED drive current $I_{LED}$ flowing through the second constant current switch SW2 is maintained at the normal constant current, that is, when the LED drive current $I_{LED}$ flowing through the second constant current switch SW2 is stably maintained at a preset second LED drive current $I_{LED2}$, the LED drive controller 500 determines that the drive voltage supplied to the LED light emitting unit 400 is sufficient to drive the first LED group 410 and the second LED group 420 (that is, the voltage level of the drive voltage is higher than or equal to the second forward voltage level), and turns off the first constant current switch SW1 to enter the second operation interval. At the same time, the LED drive controller 500 turns on the third constant current switch SW3 to connect a third current path P3 and starts to detect a loop-back compensation unit charge current Ic flowing through the third constant current switch SW3. The relationship between the switch control states of the first and second constant current switches SW1, SW2 and the LED drive current $I_{LED}$ in the second operation interval is shown in FIG. 5B.

On the other hand, during the second operation interval, since both the second LED group 420 and the first LED group 410 emit light, the number of LEDs turned on to emit light becomes greater in the second operation interval than in the first operation interval. Accordingly, in order to maintain a substantially constant light output of the LED light emitting unit 400 in the first operation interval and in the second operation interval, the second LED drive current $I_{LED2}$ may be set to a lower value than the first LED drive current $I_{LED1}$. More preferably, the relationship between the second LED drive current $I_{LED2}$ and the first LED drive current $I_{LED1}$ is set to be inversely proportional to the number of LEDs turned on to emit light in the operation intervals so as to provide substantially the same light output in the operation intervals.

Figure 5C:
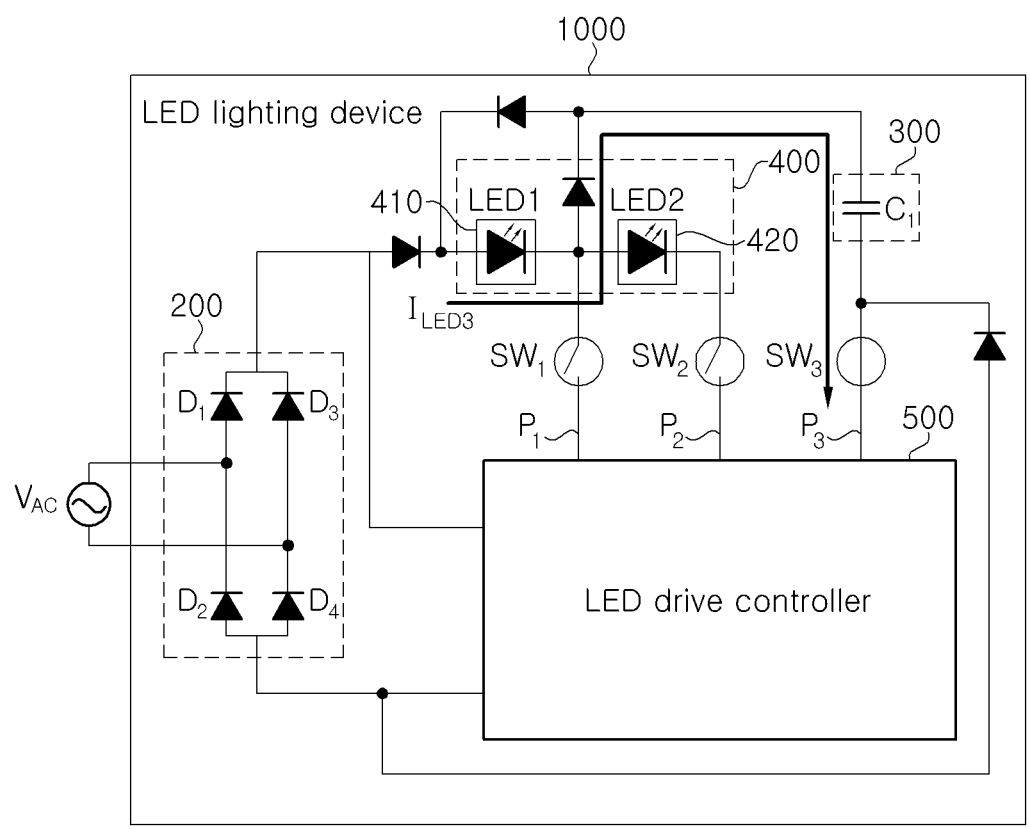

Next, FIG. 5C shows a relationship between switch control states of the first to third constant current switches SW1 to SW3 and the LED drive current $I_{LED}$ in the charge interval. As shown in FIG. 5B, the LED drive controller 500 detects the charge current Ic during the second operation interval while turning off the second constant current switch SW2, thereby entering the charge interval, when the rectified voltage Vrec gradually increases and the charge current Ic reaches a preset value. The block diagram depicting this state is shown in FIG. 5C. Referring to FIG. 5C, in the charge interval, since the second constant current switch SW2 is in a turned-off state, a third LED drive current $I_{LED3}$ flows through the first LED group 410 and the loop-back compensation unit 300 via the third current path P3. Accordingly, in such a charge interval, only the first LED group 410 emits light and the second LED group 420 is turned off. The LED drive controller 500 continues to detect the third LED drive current $I_{LED3}$ flowing through the third current path P3 during the charge interval.

On the other hand, as the rectified voltage Vrec gradually decreases from the highest voltage level and the third LED drive current $I_{LED3}$ flowing through the third current path P3 becomes a preset value or less, the LED drive controller 500 controls the first to third constant current switches SW1 to SW3 to become the state as shown in FIG. 5B and returns to the second operation interval. Namely, the LED drive controller 500 turns off the third constant current switch SW3 and turns on the second constant current switch SW2. Accordingly, as described above, during the second operation interval, both the first LED group 410 and the second LED group 420 emit light, and the LED drive current $I_{LED}$ becomes the second LED drive current $I_{LED2}$ through constant current control.

Then, as the rectified voltage Vrec decreases to a voltage level less than the second forward voltage level Vf2, the LED drive controller 500 controls the first to third constant current switches SW1 to SW3 to become the state as shown in FIG. 5B and returns to the first operation interval. As described above, during the first operation interval, only the first LED group 410 emits light and the second LED group 420 is turned off. In addition, the LED drive current $I_{LED}$ becomes the first LED drive current $I_{LED1}$ through constant current control.

Figure 5D:
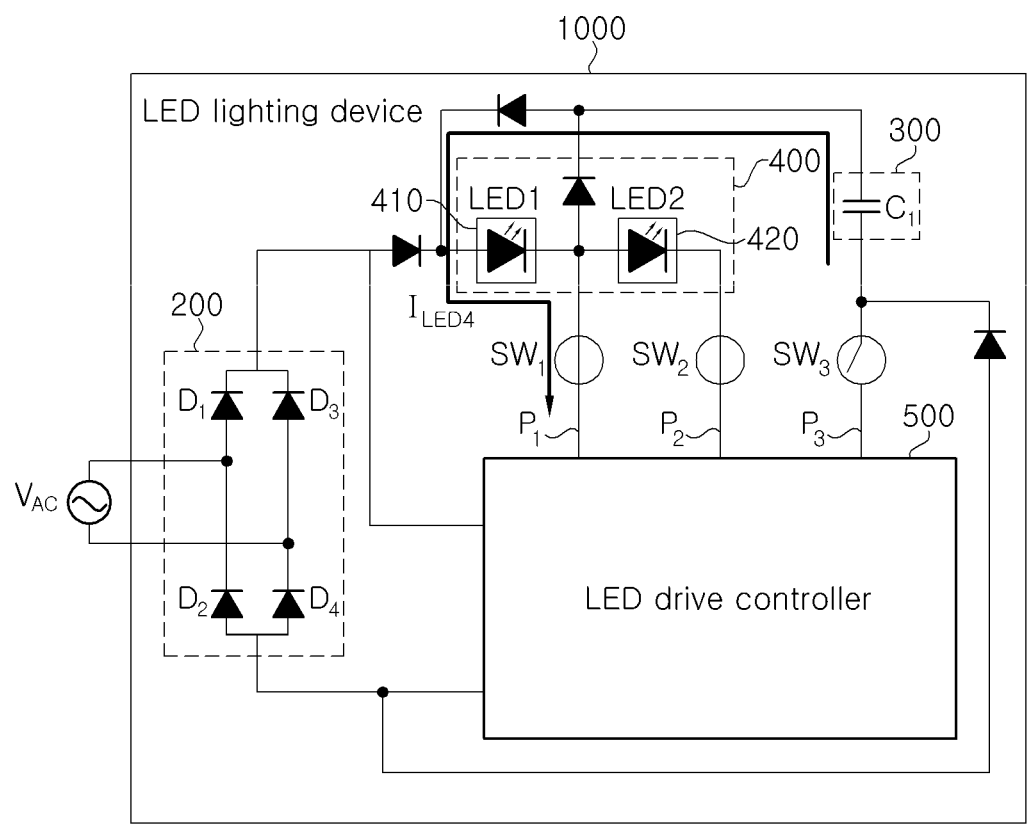

Then, as the rectified voltage Vrec decreases to a voltage level less than the first forward voltage level Vf1, the LED drive controller 500 controls the first to third constant current switches SW1 to SW3 to become a state as shown in FIG. 5D and enters the compensation interval. As can be seen from comparison of FIG. 5A with FIG. 5D, the control states of the constant current switches shown in FIG. 5A are the same as those of the constant current switches shown in FIG. 5D. Accordingly, substantial control of the constant current switches may not occur and the second drive voltage can be naturally supplied from the loop-back compensation unit 300 to the first LED group 410 due to potential difference therebetween. Thus, during the compensation interval, the second drive voltage can be supplied from the loop-back compensation unit 300 to the first LED group 410, whereby a fourth LED drive current $I_{LED4}$ flows through the first current path and the first LED group 410 is kept in a turned-on state. Here, the fourth LED drive current $I_{LED4}$ may be substantially the same as the first LED drive Current $I_{LED1}$.

As described above, the control procedures for the first operation interval, the second operation interval, the charge interval, the second operation interval, the first operation interval, and the compensation interval are sequentially performed during one cycle of the rectified voltage Vrec, and such control procedures are periodically repeated in each cycle of the rectified voltage Vrec.

Figure 6:
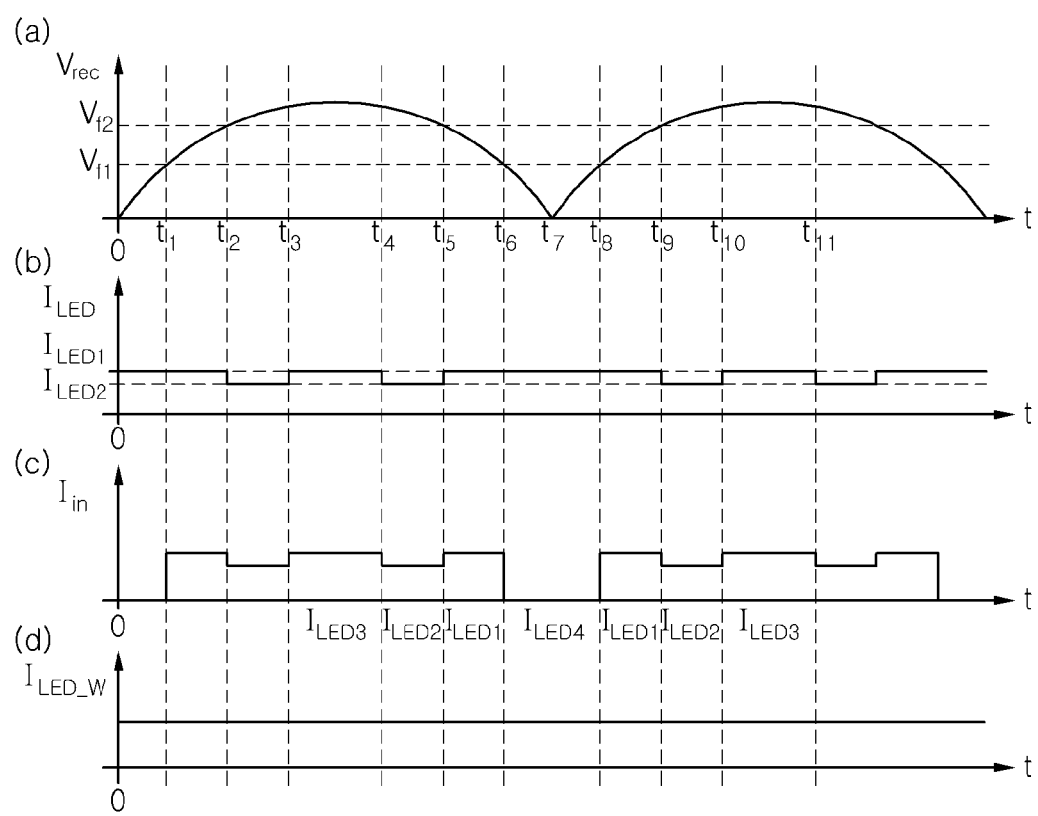
FIG. 6 shows waveform diagrams (a) to (d) depicting time-related variation in rectified voltage, LED drive current, input current, and light output from an LED light emitting unit of the LED lighting device shown in FIG. 4.

FIG. 6 shows waveform diagrams depicting time-related variation in rectified voltage, LED drive current, input current, and light output of the LED light emitting unit of the LED lighting device shown in FIG. 4. FIG. 6 shows a waveform (a) of the rectified voltage Vrec over time, a waveform (b) of the LED drive current ILED over time, a waveform (c) of the input current Iin input from AC power source Vac to the LED lighting device over time, and a waveform (d) of the light output of the LED light emitting unit 400 over time.

Referring to FIG. 6, since the loop-back compensation unit 300 is in a non-charged state upon initial operation of the LED lighting device 1000, the LED light emitting unit 400 does not emit light. Then, the first LED group 410 is turned on when the voltage level of the rectified voltage Vrec reaches the first forward voltage level Vf1 (at t1). This state is shown in FIG. 5A.

Then, when the voltage level of the rectified voltage Vrec increases and reaches the second forward voltage level Vf2 (at t2), the LED drive controller 500 turns on the second constant current switch SW2 and the third constant current switch SW3 while turning off the first constant current switch SW1, thereby entering the second operation interval. This state is shown in FIG. 5B. During the second operation interval, both the first LED group and the second LED group 420 are turned on and, as described above, the second LED drive current ILED2 is preferably set to a much smaller drive current value than the first LED drive current ILED1 through constant current control in the second operation interval. It will be apparent to those skilled in the art that the first LED drive current ILED1 and the second LED drive current ILED2 may be set to various values, as needed. For example, the first LED drive current ILED1 and the second LED drive current ILED2 may be set to the same value, and in some exemplary embodiments, the second LED drive current ILED2 may be set to a value much higher than the first LED drive current ILED1. Accordingly, as shown in FIG. 6 at waveform (d), the light output of the LED light emitting unit 400 in the second operation interval can become substantially the same as the light output of the LED light emitting unit 400 in the first operation interval. On the other hand, as described above, during the second operation interval, the LED drive controller 500 continues to detect whether the charge current Ic flows through the third constant current switch SW3.

Then, when the voltage level of the rectified voltage Vrec increases and the charge current Ic is stably supplied to the loop-back compensation unit 300 (at t3), the LED drive controller 500 turns off the second constant current switch SW2 to enter the charge interval. As shown in FIG. 5C, in the charge interval, only the first LED group 410 emits light and the loop-back compensation unit 300 is charged. Here, the LED drive current $I_{LED}$ flowing through the first LED group 410 and the loop-back compensation unit 300 becomes a preset third LED drive current $I_{LED3}$ through constant current control of the third constant current switch SW3, and in some exemplary embodiments, the first LED drive current $I_{LED1}$ and the third LED drive current $I_{LED3}$ may be set to the same value. This condition is for the purpose of reducing light output deviation according to the operation intervals.

When the voltage level of the rectified voltage Vrec decreases from the highest level and the charge current is not stably supplied to the loop-back compensation unit 300 (at t4), the LED drive controller 500 turns on the second constant current switch SW2 to enter the second operation interval, as shown in FIG. 5B.

Then, when the rectified voltage Vrec decreases to a voltage level less than the second forward voltage level Vf2 (at t5), the LED drive controller 500 turns on the first constant current switch SW1 while turning off the third constant current switch SW3, thereby entering the first operation interval, as shown in FIG. 5A. Here, the LED drive controller 500 is configured to determine whether the voltage level of the rectified voltage Vrec is less than the second forward voltage level Vf2 through detection of the second LED drive current $I_{LED2}$. Namely, the LED drive controller 500 is configured to determine that the voltage level of the rectified voltage Vrec is less than the second forward voltage level Vf2 when the detected second LED drive current $I_{LED2}$ is less than or equal to a preset value.

Then, when the rectified voltage Vrec decreases to a voltage level less than the first forward voltage level Vf1 (at t6), the second drive voltage is supplied from the loop-back compensation unit 300 to the first LED group 410 to allow the first LED group 410 to emit light, as shown in FIG. 5D. As described above, at this time point, natural discharge from the loop-back compensation unit 300 to the first LED group 410 can be performed due to potential is difference without performing separate constant current switch control.

When the rectified voltage Vrec increases to a voltage level higher than or equal to the first forward voltage level Vf1 again (at t8), the first LED group 410 is operated again to emit light by the rectified voltage Vrec, as shown in FIG. 5A. Such sequential control procedures are periodically repeated in each cycle of the rectified voltage Vrec.

On the other hand, as can be seen from FIG. 6 at waveform (d), the LED light emitting unit 400 maintains substantially constant light output over all intervals of the rectified voltage Vrec. This effect can be achieved by controlling the second LED drive current ILED2 to a much lower value than the first LED drive current ILED1 in the second operation interval.

In the above description, for convenience of description and illustration, the LED lighting device 1000 has been described with reference to the exemplary embodiments in which the LED light emitting unit 400 is composed of two LED groups, that is, the first LED group 410 and the second LED group 420. However, it will be apparent to those skilled in the art that the s disclosure may also be applied to other exemplary embodiments wherein the LED light emitting unit 400 is composed of three or more LED groups, and that these exemplary embodiments also fall within the scope of the disclosure.

Configuration and Function of Second Exemplary Embodiment of LED Lighting Device 1000

Figure 7:
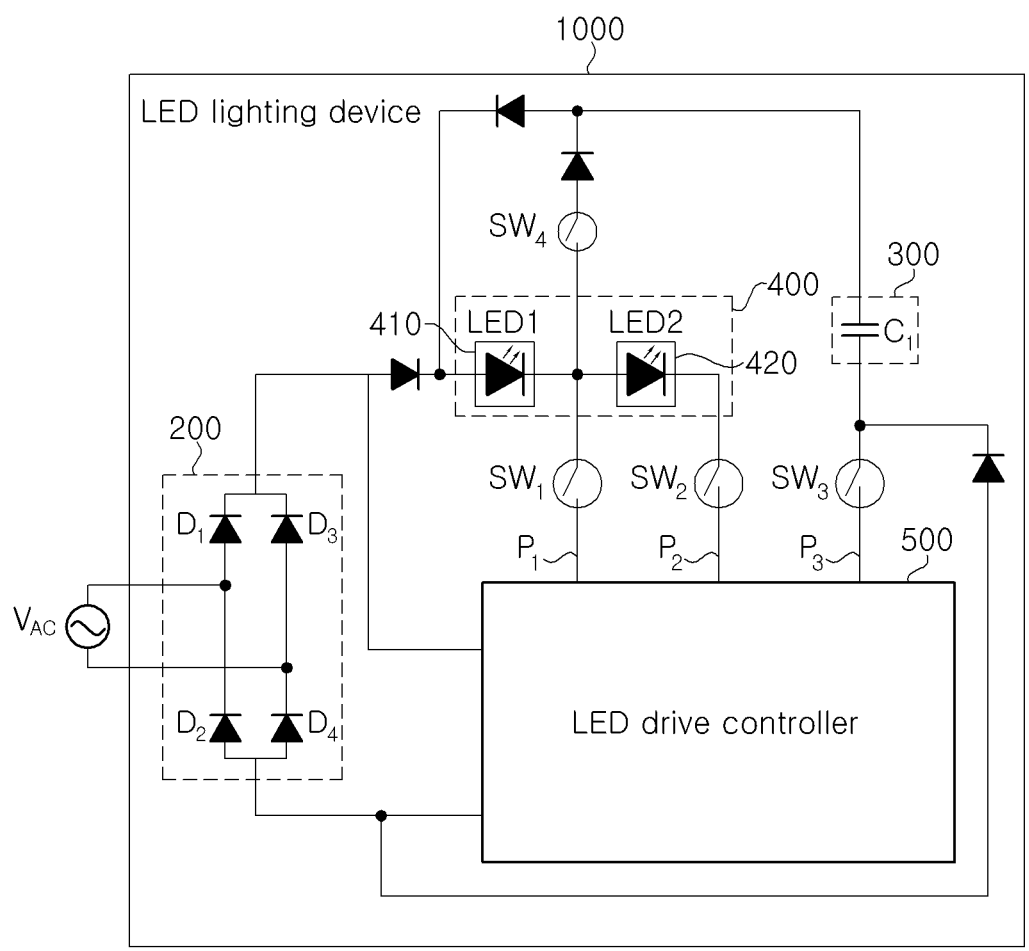
FIG. 7 is a schematic block diagram of an LED lighting device according to a second exemplary embodiment of the disclosure.

FIG. 7 is a schematic block diagram of an LED lighting device according to a second exemplary embodiment of the disclosure, and FIG. 8A to FIG. 8D are block diagrams showing switch control states in operation intervals and LED drive current of the LED lighting device shown in FIG. 7. Hereinafter, the configuration and functions of the LED lighting device 1000 according to the second exemplary embodiment will be described in detail with reference to FIG. 7 and FIG. 8A to FIG. 8D.

Referring to FIG. 7, the LED lighting device 1000 according to the second exemplary embodiment is similar to the LED lighting device 1000 according to the first exemplary embodiment shown in FIG. 4 excluding a fourth switch SW4 disposed between a node between the first LED group 410 and the second LED group 420 and the loop-back compensation unit 300. Thus, repeated components and functions of the LED lighting device 1000 according to the second exemplary embodiment will be described with reference to the description of the first exemplary embodiment shown in FIG. 4 and the following description will focus on the features of the second exemplary embodiment different from those of the first exemplary embodiment the first exemplary embodiment.

First, referring to FIG. 7, the fourth switch SW4 serves to perform accurate control of charge/discharge of the loop-back compensation unit 300 under control of the LED drive controller 500.

Figure 8A:
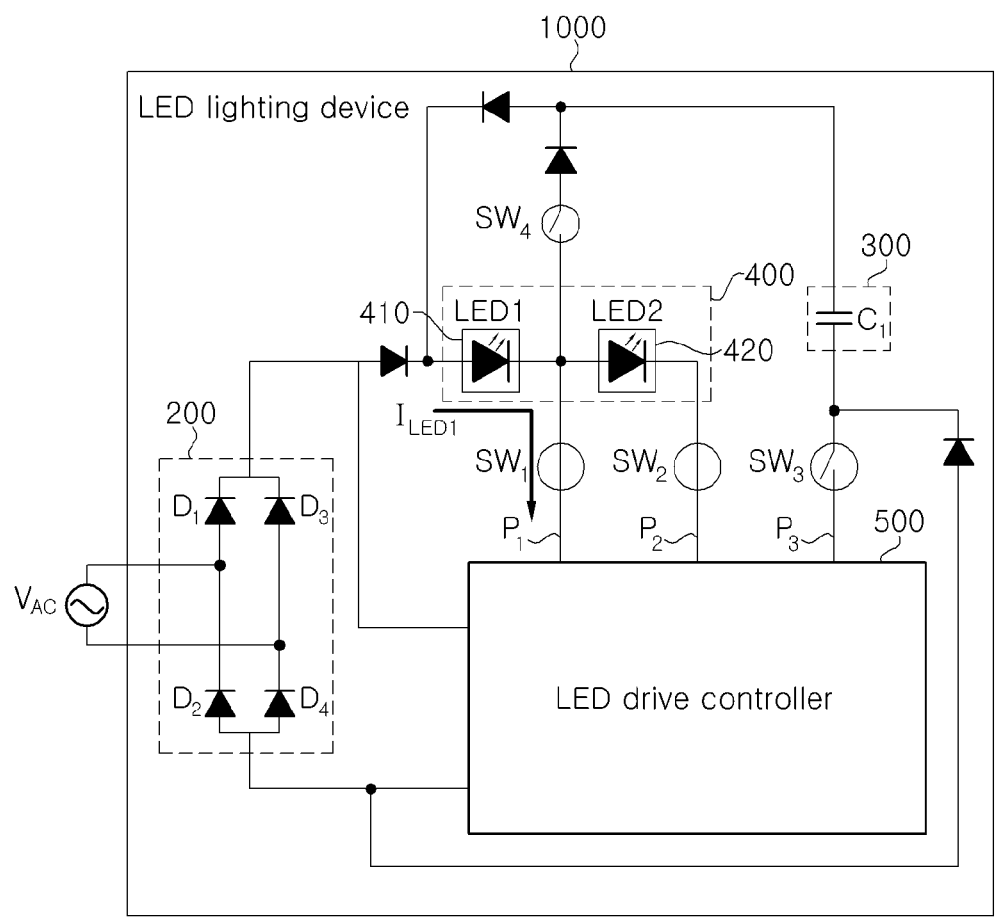
FIG. 8A to FIG. 8E are block diagrams showing switch control states in operation intervals and LED drive current of the LED lighting device shown in FIG. 7.

Specifically, in the first operation interval, the fourth switch SW4 is kept in a turned-off state, as shown in FIG. 8A. Thus, during the first operation interval, no current flows through the loop-back compensation unit 300.

Figure 8B:
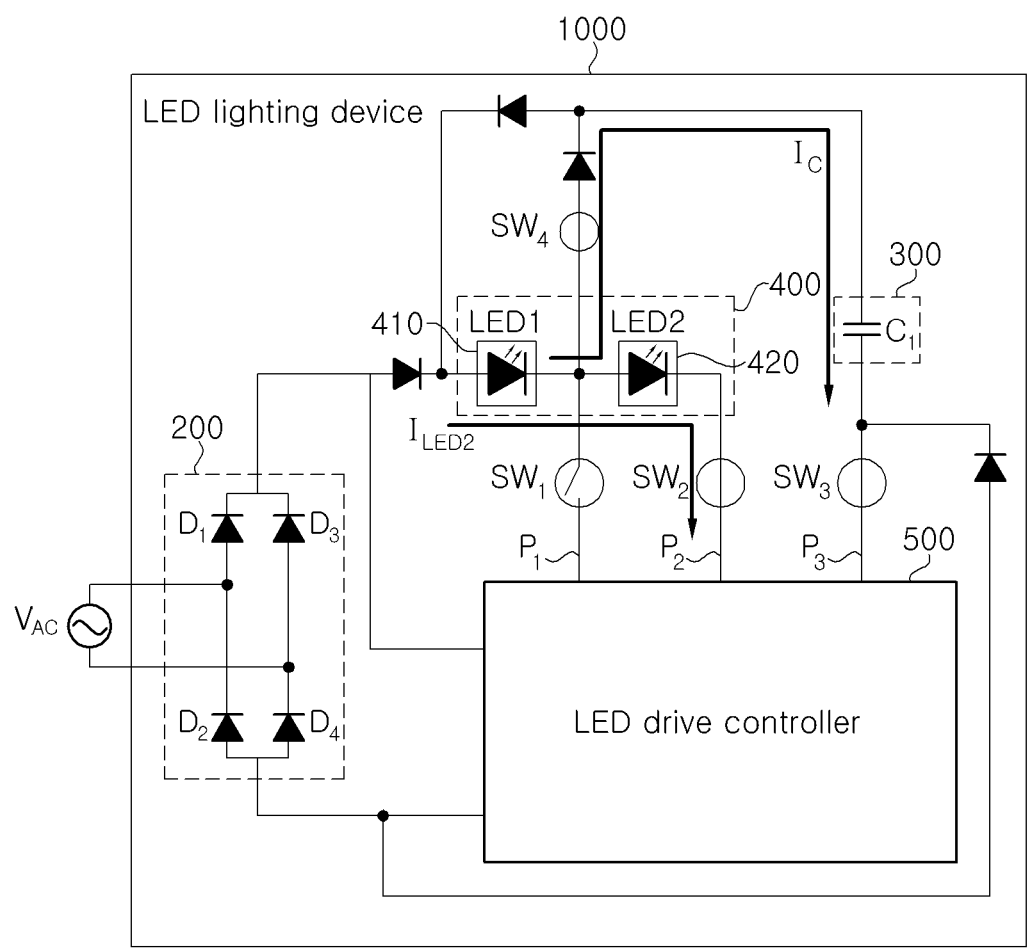

Next, as shown in FIG. 8B, upon entrance to the second operation interval, the fourth switch SW4 is turned on to connect a current path between the rectification unit 200 and the loop-back compensation unit 300 such that the charge current Ic can flow to the loop-back compensation unit 300 through the current path.

Figure 8C:
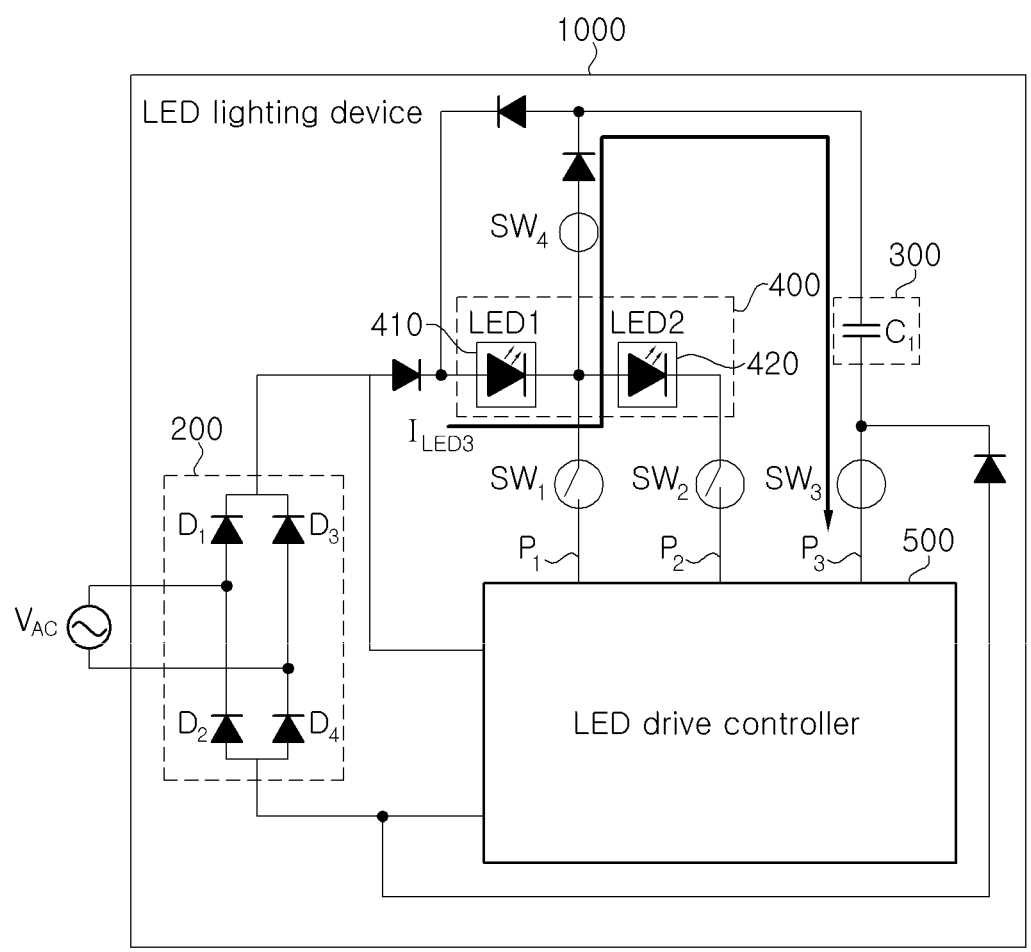

Next, as shown in FIG. 8C, upon entrance to the charge interval, the fourth switch SW4 is kept in a turned-on state to allow the loop-back compensation unit 300 to be continuously charged with the charge current Ic.

Next, upon entrance from the charge interval to the second operation interval, the fourth switch SW4 is kept in a turned-on state, as shown in FIG. 8B. Then, upon entrance from the second operation interval to the first operation interval, the fourth switch SW4 is turned off, as shown in FIG. 8A.

Figure 8D:
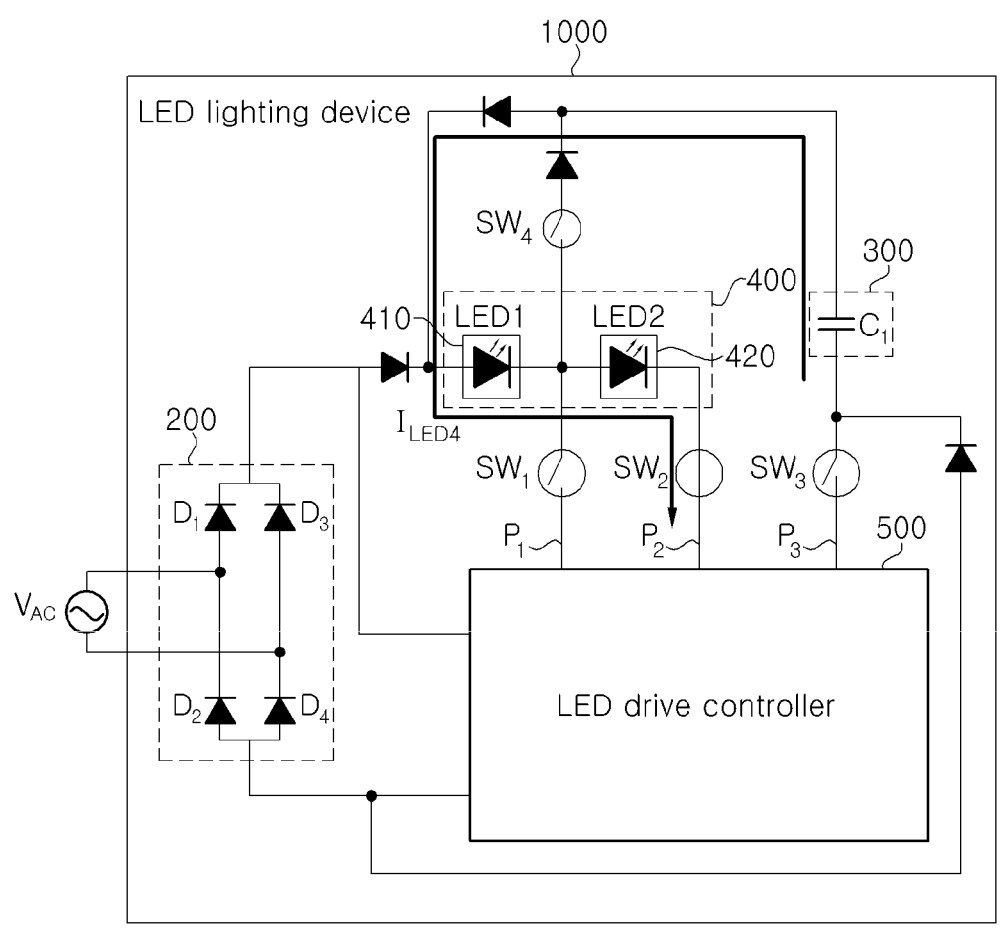
Figure 8E:
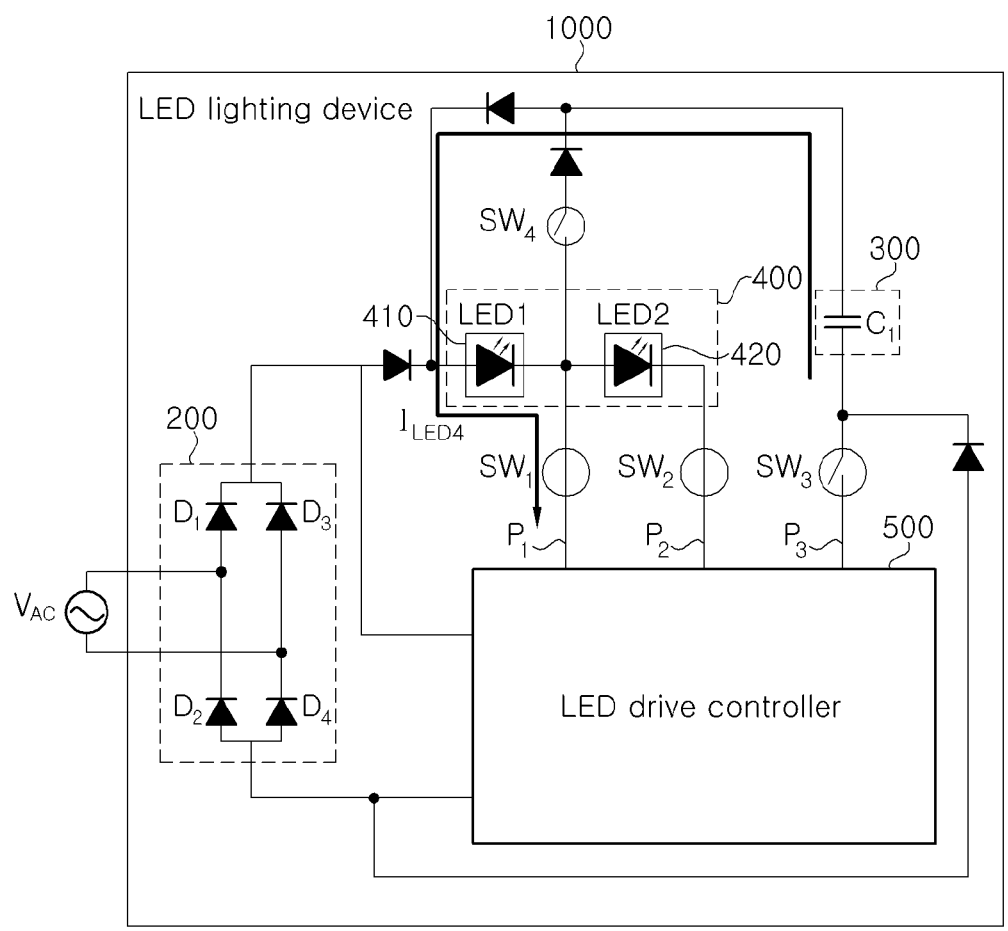

On the other hand, when the voltage level of the rectified voltage Vrec becomes less than the first forward voltage level Vf1, the LED lighting device 1000 according to the second exemplary embodiment enters the compensation interval. During the compensation interval, the fourth switch SW4 is kept in a turned-off state. FIG. 8D and FIG. 8E show control states of the first constant current switch SW1 to the fourth switch SW4 in the LED lighting device 1000 during the compensation interval.

It should be noted that, unlike the first exemplary embodiment, the loop-back compensation unit 300 according to the second exemplary embodiment is configured to compensate for both the second operation interval and the first operation interval. More specifically, when the voltage level of the rectified voltage Vrec becomes less than the first forward voltage level Vf1, the second drive voltage is supplied from the loop-back compensation unit 300 to the first LED group 410 and the second LED group 420 due to potential difference therebetween. Accordingly, as shown in FIG. 8D, the first constant current switch SW1 is turned off and the second constant current switch SW2 is kept in a turned-on state. In this case, a fourth LED drive current $I_{LED4}$ flows therethrough and becomes a preset current value through constant current control of the second constant current switch SW2. The fourth LED drive current $I_{LED4}$ may be set to the same value as the second LED drive current $I_{LED2}$.

Further, when the second drive voltage supplied from the loop-back compensation unit 300 decreases to a voltage level less than the second forward voltage level Vf2, the fourth LED drive current $I_{LED4}$ decreases to a voltage level less than the preset current value and the LED drive controller 500 turns on the first constant current switch SW1. Accordingly, in this interval, only the first LED group 410 emits light and a fifth LED drive current $I_{LED5}$ flowing therethrough becomes a preset current value through constant current control of the first constant current switch SW1. The fifth LED drive current $I_{LED5}$ may be set to the same value as the first LED drive current $I_{LED1}$.

When the voltage level of the rectified voltage Vrec increases again and reaches the first forward voltage level Vf1, the LED lighting device 1000 becomes the state as shown in FIG. 8A. As described above, since the control states of the constant current switches in the last compensation interval are the same as those of the constant current switches in the first operation interval, there is no need for separate control of constant current switches.

Configuration and Function of Third Exemplary Embodiment of LED Lighting Device 1000

Figure 9:
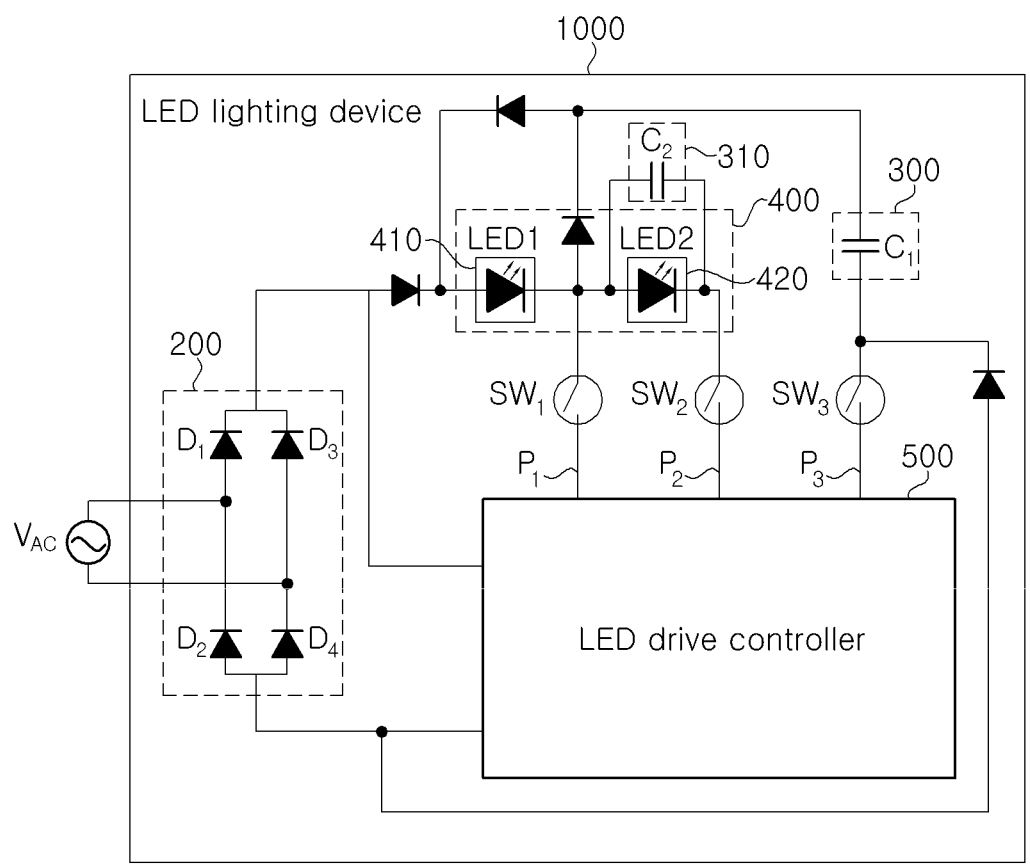
FIG. 9 is a schematic block diagram of an LED lighting device according to a third exemplary embodiment of the disclosure.

FIG. 9 is a schematic block diagram of an LED lighting device according to a third exemplary embodiment of the disclosure. Referring to FIG. 9, the configuration and functions of the LED lighting device 1000 according to the third exemplary embodiment will be described in detail.

Referring to FIG. 9, the LED lighting device 1000 according to the third exemplary embodiment is similar to the LED lighting device 1000 according to the first exemplary embodiment shown in FIG. 4 excluding a second compensation unit 310 arranged parallel to the second LED group 420. Thus, repeated components and functions of the LED lighting device 1000 according to the third exemplary embodiment will be described with reference to the description of the first exemplary embodiment shown in FIG. 4 and the following description will focus on the features of the third exemplary embodiment different from those of the first exemplary embodiment the first exemplary embodiment.

Referring to FIG. 9, the second compensation unit 310 according to this exemplary embodiment may be realized by a second capacitor C2, but is not limited thereto. It should be understood that the second compensation unit 310 may be realized by various electrical charge/discharge devices and/or charge/discharge circuits. The second compensation unit 310 is charged in the second operation interval as described above, and is configured to supply the second drive voltage to the second LED group 420 in other operation intervals (that is, operation intervals in which the second LED group 420 is turned off). Thus, in the third exemplary embodiment as shown in FIG. 9, the first LED group 410 and the second LED group 420 can be kept in a turned-on state substantially over all intervals of the rectified voltage Vrec.

Configuration and Function of Fourth Exemplary Embodiment of LED Lighting Device 1000

Figure 10:
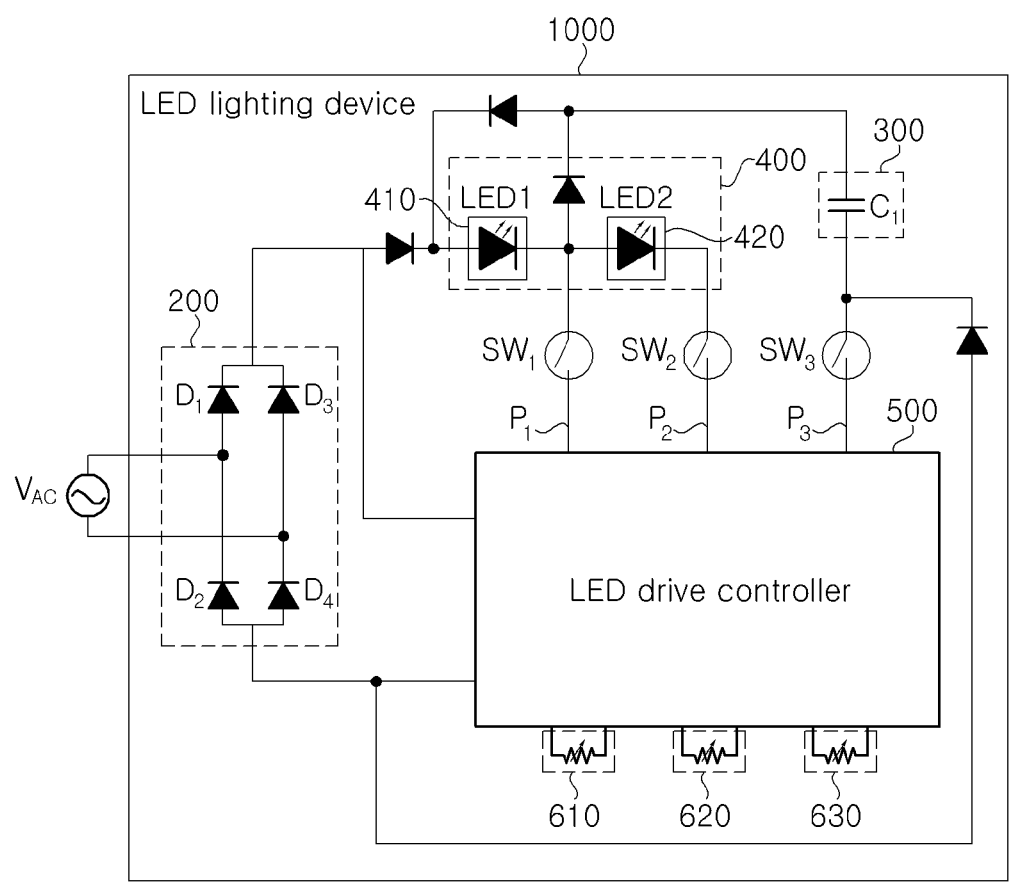
FIG. 10 is a schematic block diagram of an LED lighting device according to a fourth exemplary embodiment of the disclosure.

FIG. 10 is a schematic block diagram of an LED lighting device according to a fourth exemplary embodiment of the disclosure. Referring to FIG. 10, the configuration and functions of the LED lighting device 1000 according to the fourth exemplary embodiment will be described in detail.

Referring to FIG. 10, the LED lighting device 1000 according to the fourth exemplary embodiment may further include a first LED drive current setting unit 610 configured to set the first LED drive current $I_{LED1}$ to a desired current value, a second LED drive current setting unit 620 configured to set the second LED drive current $I_{LED2}$ to a desired current value, and a third LED drive current setting unit 630 configured to set the third LED drive current $I_{LED3}$ to a desired current value. Except for these features, the LED lighting device 1000 according to the fourth exemplary embodiment is similar to the LED lighting device 1000 according to the first exemplary embodiment shown in FIG. 4. Thus, repeated components and functions of the LED lighting device 1000 according to the fourth exemplary embodiment will be described with reference to the description of the first exemplary embodiment shown in FIG. 4 and the following description will focus on the features of the fourth exemplary embodiment different from those of the first exemplary embodiment the first exemplary embodiment.

Figure 3:
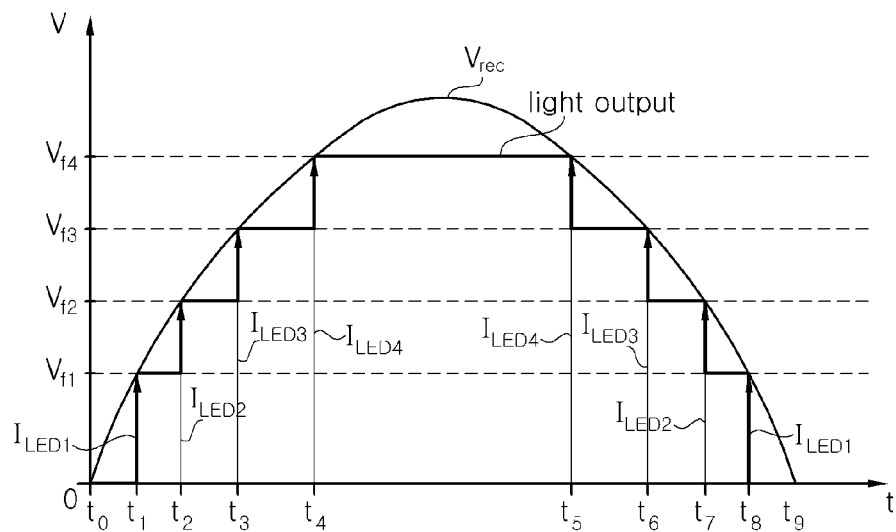
FIG. 3 is a waveform graph of a relationship between drive voltage and LED drive current of the conventional four-stage sequential driving type LED lighting device shown in FIG. 2.

The conventional LED lighting device 1000 described with reference to FIG. 2 and FIG. 3 has a problem in that the first LED drive current $I_{LED1}$, the second LED drive current $I_{LED2}$, the third LED drive current $I_{LED3}$, and the fourth LED drive current $I_{LED4}$ cannot be independently set. Namely, since the conventional LED lighting device 1000 is configured to control the LED drive current $I_{LED}$ in a stepwise wave shape in each operation interval, one LED drive current value (for example, the fourth LED drive current $I_{LED4}$) is set and other LED drive current values are set in preset ratios with respect to the preset LED drive current value, respectively. For example, the third LED drive current $I_{LED3}$ is set to 80% to 95% of the fourth LED drive current $I_{LED4}$, the second LED drive current $I_{LED2}$ is set to 65% to 80% of the fourth LED drive current $I_{LED4}$, and the first LED drive current $I_{LED1}$ is set to 30% to 65% of the fourth LED drive current $I_{LED4}$. However, such a conventional LED lighting device 1000 has a problem in that the LED drive current $I_{LED}$ cannot be independently set, and particularly, in that it is more difficult to arbitrarily set the LED drive current for each of the operation intervals than adjustment of the LED drive current in a preset ratio as described above in order to improve flicker performance. Thus, the LED lighting device 1000 according to the fourth exemplary embodiment includes the first LED drive current setting unit 610, the second LED drive current setting unit 620, and the third LED drive current setting unit 630 in order to allow the LED drive current $I_{LED}$ to be independently set, as needed. Although the first LED drive current setting unit 610, the second LED drive current setting unit 620, and the third LED drive current setting unit 630 are shown as variable resistors in FIG. 10, it will be apparent to those skilled in the art that the drive current setting units may be realized by other suitable devices (for example, capacitors) or suitable circuits.

Configuration and Function of Fifth Exemplary Embodiment of LED Lighting Device 1000

Figure 12A:
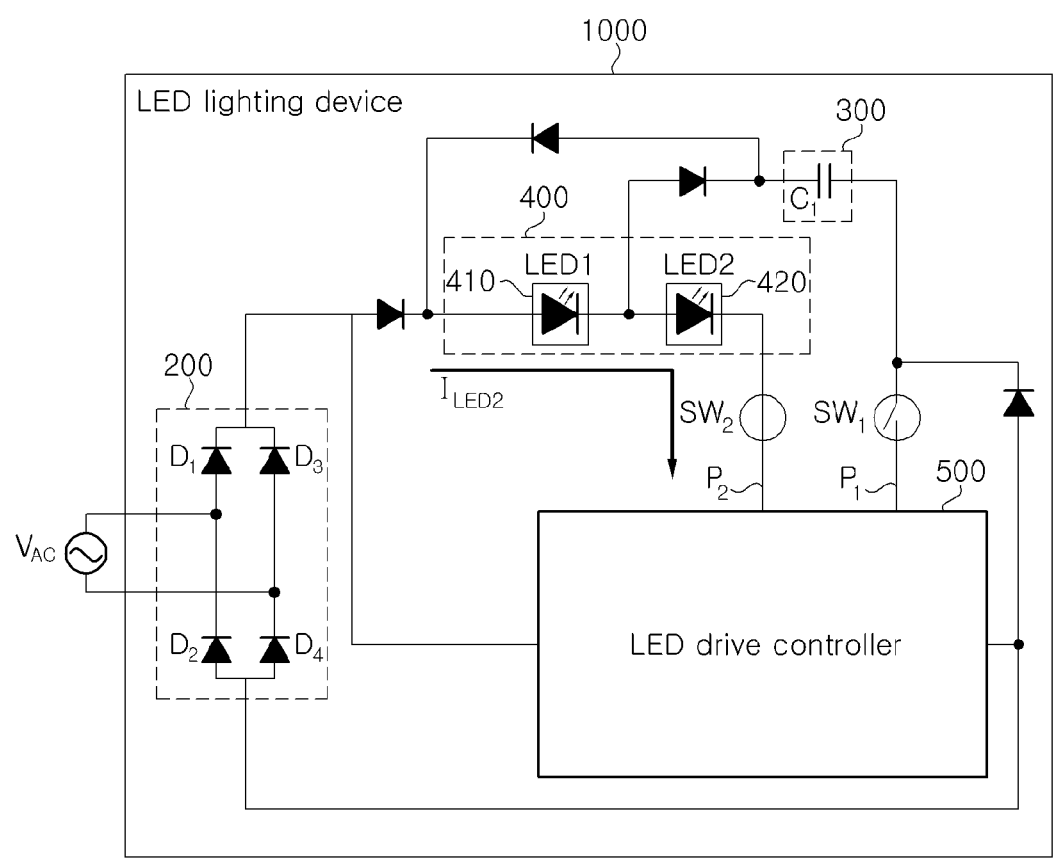
FIG. 12A to FIG. 12C are block diagrams showing switch control states in operation intervals and LED drive current of the LED lighting device shown in FIG. 11.
Figure 12B:
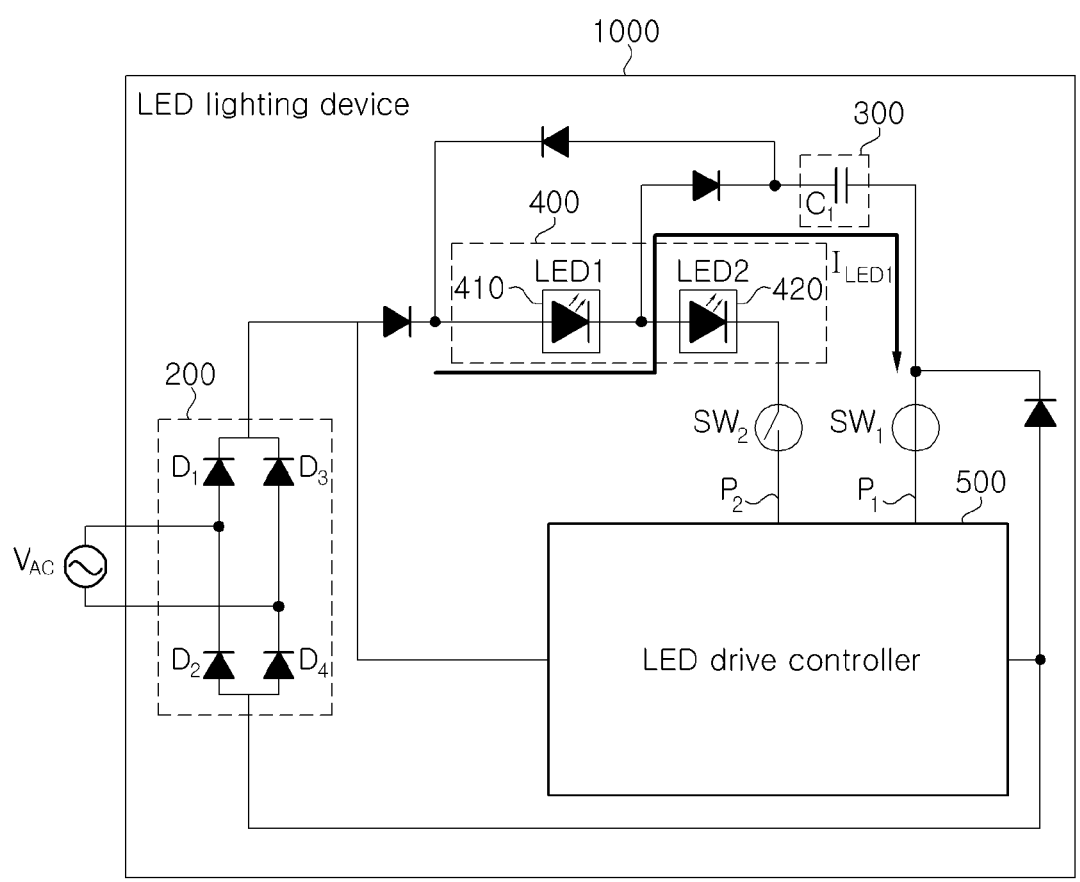
Figure 12C:
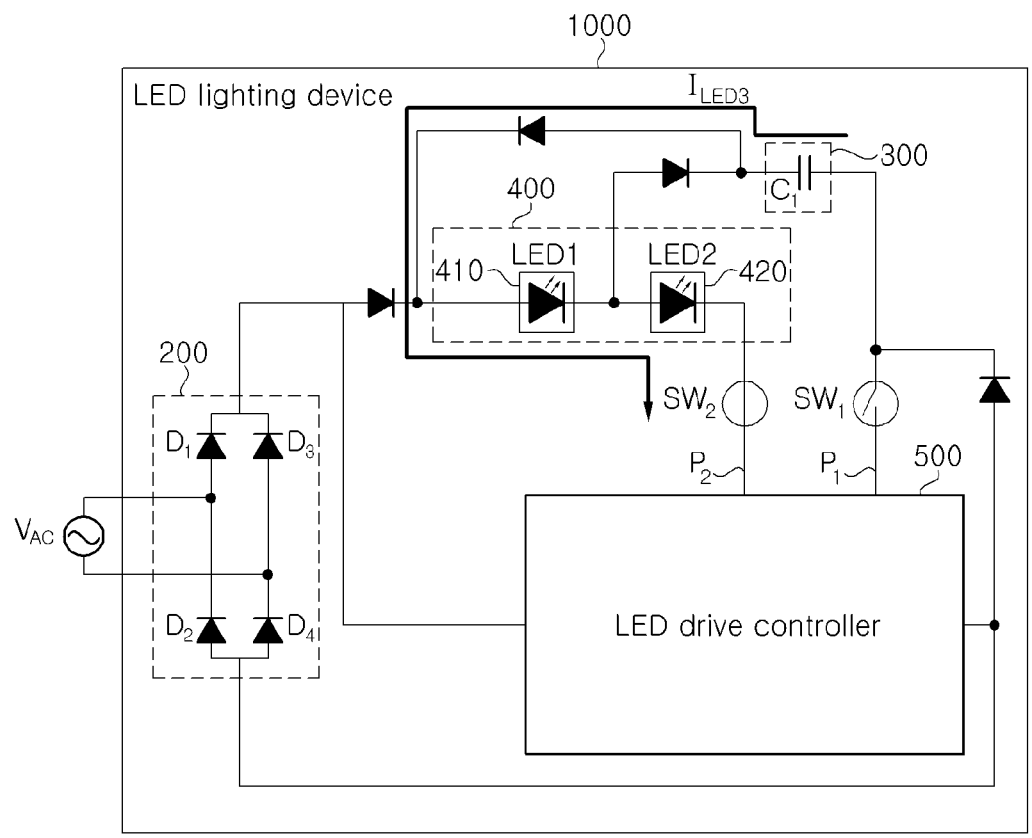

FIG. 11 is a schematic block diagram of an LED lighting device according to a fifth exemplary embodiment of the disclosure and FIG. 12A to FIG. 12C are block diagrams showing switch control states in operation intervals and LED drive current of the LED lighting device shown in FIG. 11. In addition, FIG. 13 shows waveform diagrams depicting time-related variation in rectified voltage, LED drive current, input current, and light output from an LED light emitting unit of the LED lighting device shown in FIG. 11. Hereinafter, the configuration and functions of the LED lighting device 1000 according to the fifth exemplary embodiment will be described in detail with reference to FIG. 11 to FIG. 13.

First, the LED lighting device 1000 according to the fifth exemplary embodiment is similar to the LED lighting devices 1000 according to the first to fourth exemplary embodiments in that the LED lighting device 1000 according to the fifth exemplary embodiment is also operated in two stages, but is different therefrom in that the LED lighting device 1000 according to the fifth exemplary embodiment is operated by modified sequential driving instead of sequential driving. Fundamentally, "sequential driving" means a driving method in which operation intervals are changed in order of the "first stage operation interval (discharge interval)→first stage operation interval (non-compensation interval)→second stage operation interval is (charge interval)→first stage operation interval (non-compensation interval)→first stage operation interval (discharge interval)" depending upon the voltage level of the rectified voltage Vrec in one cycle of the rectified voltage Vrec. Conversely, the LED lighting device 1000 according to the fifth exemplary embodiment is configured to allow the operation intervals to be changed in order of the "second stage operation interval (discharge interval)→second stage operation interval (non-compensation interval)→first stage operation interval (charge interval)→second stage operation interval (non-compensation interval)→second stage operation interval (discharge interval)" depending upon the voltage level of the rectified voltage Vrec in one cycle of the rectified voltage Vrec, and this driving method is referred to as the modified sequential driving method. Namely, more LED groups are turned on to emit light in an interval of a lower voltage level and fewer LED groups are turned on to emit light in an interval of a higher voltage level while the loop-back compensation unit 300 is charged. Further, in this exemplary embodiment, a charge interval entrance voltage level (Vcharge), which is a reference for entrance to and leaving the charge interval, is higher than the second forward voltage level Vf2. Furthermore, in this exemplary embodiment, the loop-back compensation unit 300 is selected to perform compensation for the second forward voltage level. Namely, capacitance of the loop-back compensation unit 300 is determined so as to supply the second drive voltage to the first LED group 410 and the second LED group 420 during the compensation interval.

For the LED lighting device 1000 according to the fifth exemplary embodiment to perform the functions as described above, the loop-back compensation unit 300 is disposed between a node between the first LED group 410 and the second LED group 420 and the first constant current switch SW1 to be charged during the first stage operation interval and to supply the third LED drive current $I_{LED3}$ to the first LED group 410 and the second LED group 420 during the non-compensation interval, as shown in FIG. 11.

Further, in order to perform the functions as described above, the LED drive controller 500 according to the fifth exemplary embodiment controls the first constant current switch SW1 and the second constant current switch SW2 depending upon the voltage level of the rectified voltage Vrec to allow modified sequential driving of the first LED group 410 and the second LED group 420. Such a control procedure of the first constant current switch SW1 and the second constant current switch SW2 can be performed through drive voltage detection or drive current detection as described above. Hereinafter, driving control of the LED lighting device 1000 according to the fifth exemplary embodiment will be described in detail with reference to FIG. 12A to FIG. 12C, and FIG. 13.

First, as shown in FIG. 12A, when the LED lighting device 1000 according to the fifth exemplary embodiment starts to operate, the second constant current switch SW2 is in a turned-on state and the first constant current switch SW1 is in a turned-off state. Upon operation of the LED lighting device 1000, the LED drive current does not flow therein before the voltage level of the rectified voltage Vrec reaches the second forward voltage level Vf2, and when the voltage level of the rectified voltage Vrec reaches the second forward voltage level Vf2 (at t1), the second LED drive current $I_{LED2}$ flows through the second current path P2, as shown in FIG. 13. This state is shown in FIG. 12A. Here, the LED drive current $I_{LED}$ flowing through the first LED group 410 and the second LED group 420 becomes a preset second LED drive current $I_{LED2}$ through constant current control of the second constant current switch SW2.

Then, as shown in FIG. 13, when the voltage level of the rectified voltage Vrec increases and reaches the charge interval entrance voltage level Vcharge (at t2), the LED drive controller 500 turns off second constant current switch SW2 while turning on the first constant current switch SW1, thereby entering the charge interval. Herein, the charge interval entrance voltage level Vcharge means a critical voltage level at which the charge current Ic starts to flow, with the first LED group 410 connected to the loop-back compensation unit 300 in series. This state is shown in FIG. 12B. As shown in FIG. 12B, since the second constant current switch SW2 is in a turned-off state in the charge interval, the first LED drive current $I_{LED1}$ flows through the first LED group 410 and the loop-back compensation unit 300 via the first current path P1. Thus, in the charge interval, only the first LED group 410 emits light and the second LED group 420 is turned off. The LED drive controller 500 continues to detect the first LED drive current $I_{LED1}$ flowing through the first current path P1 during the charge interval and controls the first LED drive current $I_{LED1}$ to become a preset first LED drive current $I_{LED1}$ through constant current control.

On the other hand, during the first operation interval, since only the first LED group 410 emits light, the number of LEDs turned on to emit light is smaller in the first operation interval than in the second operation interval. Accordingly, in order to maintain a substantially constant light output of the LED light emitting unit 400 in the first operation interval and in the second operation interval, the second LED drive current $I_{LED2}$ may be set to a current value less than the first LED drive current $I_{LED1}$ More preferably, the relationship between the second LED drive current $I_{LED2}$ and the first LED drive current $I_{LED1}$ is set to be inversely proportional to the number of LEDs turned on to emit light in the operation intervals so as to provide substantially the same light output in the operation intervals. Accordingly, as can be seen from FIG. 13 at waveform (e), constant light output from the LED lighting device 1000 can be maintain over all intervals.

Referring to FIG. 13, when the rectified voltage Vrec gradually decreases from the highest voltage level to a voltage level less than the charge interval entrance voltage level Vcharge (at t3), the LED drive controller 500 determines that the LED light emitting unit leaves the charge interval (that is, first operation interval), and controls the first constant current switch SW1 and the second constant current switch SW2 to become the state as shown in FIG. 12A and returns to the second operation interval. Namely, the LED drive controller 500 turns off the first constant current switch SW1 and turns on the second constant current switch SW2.

Referring to FIG. 13, when the rectified voltage Vrec decreases to a voltage level less than the second forward voltage level Vf2 (at t4), the LED drive controller 500 controls the first constant current switch SW1 and the second constant current switch SW2 to become the state as shown in FIG. 12C and enters the compensation interval. As can be seen from comparison of FIG. 12A with FIG. 12C, the control states of the constant current switches shown in FIG. 12A are the same as those of the constant current switches shown in FIG. 12C. Accordingly, substantial control of the constant current switches may not occur and the second drive voltage can be naturally supplied from the loop-back compensation unit 300 to the first LED group 410 and the second LED group 420 via a discharge path due to potential difference therebetween. Thus, during the compensation interval, the second drive voltage can be supplied from the loop-back compensation unit 300 to the first LED group 410 and the second LED group 420, whereby the third LED drive current $I_{LED3}$ flows through the second current path, and the first LED group 410 and the second LED group 420 are kept in a turned-on state. Here, the third LED drive current $I_{LED3}$ may be substantially the same as the second LED drive current $I_{LED2}$.

As described above, in the LED lighting device 1000 according to the fifth exemplary embodiment, during one cycle of the rectified voltage Vrec after initial operation, the control procedures of the "second stage operation interval (discharge interval)→second stage operation interval (non-compensation interval)→first stage operation interval (charge interval)→second stage operation interval (non-compensation interval)→second stage operation interval (discharge interval)" are sequentially performed, and such control procedures are periodically repeated in each cycle of the rectified voltage Vrec.

As compared with the LED lighting devices according to the first to fourth exemplary embodiments, the LED lighting device 1000 according to the fifth exemplary embodiment as described above can achieve (i) improvement in light uniformity by allowing all of the LED groups to emit light in the compensation interval, (ii) improvement in electrical characteristics (power factor, total harmonic distortion, and the like), and (iii) reduction in the number of constant current switches to facilitate circuit design and to reduce manufacturing costs.

Configuration and Function of Sixth Exemplary Embodiment of LED Lighting Device 1000

Figure 14:
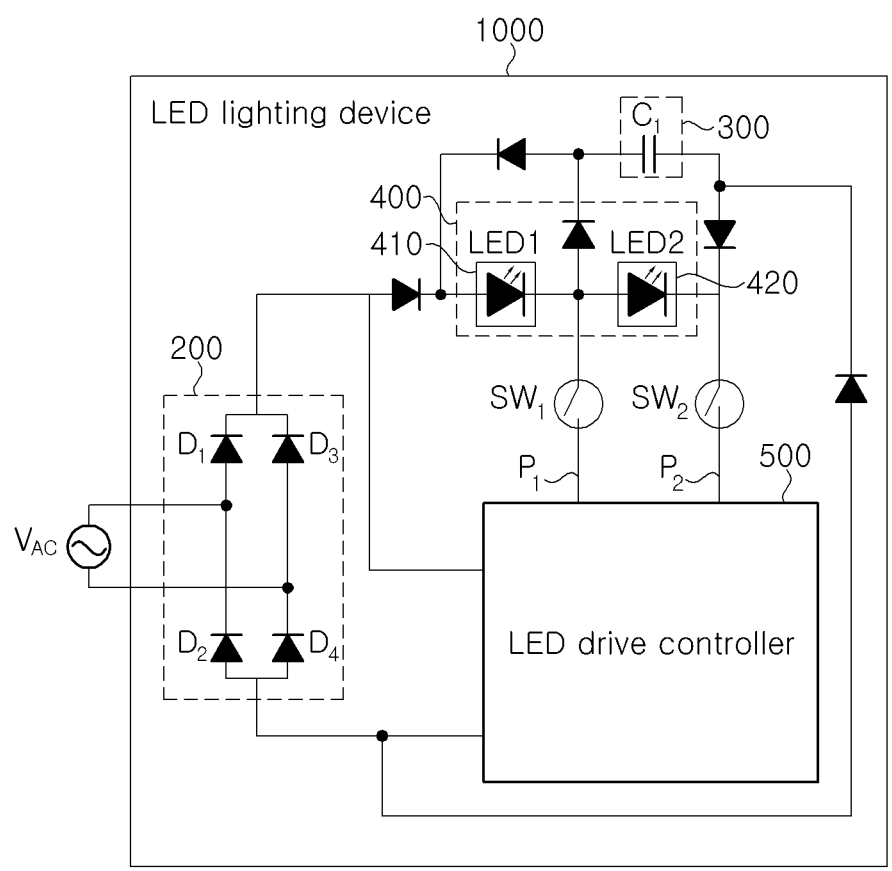
FIG. 14 is a schematic block diagram of an LED lighting device according to a sixth exemplary embodiment of the disclosure.

FIG. 14 is a schematic block diagram of an LED lighting device with improved flicker performance (hereinafter, "LED lighting device") according to a sixth exemplary embodiment of the disclosure. Hereinafter, the configuration and functions of the LED lighting device 1000 according to the sixth exemplary embodiment will be described in brief with reference to FIG. 14.

The LED lighting apparatus 1000 shown in FIG. 14 is generally similar to the LED lighting apparatus 1000 according to the first exemplary embodiment shown in FIG. 4 except that the loop-back compensation unit 300 according to the sixth exemplary embodiment is connected at the other end thereof to the LED drive controller 500 through an $n^{th}$ constant current switch (for example, a second constant current switch SW2 shown in FIG. 14) together with a cathode of an $n^{th}$ LED group (for example, a second LED group 420 shown in FIG. 14), instead of a separate constant current switch (for example, the third constant current switch SW3 shown in FIG. 4). Thus, repeated components and functions of the LED lighting device 1000 according to the sixth exemplary embodiment will be described with reference to the description of the first exemplary embodiment shown in FIG. 4 and the following description will focus on the features of the sixth exemplary embodiment different from those of the first exemplary embodiment.

First, referring to FIG. 14, the LED lighting device 1000 according to this exemplary embodiment includes a rectification unit 200, a loop-back compensation unit 300, an LED light emitting unit 400, and an LED drive controller 500. Among these components, the loop-back compensation unit 300 and the LED drive controller 500 may constitute an LED drive circuit.

First, as in the first exemplary embodiment, although the LED light emitting unit 400 according to the sixth exemplary embodiment is illustrated as including a first LED group 410 and a second LED group 420 in FIG. 14, it will be apparent to those skilled in the art that the number of LED groups included in the LED light emitting unit 400 can be changed, as needed. In the following, for convenience of description and understanding, the LED light emitting unit 400 according to the sixth exemplary embodiment will be illustrated as being composed of two LED groups, without being limited thereto. In addition, in this exemplary embodiment, the first LED group 410 is designed to have a forward voltage level that allows the first LED group 410 to be driven by a second drive voltage supplied from the loop-back compensation unit 300 in the compensation interval. In this exemplary embodiment, the first LED group 410 may be configured such that a peak value Vrec peak of the rectified voltage is two or more times the forward voltage level of the first LED group 410. With such design, the first LED group 410 is kept in a turned-on state in an overall cycle of AC voltage $V_{AC}$.

The loop-back compensation unit 300 is configured to be charged with energy using the rectified voltage Vrec in the charge interval and to supply the second drive voltage to the LED light emitting unit 400 in the compensation interval. In FIG. 14, the loop-back compensation unit 300 according to this exemplary embodiment is connected to the second LED group 420 in parallel and is charged during the second operation interval. More specifically, as shown in FIG. 14, the loop-back compensation unit 300 is connected at one thereof to a node between the first LED group 410 and the second LED group 420 (that is, to a cathode of the first LED group 410) through a charge path and to an anode of the first LED group 410 through a discharge path. The loop-back compensation unit 300 is connected at the other end thereof to the second constant current switch SW2 together with a cathode of the second LED group 420. In other exemplary embodiments, the one end of the loop-back compensation unit 300 may be connected to an anode of another LED group. For example, in an exemplary embodiment wherein the LED light emitting unit 400 is composed of four LED groups, the loop-back compensation unit 300 may be connected at one end thereof to an anode of the second LED group. In this exemplary embodiment, the loop-back compensation unit 300 is configured to supply the second drive voltage to the second LED group (or to the second and third LED groups) in the compensation interval. The following description will be given with reference to the exemplary embodiment wherein the loop-back compensation unit 300 is connected at one end thereof to the anode of the first LED group 410 to supply the second drive voltage to the first LED group 410 in the compensation interval.

As such, since the loop-back compensation unit 300 is connected at one end thereof to the cathode of the first LED group 410 through the charge path, the loop-back compensation unit 300 is charged in the second operation interval (that is, an interval in which the voltage level of the rectified voltage Vrec is higher than or equal to the second forward voltage level Vf2), and since the loop-back compensation unit 300 is connected at the one end thereof to the anode of the first LED group 410 through the discharge path, the loop-back compensation unit 300 is discharged in the non-luminous interval (that is, an interval in which the voltage level of the rectified voltage Vrec is less than the first forward voltage level Vf1) to supply the second drive voltage to the first LED group 410. Namely, in the sixth exemplary embodiment, the loop-back compensation unit 300 can be charged in an operation interval of LED group(s) to which the loop-back compensation unit 300 is connected in parallel, and can supply the second drive current to LED group(s), which acts as a compensation target. Accordingly, it is desirable that the forward voltage level of the LED group(s) to which the loop-back compensation unit 300 is connected in parallel be higher than or equal to the forward voltage level of the LED group(s) to which the second drive voltage is supplied. Namely, in the sixth exemplary embodiment shown in FIG. 14, it is desirable that the forward voltage level of the first LED group 410 be less than or equal to that of the second LED group 420. However, it should be understood that other implementations are also possible. In an exemplary embodiment wherein the LED lighting device 1000 includes four LED groups composed of a first LED group 410 to a fourth LED group (not shown), the loop-back compensation unit 300 may be connected to the fourth LED group in parallel to be charged in a fourth operation interval (that is, an interval in which the voltage level of the rectified voltage Vrec is higher than or equal to the fourth forward voltage level Vf4). Likewise, in exemplary embodiments wherein the LED lighting device 1000 includes n LED groups composed of a first LED group 410 to an $n^{th}$ LED group (not shown), the loop-back compensation unit 300 may be connected to the $n^{th}$ LED group in parallel to be charged in an $n^{th}$ operation interval (that is, an interval in which the voltage level of the rectified voltage Vrec is higher than or equal to an $n^{th}$ forward voltage level Vfn).

Further, the forward voltage level compensated by the look-back compensation unit 300 according to this exemplary embodiment may be set in various ways according to capacitance of charge/discharge devices (for example, the first capacitor C1 of FIG. 14), which constitute the look-back compensation unit 300. In one exemplary embodiment, the look-back compensation unit 300 may be configured to compensate for a voltage level corresponding to ½ of the total forward voltage level (the sum of forward voltage levels of the LED groups). Thus, in the exemplary embodiments wherein the forward voltage level of the first LED group 410 is less than or equal to that of the second LED group 420, the look-back compensation unit 300 may supply a voltage of the first forward voltage level Vf1 in the compensation interval. In this case, as described above, the first LED group 410 is kept in a turned-on state regardless of cycles of AC power.

In addition, each of the first and second constant current switches SW1, SW2 is configured to be turned on or off so as to connect or disconnect a current path under control of the LED drive controller 500, and to detect the LED drive current $I_{LED}$ flowing through the connected current path in order to control the LED drive current $I_{LED}$ to a preset constant current value through constant current control.

Referring to FIG. 14 again, the LED drive controller 500 according to this exemplary embodiment is configured to detect the LED drive current $I_{LED}$ and to control sequential driving of the first LED group 410 and the second LED group 420 by controlling the first and second constant current switches SW1, SW2 based on the detected LED drive current $I_{LED}$. Details of such functions of the LED drive controller 500 will now be described with reference to FIG. 15 and FIG. 16.

Figure 15A:
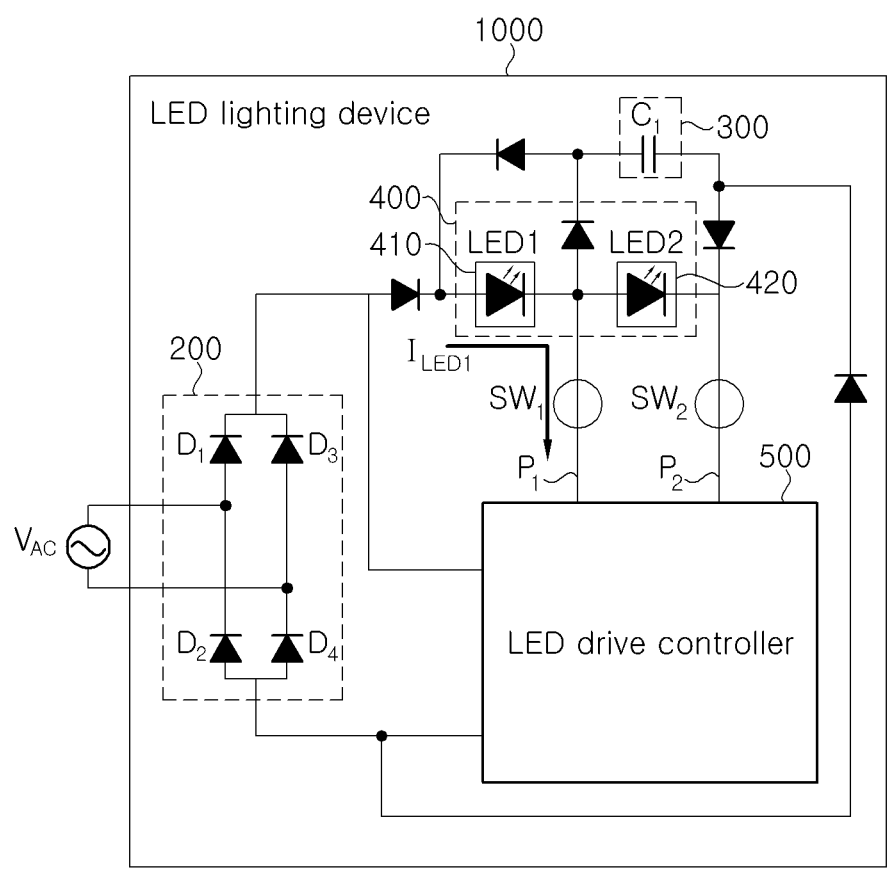
FIG. 15A to FIG. 15C are block diagrams showing switch control states in operation intervals and LED drive current of the LED lighting device shown in FIG. 14.
Figure 15B:
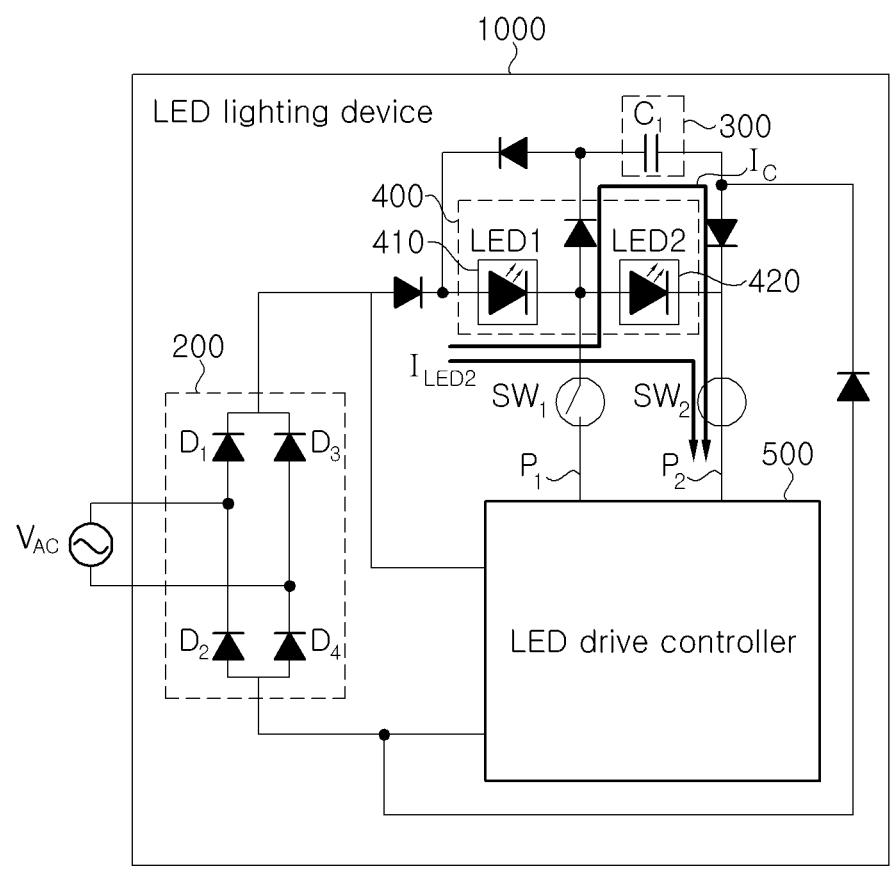
Figure 15C:
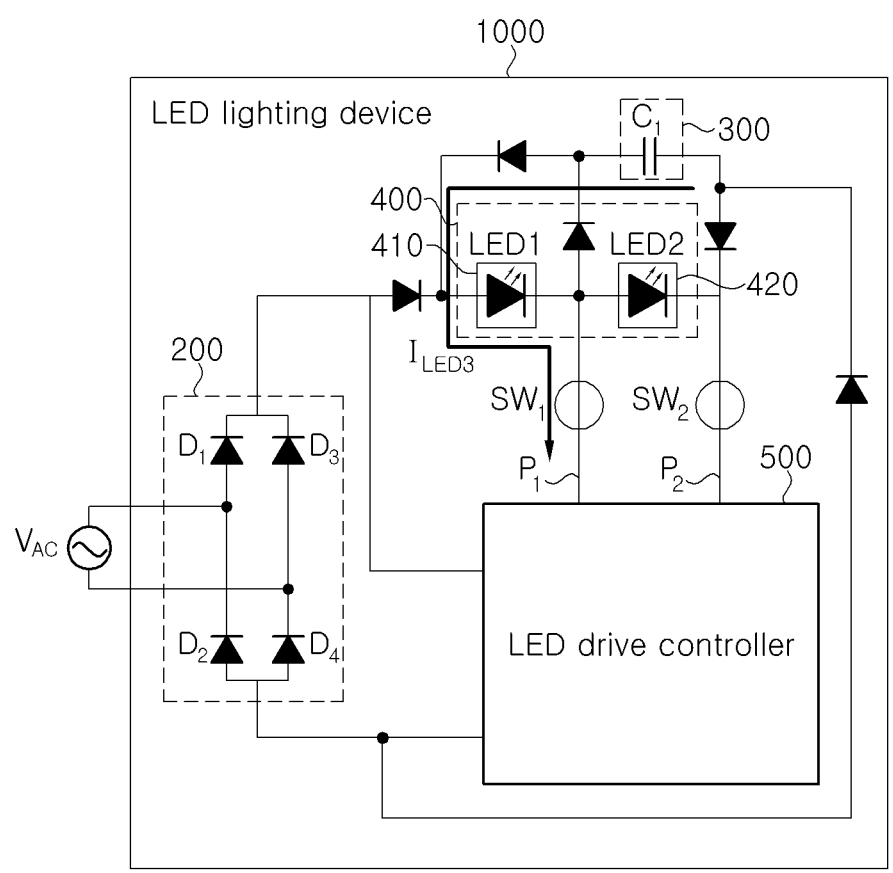

FIG. 15A to FIG. 15C are block diagrams showing switch control states in operation intervals and LED drive current of the LED lighting device shown in FIG. 14. Hereinafter, operation of the LED lighting device 1000 according to the sixth exemplary embodiment shown in FIG. 14 will be described in detail with reference to FIG. 15A to FIG. 15C.

First, FIG. 15A shows a relationship between switch control states of the first constant current switch SW1 and the second constant current switch SW2 and the LED drive current $I_{LED}$ in the first operation interval. Referring to FIG. 15A, in the first operation interval, the first constant current switch SW1 and the second constant current switch SW2 are in a turned-on state. In the LED lighting device 1000 according to this exemplary embodiment, the LED drive current $I_{LED}$ flows through the first LED group 410 such that the first LED group 410 is turned on, when the voltage level of the drive voltage (the first drive voltage (rectified voltage Vrec) supplied from the rectification unit 200 in the non-compensation interval, and the second drive voltage supplied from the loop-back compensation unit 300 in the compensation interval) supplied to the LED light emitting unit 400 is higher than or equal to the forward voltage level of the first LED group 410, that is, the first forward voltage level Vf1. Here, the LED drive current $I_{LED}$ flowing through the first LED group 410 becomes a preset first LED drive current $I_{LED}$ through constant current control of the first constant current switch SW1.

Next, FIG. 15B shows a relationship between switch control states of the first constant current switch SW1 and the second constant current switch SW2 and the LED drive current $I_{LED}$ in the second operation interval. The LED drive current $I_{LED}$ also flows through the second LED group 420 such that the second LED group 420 is also turned on, when the drive voltage supplied to the LED light emitting unit 400 increases from the state shown in FIG. 15A and reaches the sum of the forward voltage levels of the first LED group 410 and the second LED group 420, that is, the second forward voltage level Vf2. In this interval, the second constant current switch SW2 connecting the second LED group 420 to the LED drive controller 500 through the second current path P2 is in a turned-on state, whereby the LED drive current $I_{LED}$ flowing through the second constant current switch SW2 can be detected. The LED drive controller 500 detects the LED drive current $I_{LED}$ flowing through the second constant current switch SW2 and determines whether the LED drive current $I_{LED}$ flowing through the second constant current switch SW2 is maintained in a normal constant current state after a transient state (in which current increases and/or decreases). When the LED drive current $I_{LED}$ flowing through the second constant current switch SW2 is maintained at the normal constant current, that is, when the LED drive current $I_{LED}$ flowing through the second constant current switch SW2 is stably maintained at a preset second LED drive current $I_{LED2}$, the LED drive controller 500 determines that the drive voltage supplied to the LED light emitting unit 400 is sufficient to drive the first LED group 410 and the second LED group 420, and turns off the first constant current switch SW1 to enter the second operation interval. The relationship between the switch control states of the first and second constant current switches SW1, SW2 and the LED drive current $I_{LED}$ in the second operation interval is shown in FIG. 15B.

On the other hand, in the state shown in FIG. 15B, that is, during the second operation interval, although both the first LED group 410 and the second LED group 420 are turned on to emit light, the LED drive current flowing through the first LED group 410 is different from the LED drive current flowing through the second LED group 420. First, in the second operation interval, an input current $I_{in}$ supplied from the rectification unit 200 to the LED light emitting unit 400 flows through the first LED group 410. However, as shown in FIG. 15B, after the input current $I_{in}$ passes through the first LED group 410, the input current $I_{in}$ is divided into a charge current $I_c$ and the second LED drive current $I_{LED2}$. The charge current $I_c$ is supplied to the loop-back compensation unit 300 to charge the loop-back compensation unit 300 and the second LED drive current $I_{LED2}$ is supplied to the second LED group 420 to allow the second LED group 420 to emit light. Namely, the second LED drive current $I_{LED2}$ supplied to the second LED group 420 is a current value obtained by subtracting the charge current $I_c$ from the input current $I_{in}$. As a result, the LED lighting device 1000 according to this exemplary embodiment is configured to allow both the first LED group 410 and the second LED group 420 to emit light while allowing the loop-back compensation unit 300 to be charged in the second operation interval. Furthermore, in the second operation interval, light output of the second LED group 420 becomes less than the light output of the first LED group 410, thereby improving light output deviation.

Furthermore, in the second operation interval, the current may become a preset value corresponding to 'second LED drive current $I_{LED2}$+charge current $I_c$' through constant current control of the second constant current switch SW2. That is, the input current $I_{in}$ may become a preset value by the second constant current switch through constant current control.

On the other hand, during the second operation interval, since both the second LED group 420 and the first LED group 410 emit light, the number of LEDs turned on to emit light becomes greater in the second operation interval than in the first operation interval. Accordingly, in order to maintain a substantially constant light output of the LED light emitting unit 400 in the first operation interval and in the second operation interval, the second LED drive current $I_{LED2}$ may be set to a current value less than the first LED drive current $I_{LED1}$. More preferably, the relationship between the second LED drive current $I_{LED2}$ and the first LED drive is current $I_{LED1}$ is set to be inversely proportional to the number of LEDs turned on to emit light in the operation intervals so as to provide substantially the same light output in the operation intervals.

On the other hand, as the rectified voltage Vrec gradually decreases from the highest voltage level and the second LED drive current $I_{LED2}$ flowing through the second current path P2 becomes a preset value or less, the LED drive controller 500 controls the first and second constant current switches SW1, SW2 to become the state as shown in FIG. 15A and returns to the first operation interval. Namely, the LED drive controller 500 turns on the first constant current switch SW1. Accordingly, as described above, during the first operation interval, only the first LED group 410 emits light and the LED drive current $I_{LED}$ becomes the first LED drive current $I_{LED1}$ through constant current control.

Then, as the rectified voltage Vrec decreases to a voltage level less than the first forward voltage level Vf1, the LED drive controller 500 controls the first and second constant current switches SW1, SW2 to become the state as shown in FIG. 5C and enters the compensation interval. As can be seen from comparison of FIG. 15A with FIG. 15C, the control states of the constant current switches shown in FIG. 15A are the same as those of the constant current switches shown in FIG. 15C. Accordingly, substantial control of the constant current switches may not occur and the second drive voltage can be naturally supplied from the loop-back compensation unit 300 to the first LED group 410 due to potential difference therebetween. Thus, during the compensation interval, the second drive voltage can be supplied from the loop-back compensation unit 300 to the first LED group 410, whereby the third LED drive current $I_{LED3}$ flows through the first current path and the first LED group 410 is kept in a turned-on state. Here, the third LED drive current $I_{LED3}$ may be substantially the same as the first LED drive is current $I_{LED1}$.

As described above, the control procedures for the first operation interval, the second operation interval and the charge interval, the first operation interval, and the compensation interval are sequentially performed during one cycle of the rectified voltage, and such control procedures are periodically repeated in each cycle of the rectified voltage Vrec.

Figure 16:
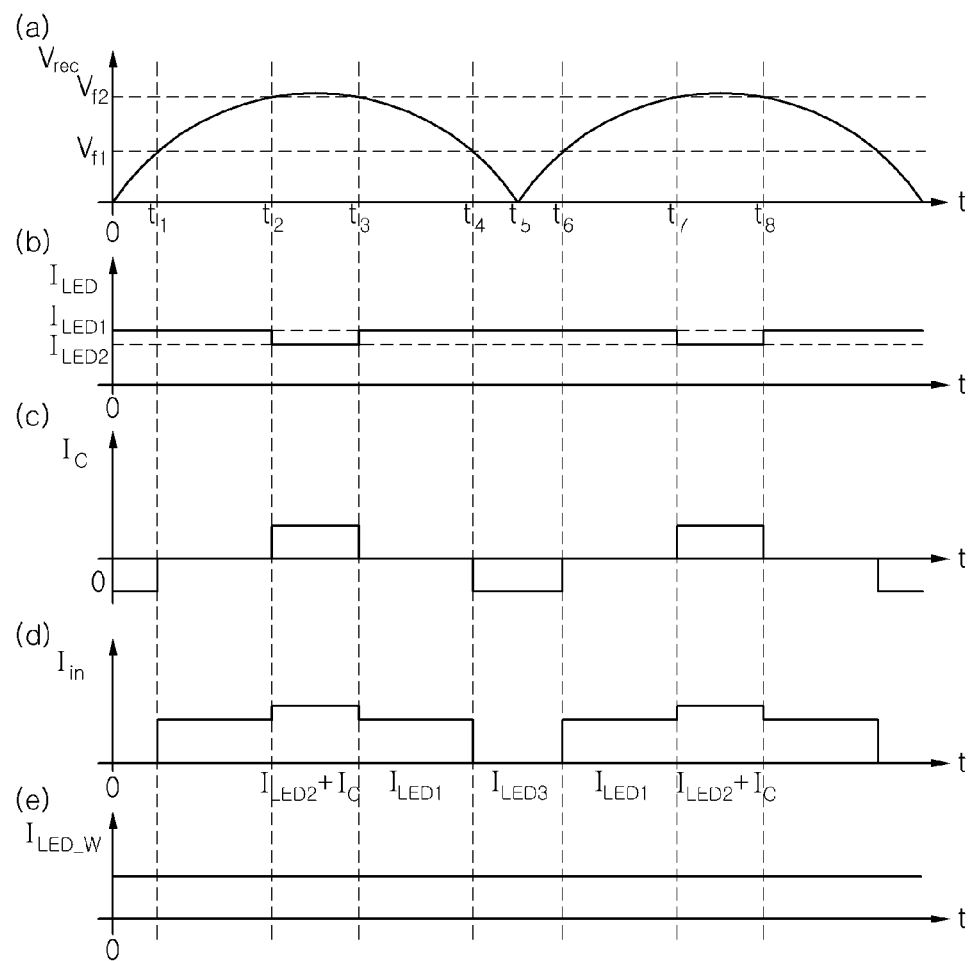
FIG. 16 shows waveform diagrams (a) to (e) depicting time-related variation in rectified voltage, LED drive current, input current, and light output from an LED light emitting unit of the LED lighting device shown in FIG. 14.

FIG. 16 shows waveform diagrams depicting time-related variation in rectified voltage, LED drive current, input current, and light output of the LED light emitting unit of the LED lighting device shown in FIG. 14. FIG. 16 shows a waveform (a) of the rectified voltage Vrec over time, a waveform (b) of the LED drive current ILED over time, a waveform (c) of the input current Iin and discharge current (that is, third LED drive current ILED3) of the loop-back compensation unit 300 over time, a waveform (d) of the input current Iin input from AC power source Vac to the LED lighting device over time, and a waveform (e) of the light output of the LED light emitting unit 400 over time.

Referring to FIG. 16, since the loop-back compensation unit 300 is in a non-charged state upon initial operation of the LED lighting device 1000, the LED light emitting unit 400 does not emit light. Then, the first LED group 410 is turned on when the voltage level of the rectified voltage Vrec reaches the first forward voltage level Vf1 (at t1). This state is shown in FIG. 15A.

Then, when the voltage level of the rectified voltage Vrec increases and reaches the second forward voltage level Vf2 (at t2), the LED drive controller 500 turns on the first constant current switch SW1 to enter the second operation interval. This state is shown in FIG. 15B. During the second operation interval, both the first LED group and the second LED group 420 are turned on, and as described above, the charge current Ic is supplied to the loop-back compensation unit 300 such that the loop-back compensation unit 300 is charged therewith. In addition, as described above, the second LED drive current ILED2 is preferably set to a much smaller drive current value than the first LED drive current ILED1 through constant current control in the second operation interval. This relationship can be seen in FIG. 16 from waveforms (b) to (d). More specifically, referring to FIG. 16 at waveform (b), in the second operation interval (that is, an interval from the time point t2 to the time point t3), the second LED drive current ILED2 is set to a smaller drive current value than the first LED drive current ILED1 in the first operation interval (that is, an interval from the time point t1 to the time point t2 through constant current control. Further, during the second operation interval, the charge current Ic is supplied to the loop-back compensation unit 300 such that the loop-back compensation unit 300 is charged therewith. Thus, as shown in FIG. 16 at waveform (e), the light output of the LED light emitting unit 400 in the second operation interval can become substantially the same as the light output of the LED light emitting unit 400 in the first operation interval.

Then, when the rectified voltage Vrec gradually decreases from the highest voltage level to a voltage level less than the second forward voltage level Vf2 (at t3), the LED drive controller 500 turns on the first constant current switch SW1 to enter the first operation interval, as shown in FIG. 15A. Here, the LED drive controller 500 is configured to determine whether the voltage level of the rectified voltage Vrec is less than the second forward voltage level Vf2 through detection of the second LED drive current $I_{LED2}$. Namely, the LED drive controller 500 is configured to determine that the voltage level of the rectified voltage Vrec is less than the second forward voltage level Vf2 when the detected second LED drive current $I_{LED2}$ is less than or equal to a preset value.

Then, when the rectified voltage Vrec decreases to a voltage level less than the first forward voltage level Vf1 (at t4), the second drive voltage is supplied from the loop-back compensation unit 300 to the first LED group 410 to allow the first LED group 410 to emit light, as shown in FIG. 15C. As described above, at this time point, natural discharge from the loop-back compensation unit 300 to the first LED group 410 can be performed due to potential difference without performing separate constant current switch control.

When the rectified voltage Vrec increases again to a voltage level higher than or equal to the first forward voltage level Vf1 (at t6), the first LED group 410 is operated again to emit light by the rectified voltage Vrec, as shown in FIG. 15A. Such sequential control procedures are periodically repeated in each cycle of the rectified voltage Vrec.

On the other hand, as can be seen from FIG. 16 at waveform (e), the LED light emitting unit 400 maintains substantially constant light output over all intervals of the rectified voltage Vrec. This effect can also be achieved since the input current $I_{in}$ can be completely supplied to the LED light emitting unit 400 by allowing the first LED group 410 and the second LED group 420 to emit light while charging the loop-back compensation unit 300 in the second operation interval. This effect can also be achieved by controlling the second LED drive current $I_{LED2}$ to a much lower value than the first LED drive current $I_{LED1}$ in the second operation interval.

In the above description, for convenience of description and illustration, the LED lighting device 1000 has been described with reference to the exemplary embodiments in which the LED light emitting unit 400 is composed of two LED groups, that is, the first LED group 410 and the second LED group 420. However, it will be apparent to those skilled in the art that the disclosure may also be applied to other exemplary embodiments wherein the LED light emitting unit 400 is composed of three or more LED groups, and that these exemplary embodiments also fall within the scope of the disclosure.

Configuration and Function of Seventh Exemplary Embodiment of LED Lighting Device 1000

Figure 17:
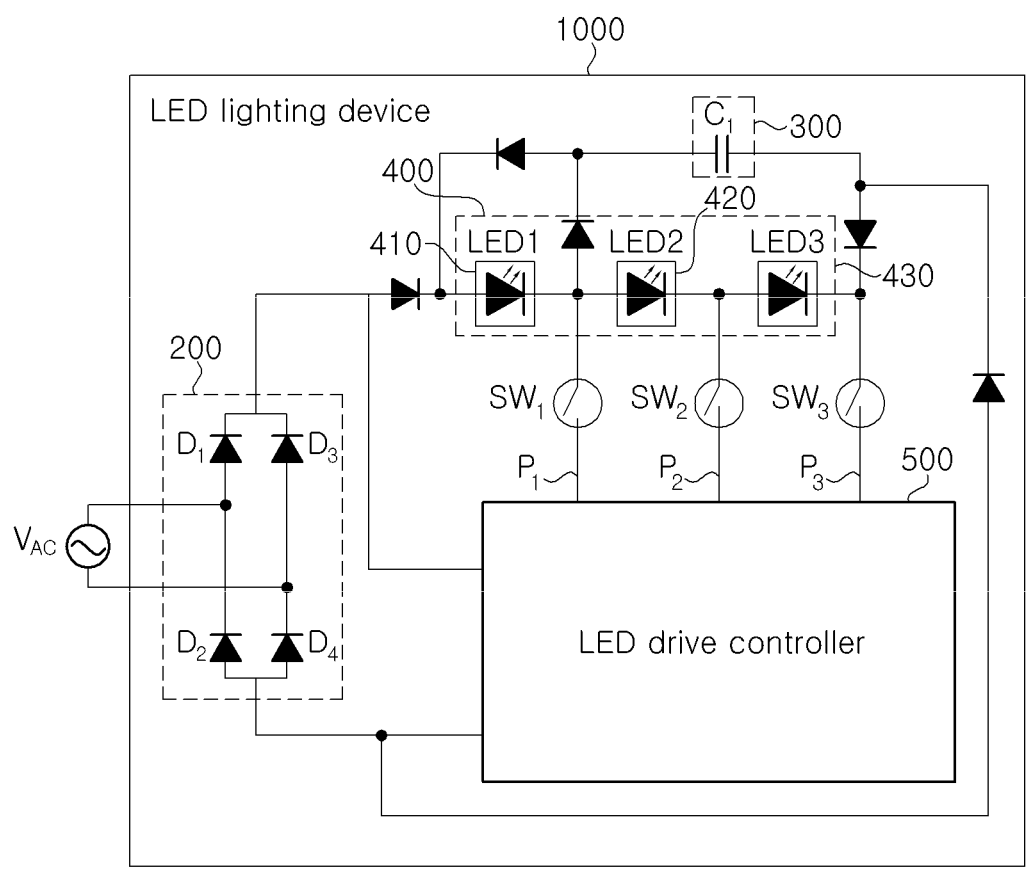
FIG. 17 is a schematic block diagram of an LED lighting device according to a seventh exemplary embodiment of the disclosure.

FIG. 17 is a schematic block diagram of an LED lighting device according to a seventh exemplary embodiment of the disclosure. Hereinafter, the configuration and functions of the LED lighting device 1000 according to the seventh exemplary embodiment will be described in detail with reference to FIG. 17.

Referring to FIG. 17, the LED lighting device 1000 according to the seventh exemplary embodiment is similar to the LED lighting device 1000 according to the sixth exemplary embodiment shown in FIG. 14 except that the LED lighting device 1000 according to the seventh exemplary embodiment further includes a third LED group 430 and a third constant current switch SW3. Thus, repeated components and functions of the LED lighting device 1000 according to the seventh exemplary embodiment will be described with reference to the description of the sixth exemplary embodiment shown in FIG. 14 and the following description will focus on the different features between the sixth exemplary embodiment and the seventh exemplary embodiment.

Referring to FIG. 17, the LED lighting device 1000 according to the seventh exemplary embodiment includes a first LED group 410, a second LED group 420, and a third LED group 430. Namely, the LED lighting device 1000 according to the seventh exemplary embodiment is a three-stage driving type AC LED lighting device.

The LED lighting device 1000 according to the seventh exemplary embodiment is configured to charge the loop-back compensation unit 300 during the second operation interval and the third operation interval and to supply the second drive voltage to the first LED group 410 during the compensation interval.

More specifically, since the loop-back compensation unit 300 is in a non-charged state upon initial operation of the LED lighting device 1000, the first to third LED groups 410 to 430 do not emit light.

When the voltage level of the rectified voltage Vrec increases and reaches the first forward voltage level Vf1, the LED drive current $I_{LED}$ flows through the first LED group 410 to turn on the first LED group. Here, the first constant current switch SW1 allows the LED drive current $I_{LED}$ to become the first LED drive current $I_{LED1}$ through constant current control.

Then, when the voltage level of the rectified voltage Vrec increases and reaches the second forward voltage level Vf2, the LED drive current $I_{LED}$ flows through the first LED group 410 and the second LED group 420 to turn on the first LED group 410 and the second LED group 420. At this time point, the LED drive controller 500 turns off the first constant current switch SW1 to enter the second operation interval and the second constant current switch SW2 allows the LED drive current $I_{LED}$ to become the second LED drive current $I_{LED2}$ through constant current control. At the same time, the charge current Ic is supplied to the loop-back compensation unit 300 to charge the loop-back compensation unit 300 therewith.

Then, when the voltage level of the rectified voltage Vrec increases and reaches the third forward voltage level Vf3, the LED drive current $I_{LED}$ flows through the first to third LED groups 410 to 430 to turn on the first to third LED groups 410 to 430. At this time point, the LED drive controller 500 turns off the second constant current switch SW2 to enter the third operation interval and the third constant current switch SW3 allows the LED drive current ILED to become a third LED drive current ILED3 through constant current control. As in the second operation interval, the charge current Ic is supplied to the loop-back compensation unit 300 such that the loop-back compensation unit 300 continues to be charged therewith in the third operation interval.

Then, when the rectified voltage Vrec gradually decreases from the highest voltage level to a voltage level less than the third forward voltage level Vf3, the LED drive controller 500 turns on the second constant current switch SW2 to enter the second operation interval again. When the rectified voltage Vrec gradually decreases from the highest voltage level to a voltage level less than the third forward voltage level Vf3, the third LED drive current $I_{LED3}$ flowing through the third constant current switch SW3 decreases. Thus, the LED drive controller 500 may be configured to enter the second operation interval when the third LED drive current ILED3 decreases to a preset drive current value or less. Likewise, even in this second operation interval, the loop-back compensation unit 300 may also continue to be charged.

When the voltage level of the rectified voltage Vrec continues to decrease and reaches a voltage level less than the second forward voltage level Vf2, the LED drive controller 500 turns on the first constant current switch SW1 to enter the first operation interval again. At this time point, charging of the loop-back compensation unit 300 can be completed.

Then, when the rectified voltage Vrec decreases to a voltage level less than the first forward voltage level Vf1, the second drive voltage can be naturally supplied from the loop-back compensation unit 300 to the first LED light emitting unit 410 due to potential difference therebetween, whereby the first LED light emitting unit 410 can emit even in the compensation interval.

The aforementioned procedures are repeatedly performed in each cycle of the rectified voltage Vrec.

Configuration and Function of Eighth Exemplary Embodiment of LED Lighting Device 1000

Figure 18:
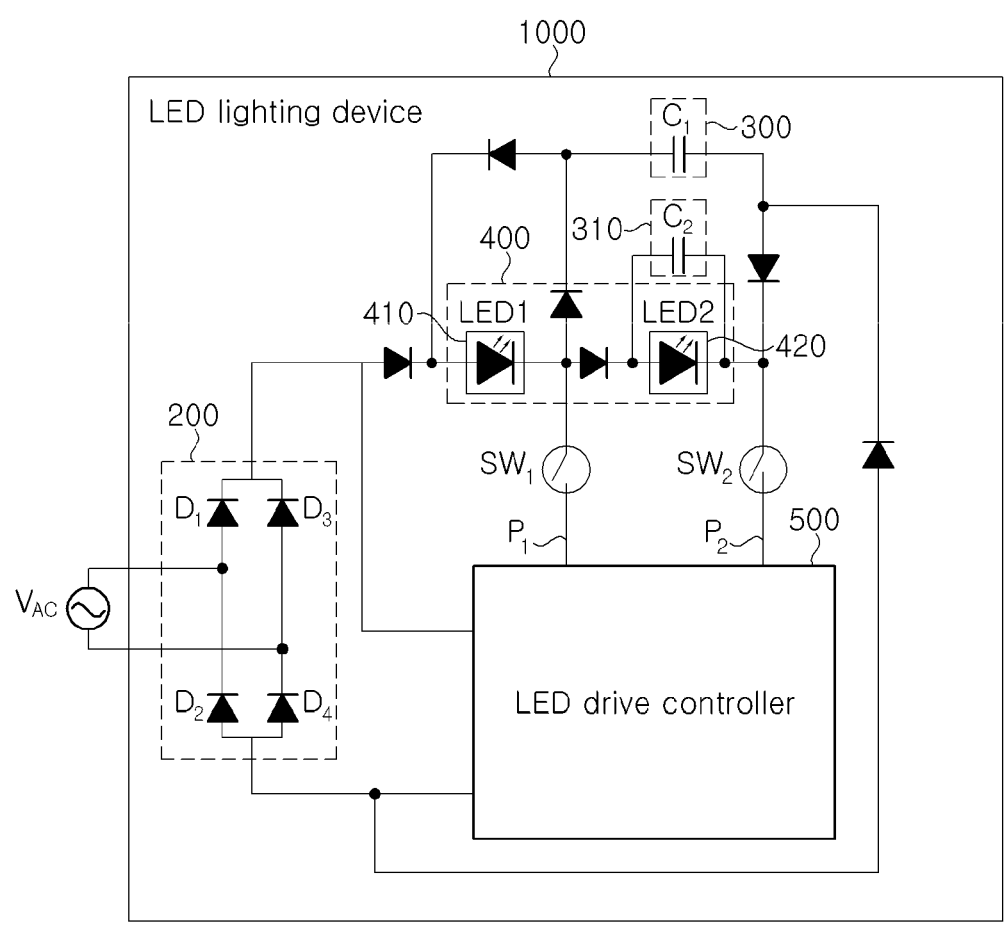
FIG. 18 is a schematic block diagram of an LED lighting device according to an eighth exemplary embodiment of the disclosure.

FIG. 18 is a schematic block diagram of an LED lighting device according to an eighth exemplary embodiment of the disclosure. Hereinafter, the configuration and functions of the LED lighting device 1000 according to the eighth exemplary embodiment will be described in detail with reference to FIG. 18.

Referring to FIG. 18, the LED lighting device 1000 according to the eighth exemplary embodiment is similar to the LED lighting device 1000 according to the sixth exemplary embodiment shown in FIG. 14 excluding a second compensation unit 310 arranged parallel to the second LED group 420. Thus, repeated components and functions of the LED lighting device 1000 according to the eighth exemplary embodiment will be described with reference to the description of the sixth exemplary embodiment shown in FIG. 14 and the following description will focus on the features of the eighth exemplary embodiment different from those of the sixth exemplary embodiment.

Referring to FIG. 18, the second compensation unit 310 according to this exemplary may be realized by a second capacitor C2, but is not limited thereto. It should be understood that the second compensation unit 310 may be realized by various electrical charge/discharge devices and/or charge/discharge circuits. The second compensation unit 310 is charged in the second operation interval as described above, and is configured to supply the second drive voltage to the second LED group 420 in other operation intervals (that is, operation intervals in which the second LED group 420 is turned off). Thus, in the eighth exemplary embodiment as shown in FIG. 19, the first LED group 410 and the second LED group 420 can be kept in a turned-on state substantially over all intervals of the rectified voltage Vrec.

Configuration and Function of Ninth Exemplary Embodiment of LED Lighting Device 1000

Figure 19:
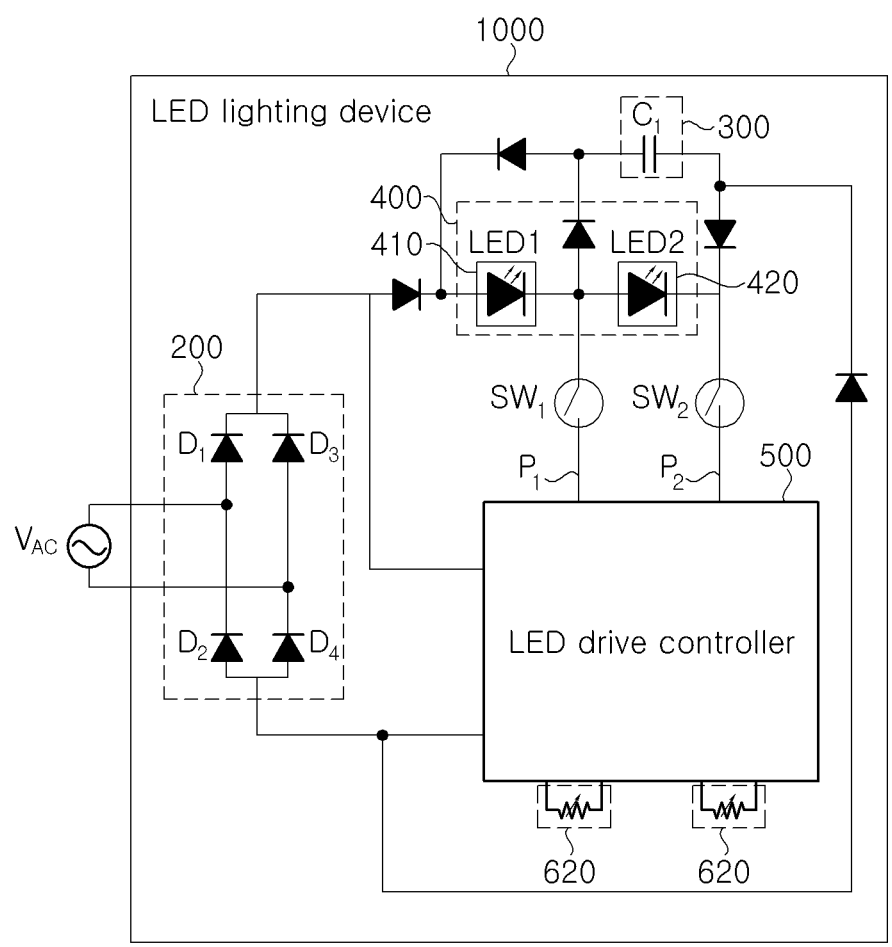
FIG. 19 is a schematic block diagram of an LED lighting device according to a ninth exemplary embodiment of the disclosure.

FIG. 19 is a schematic block diagram of an LED lighting device according to a ninth exemplary embodiment of the disclosure. Referring to FIG. 19, the configuration and functions of the LED lighting device 1000 according to the ninth exemplary embodiment will be described in detail.

Referring to FIG. 19, the LED lighting device 1000 according to the ninth exemplary embodiment may further include a first LED drive current setting unit 610 configured to set the first LED drive current $I_{LED1}$ to a desired current value and a second LED drive current setting unit 620 configured to set the second LED drive current $I_{LED2}$ to a desired current value. Except for these features, the LED lighting device 1000 shown in FIG. 19 is similar to the LED lighting device 1000 according to the sixth exemplary embodiment shown in FIG. 14. Thus, repeated components and functions of the LED lighting device 1000 according to the ninth exemplary embodiment will be described with reference to the description of the sixth exemplary embodiment shown in FIG. 14 and the following description will focus on the features of the ninth exemplary embodiment different from those of the sixth exemplary embodiment.

The conventional LED lighting device 1000 described with reference to FIG. 2 and FIG. 3 has a problem in that the first LED drive current $I_{LED1}$, the second LED drive current $I_{LED2}$, the third LED drive current $I_{LED3}$, and the fourth LED drive current $I_{LED4}$ cannot be independently set. Namely, since the conventional LED lighting device 1000 is configured to control the LED drive current $I_{LED}$ in a stepwise wave shape in each operation interval, one LED drive current value (for example, the fourth LED drive current $I_{LED4}$) is set and other LED drive current values are set in preset ratios with respect to the preset LED drive current value, respectively. For example, the third LED drive current $I_{LED3}$ is set to 80% to 95% of the fourth LED drive current $I_{LED4}$, the second LED drive current $I_{LED2}$ is set to 65% to 80% of the fourth LED drive current $I_{LED4}$, and the first LED drive current $I_{LED1}$ is set to 30% to 65% of the fourth LED drive current $I_{LED4}$. However, such a conventional LED lighting device 1000 has a problem in that the LED drive current $I_{LED}$ cannot be independently set, and particularly, in that it is more difficult to arbitrarily set the LED drive current for each of the operation intervals than adjustment of the LED drive current in a preset ratio as described above in order to improve flicker performance. Thus, the LED lighting device 1000 according to the ninth exemplary embodiment includes the first LED drive current setting unit 610 and the second LED drive current setting unit 620 in order to allow the LED drive current $I_{LED}$ to be independently set, as needed. Although the first LED drive current setting unit 610 and the second LED drive current setting unit 620 are shown as variable resistors in FIG. 19, it will be apparent to those skilled in the art that the drive current setting units may be realized by other suitable devices (for example, capacitors) or suitable circuits.

Configuration and Function of Tenth Exemplary Embodiment of LED Lighting Device 1000

Figure 20:
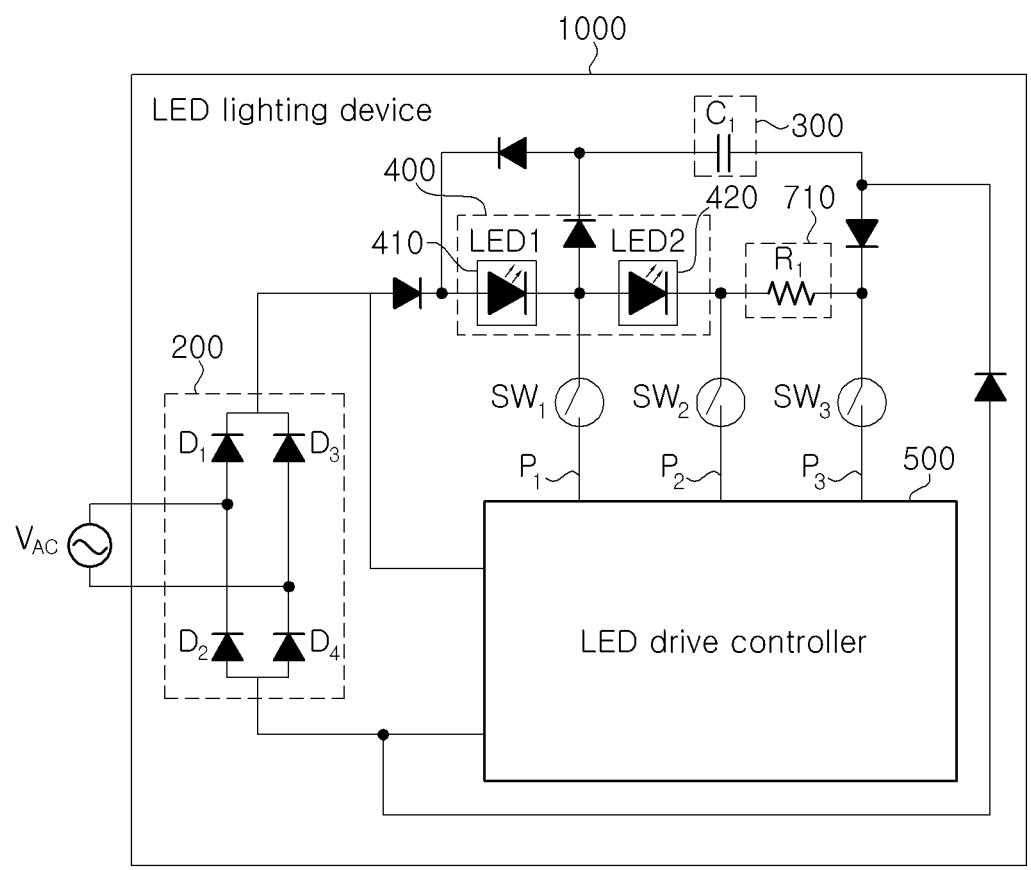
FIG. 20 is a schematic block diagram of an LED lighting device according to a tenth exemplary embodiment of the disclosure.

FIG. 20 is a schematic block diagram of an LED lighting device according to a tenth exemplary embodiment of the disclosure. Referring to FIG. 20, the configuration and functions of the LED lighting device 1000 according to the tenth exemplary embodiment will be described in detail.

Referring to FIG. 20, the tenth exemplary embodiment is similar to the seventh exemplary embodiment described above with reference to FIG. 17. Specifically, the tenth exemplary embodiment shown in FIG. 20 is similar to the seventh exemplary embodiment shown in FIG. 17 except that the LED lighting device 1000 according to the tenth exemplary embodiment further includes a dummy load 710 instead of the third LED group 430. In the LED lighting device 1000 according to the tenth exemplary embodiment shown in FIG. 17, the dummy load 710 is realized by a first resistor R1. In an interval in which the voltage level of the rectified voltage Vrec is higher than or equal to the second forward voltage level Vf2, the dummy load 710 allows electric current to flow therethrough in order to increase a charging amount in the loop-back compensation unit 300 by a voltage applied to the dummy load 710. As such, since the charging amount in the loop-back compensation unit 300 increases, the dummy load 710 provides an advantage in that the forward voltage level of the first LED group 410, that is, the first forward voltage level Vf1, can be set to a large value. In other words, under the same conditions, the presence of the dummy load 710 can increase the number of LEDs included in the first Led group 410, which is kept in a turned-on state over all intervals of the rectified voltage Vrec, thereby improving flicker performance.

Configuration and Function of Eleventh Exemplary Embodiment of LED Lighting Device 1000

Figure 21:
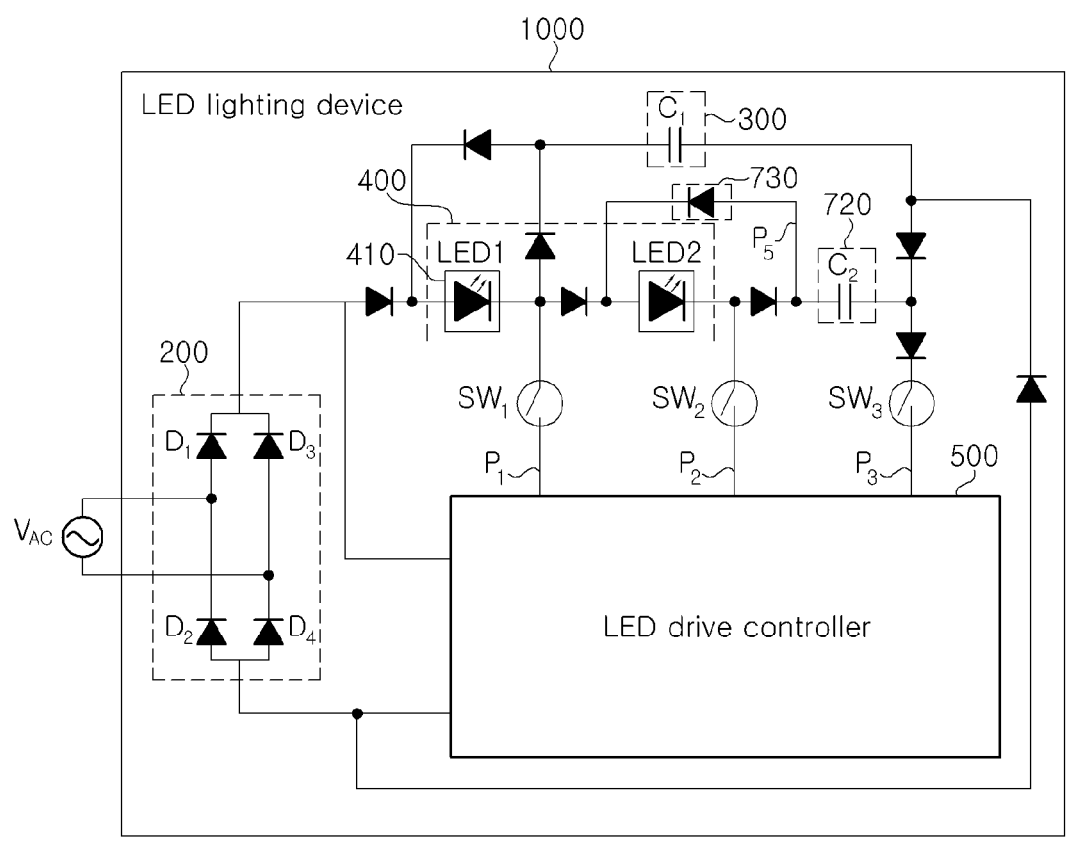
FIG. 21 is a schematic block diagram of an LED lighting device according to an eleventh exemplary embodiment of the disclosure.

FIG. 21 is a schematic block diagram of an LED lighting device according to an eleventh exemplary embodiment of the disclosure. Hereinafter, the configuration and functions of the LED lighting device 1000 according to the eleventh exemplary embodiment will be described in brief with reference to FIG. 21.

Referring to FIG. 21, the eleventh exemplary embodiment is different from the seventh exemplary embodiment shown in FIG. 17 in that the LED lighting device 1000 according to the eleventh exemplary embodiment further includes a second compensation unit 720 connected to the second LED group 420 in series and a discharge path P5 formed between the second compensation unit 720 and the second LED group 420, instead of the third LED group 430. As shown in FIG. 21, the second compensation unit 720 is configured to be charged in an interval in which the voltage level of the rectified voltage Vrec is higher than or equal to the second forward voltage level and to be discharged through the discharge path P5 and to supply the second drive voltage to the second LED group 420 in an interval in which the voltage level of the rectified voltage Vrec is less than the second forward voltage level. Thus, in the eleventh exemplary embodiment shown in FIG. 21, the first LED group 410 and the second LED group 420 can be kept in a turned-on state in all intervals of the rectified voltage Vrec. Furthermore, since the second compensation unit 720 is connected to the second LED group 420 in series, the charging amount in the loop-back compensation unit 300 connected thereto can be increased.

Configuration and Function of Twelfth Exemplary Embodiment of LED Lighting Device 1000

Figure 22:
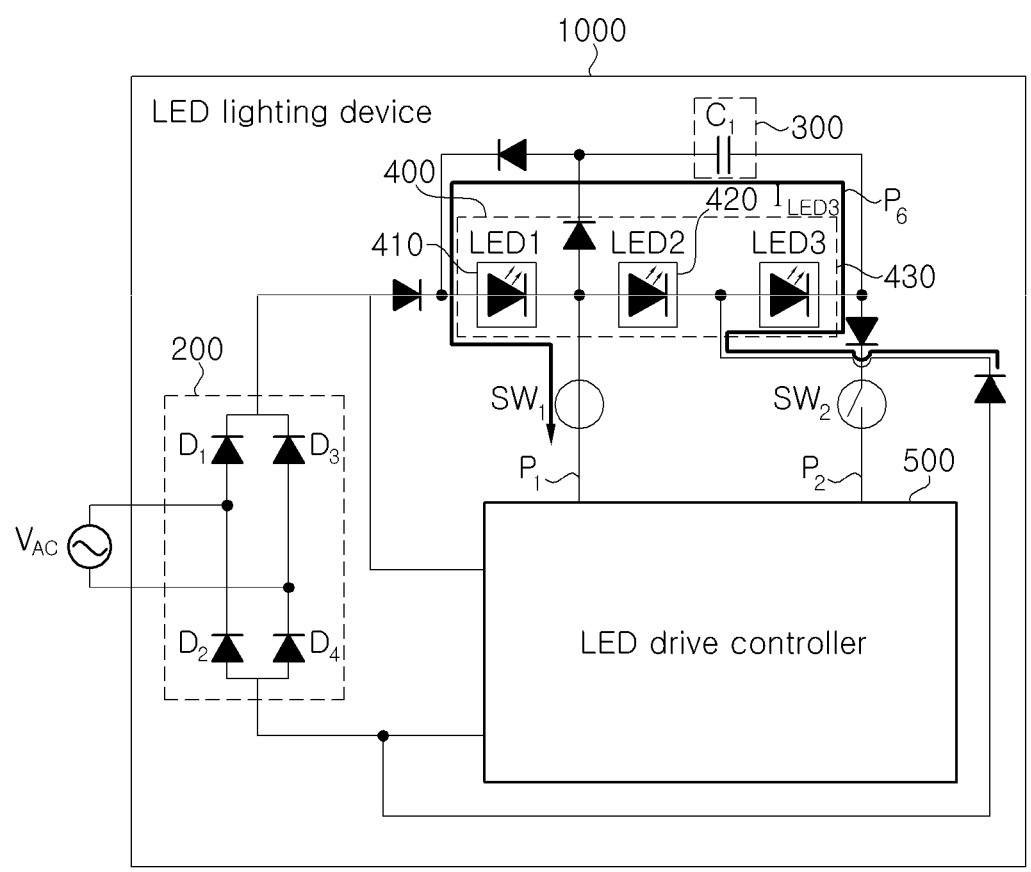
FIG. 22 is a schematic block diagram of an LED lighting device according to a twelfth exemplary embodiment of the disclosure.

FIG. 22 is a schematic block diagram of an LED lighting device according to a twelfth exemplary embodiment of the disclosure. Hereinafter, the configuration and functions of the LED lighting device 1000 according to the twelfth exemplary embodiment will be described in brief with reference to FIG. 22.

Referring to FIG. 22, the twelfth exemplary embodiment is different from the seventh exemplary embodiment shown in FIG. 17 in that the node between the second LED group 420 and the third LED group 430 is connected to an anode of the rectification unit 200 instead of the LED drive controller 500 through the second constant current switch SW2. Namely, the second constant current switch SW2 is omitted in the LED lighting device according to the twelfth exemplary embodiment shown in FIG. 22. In the twelfth exemplary embodiment, supply of the second drive voltage by the loop-back compensation unit 300 can be facilitated by lowering the forward voltage level of the first LED group 410, that is, the first forward voltage level Vf1, circuit efficiency can be improved using the second LED group 420 and the third LED group 430, and the first LED group 410 and the third LED group 430 can be driven by the second drive voltage supplied from the loop-back compensation unit 300 in the compensation interval. In the twelfth exemplary embodiment, it should be noted that the forward voltage level of the first LED group 410 is less than the forward voltage level of the second LED group 420.

As shown in FIG. 22, in the compensation interval, that is, in an interval in which the voltage level of the rectified voltage Vrec is less than first forward voltage level, a discharge path P6 is formed to turn on the third LED group 430 and the first LED group 410.

Configuration and Function of Thirteenth Exemplary Embodiment of LED Lighting Device 1000

Figure 23:
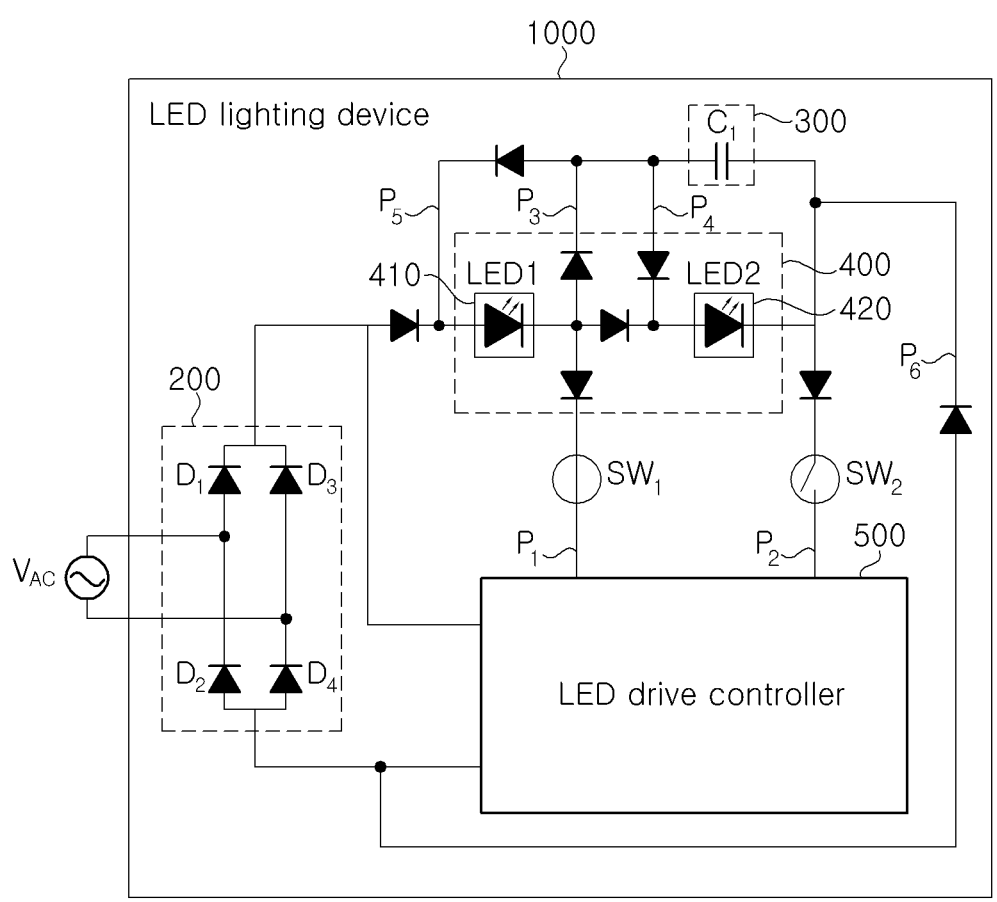
FIG. 23 is a schematic block diagram of an LED lighting device according to a thirteenth exemplary embodiment of the disclosure.

FIG. 23 is a schematic block diagram of an LED lighting device with improved flicker performance (hereinafter, "LED lighting device") according to a thirteenth exemplary embodiment of the disclosure. Hereinafter, the configuration and functions of the LED lighting device 1000 according to the thirteenth exemplary embodiment will be described in brief with reference to FIG. 23.

Referring to FIG. 23, the thirteenth exemplary embodiment is different from the sixth exemplary embodiment shown in FIG. 14 in that the loop-back compensation unit 300 according to the thirteenth exemplary embodiment is configured to supply the second drive voltage to the LED light emitting unit 400 over two stages. Since other components of the thirteenth exemplary embodiment are similar to those of the sixth exemplary embodiment, for a description of the same components and functions of the thirteenth exemplary embodiment, reference can be made to the above descriptions and the following description will focus on unique features and functions of the thirteenth exemplary embodiment.

Referring to FIG. 23, the LED lighting device 1000 according to the thirteenth exemplary embodiment may include a rectification unit 200, a loop-back compensation unit 300, an LED light emitting unit 400, and an LED drive controller 500. Among these components, the loop-back compensation unit 300 and the LED drive controller 500 may constitute an LED drive circuit.

First, as in the sixth exemplary embodiment, the LED light emitting unit 400 according to the thirteenth exemplary embodiment is composed of a plurality of LED groups, which are sequentially turned on to emit light or are sequentially turned off under control of the LED drive controller 500. Although the LED light emitting unit 400 is illustrated as including a first LED group 410 and a second LED group 420 in FIG. 23, it will be apparent to those skilled in the art that the number of LED groups included in the LED light emitting unit 400 can be changed, as needed. In the following description, for convenience of description and understanding, the LED light emitting unit 400 according to the thirteenth exemplary embodiment will be illustrated as being composed of two LED groups, without being limited thereto.

On the other hand, one of main features of the loop-back compensation unit 300 according to the thirteenth exemplary embodiment is that the loop-back compensation unit 300 is configured to supply the second drive voltage to the LED light emitting unit 400 over two stages. More specifically, the loop-back compensation unit 300 according to this exemplary embodiment is connected to the second LED group 420 in parallel and is configured to be charged in an interval in which the voltage level of the rectified voltage Vrec is higher than or equal to the second forward voltage level Vf2, to supply the second drive voltage to the second LED group 420 in an interval in which the voltage level of the rectified voltage Vrec is higher than or equal to the first forward voltage level Vf1 and is less than the second forward voltage level Vf2 (hereinafter, "first compensation interval") while supplying the second drive voltage to the first LED group 410 and the second LED group 420 in parallel in an interval in which the voltage level of the rectified voltage Vrec is less than the first forward voltage level Vf1 (hereinafter, "second compensation interval"). More preferably, during the first compensation interval and the second compensation interval, the first LED group 410 and the second LED group 420 are driven independent of each other. Namely, during the first compensation interval, the first LED group 410 may be independently driven by the rectified voltage Vrec and the second LED group 420 may be independently driven by the second drive voltage, and during the second compensation interval, the first LED group 410 may be independently driven by the second drive voltage supplied through a first discharge circuit and the second LED group 420 may be independently driven by the second drive voltage supplied through a second discharge circuit. This feature will be described in more detail with reference to the drawings.

Referring to FIG. 23, in order to realize the above function, the loop-back compensation unit 300 according to this exemplary embodiment may be connected at one end thereof to a node between the first LED group 410 and the second LED group 420 through a charge path P3, to an anode of the second LED group 420 through a first discharge path P4, and to an anode of the first LED group 410 through a second discharge path P5. In addition, the loop-back compensation unit 300 according to this exemplary embodiment may be connected at the other end thereof to the LED drive controller 500 through the second constant current switch SW2 and through a separate current path P6, which is not connected to the second constant current switch SW2. Thus, in the exemplary embodiment shown in FIG. 23, the first LED group 410 is a first set of LED groups and the second LED group 420 is a second set of LED groups. Obviously, in another exemplary embodiment, the loop-back compensation unit 300 may be connected at one end thereof to anodes of other LED groups and may be configured to supply the second drive voltage to different LED group(s) than in the exemplary embodiment shown in FIG. 23 during the first compensation interval and the second compensation interval. The other exemplary embodiment will be described below with reference to FIG. 26.

Further, in the exemplary embodiment shown in FIG. 23, the loop-back compensation unit 300 is connected to the node between the first LED group 410 and the second LED group 420 through the charge path P3 so as to be charged in the second operation interval (that is, in the interval in which the voltage level of the rectified voltage Vrec is higher than or equal to the second forward voltage level Vf2). Namely, in the thirteenth exemplary embodiment, the loop-back compensation unit 300 may be charged during an operation interval of LED group(s) to which the loop-back compensation unit 300 is connected in parallel, and may supply the second drive voltage to the LED group(s) to which the loop-back compensation unit 300 is connected in parallel during the first compensation interval, and supply the second drive voltage to the second set of LED groups and the first set of LED groups during the second compensation interval. Thus, the forward voltage level of the LED group(s) (that is, the second set of LED groups) to which the loop-back compensation unit 300 is connected in parallel may be higher than or equal to the forward voltage level of the LED group(s) (that is, the first set of LED groups) to which the second drive voltage is supplied only in the second compensation interval. Namely, in the thirteenth exemplary embodiment shown in FIG. 23, it is desirable that the forward voltage level of the first LED group 410 be less than or equal to that of the second LED group 420. However, it should be understood that other implementations are also possible. In an exemplary embodiment wherein the LED lighting device 1000 includes four LED groups composed of a first LED group 410 to a fourth LED group (not shown), the loop-back compensation unit 300 may be connected to the fourth LED group in parallel to be charged in a fourth operation interval (that is, an interval in which the voltage level of the rectified voltage Vrec is higher than or equal to the fourth forward voltage level Vf4) (in this case, the loop-back compensation unit 300 is connected to a node between the third LED group (not shown) and the fourth LED group through the charge path P3). Likewise, in exemplary embodiments wherein the LED lighting device 1000 includes n LED groups composed of a first LED group 410 to an $n^{th}$ LED group (not shown), the loop-back compensation unit 300 may be connected to the $n^{th}$ LED group in parallel to be charged in an $n^{th}$ operation interval (that is, an interval in which the voltage level of the rectified voltage Vrec is higher than or equal to an $n^{th}$ forward voltage level Vfn).

That is, as described above, it should be noted that the charge interval, the first compensation interval, and the second compensation interval of the loop-back compensation unit 300 according to this disclosure can be designed in various ways, as needed.

Further, the forward voltage level compensated by the look-back compensation unit 300 according to this exemplary embodiment may be set in various ways according to capacitance of charge/discharge devices (for example, the first capacitor C1 of FIG. 23), which constitute the look-back compensation unit 300.

Referring to FIG. 23 again, the LED drive controller 500 is configured to control operation of the first LED group 410 and the second LED group 420 by controlling the constant current switches SW1 and SW2 connected to the LED light emitting unit 400 depending on the voltage level of the rectified voltage Vrec.

As described above, the LED drive controller 500 according to this exemplary embodiment can determine the voltage level of the rectified voltage Vrec through two types of methods. In one exemplary embodiment, the LED drive controller 500 may be configured to control the first LED group 410 and the second LED group 420 through direct detection of the voltage level of the rectified voltage Vrec. In another exemplary embodiment, the LED drive controller 500 may be configured to control the first LED group 410 and the second LED group 420 through detection of the LED drive current $I_{LED}$ flowing through the LED light emitting unit 400 or through detection of the LED drive current $I_{LED}$ flowing through the constant current switch(es) SW1, SW2 connected to the LED light emitting unit 400. In the following description, for convenience of description and illustration, the LED lighting device 1000 will be described with reference to the exemplary embodiment in which the LED drive controller 500 is configured to directly detect the drive voltage, it should be understood that the disclosure may also be applied to other exemplary embodiments wherein the LED lighting device is configured to control operation of a plurality of LED groups through detection of drive current.

In addition, according to this exemplary embodiment, each of the first and second constant current switches SW1, SW2 is configured to be turned on or off so as to connect or disconnect the current path under control of the LED drive controller 500 and to detect the LED drive current $I_{LED}$ flowing through the connected current path in order to control the LED drive current $I_{LED}$ to a preset constant current value through constant current control.

Referring to FIG. 23 again, the LED drive controller 500 according to this exemplary embodiment is configured to detect the voltage level of the rectified voltage Vrec and to control operation of the first and second LED groups 410, 420 by controlling the first and second constant current switches SW1, SW2 based on the detected voltage level of the rectified voltage Vrec. Details of such functions of the LED drive controller 500 will now be described with reference to FIG. 24 to FIG. 25.

FIG. 24A to FIG. 24D are block diagrams showing switch control states in operation intervals, drive current for LED groups, and charge/discharge current of the loop-back compensation unit of the LED lighting device according to the thirteenth exemplary embodiment shown in FIG. 23. Further, FIG. 25 shows waveform diagrams depicting time-related variation in rectified voltage, first LED group drive current, second LED group drive current, and charge/discharge current of the loop-back compensation unit of the LED lighting device shown in FIG. 23.

Hereinafter, operation of the LED lighting device 1000 according to the thirteenth exemplary embodiment shown in FIG. 23 will be described in detail with reference to FIG. 24A to FIG. 24D and FIG. 25.

Figure 24A:
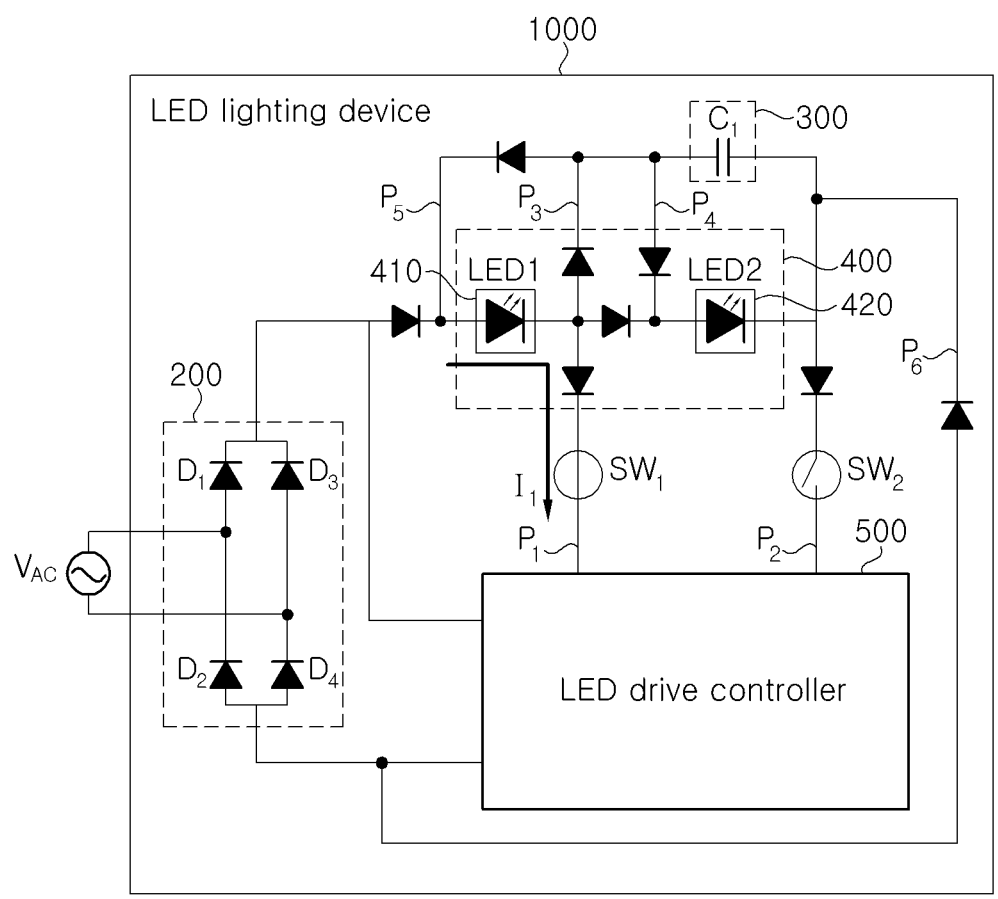
FIG. 24A to FIG. 24D are block diagrams showing switch control states in operation intervals, drive current for LED groups, and charge/discharge current of a loop-back compensation unit of the LED lighting device shown in FIG. 23.
Figure 25:
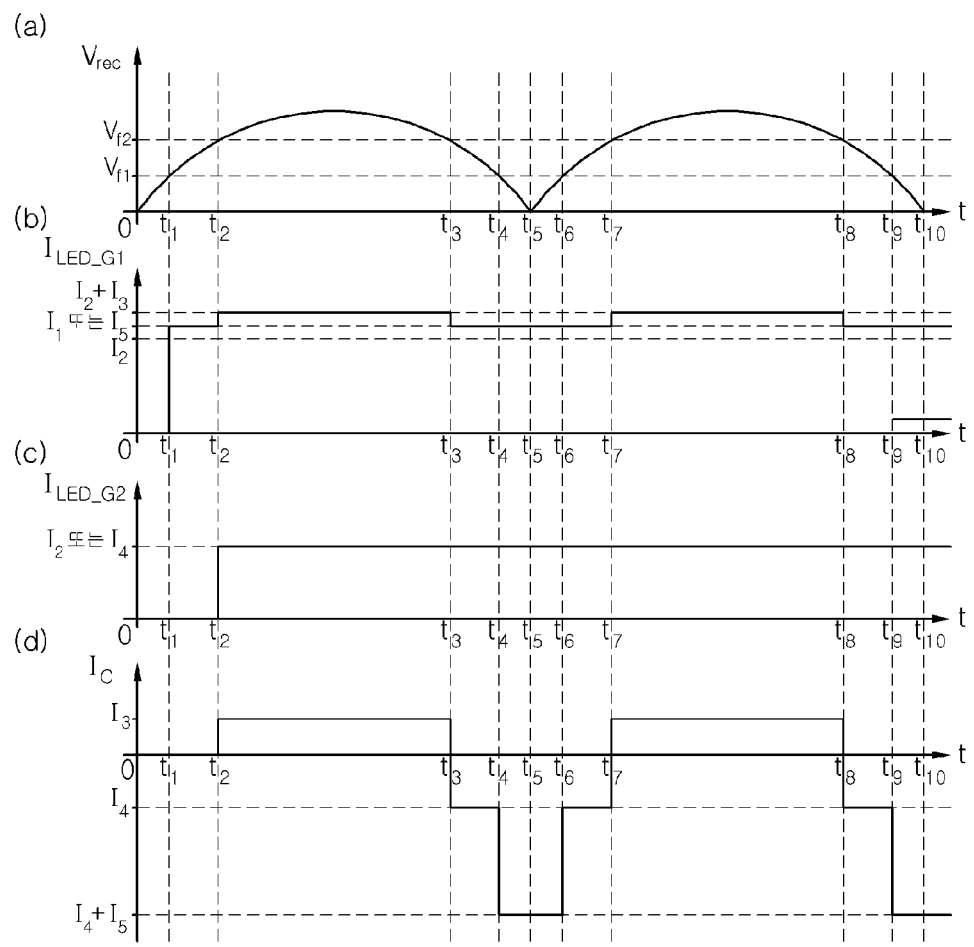
FIG. 25 shows waveform diagrams (a) to (d) depicting time-related variation in rectified voltage, first LED group drive current, second LED group drive current, and charge/discharge current of the loop-back compensation unit of the LED lighting device shown in FIG. 23.

Referring to FIG. 25, the loop-back compensation unit 300 is in a non-charged state upon initial operation of the LED lighting device 1000. Thus, an LED drive current does not flow through the first LED group 410 or the second LED group 420 before the voltage level of the rectified voltage Vrec reaches the first forward voltage level Vf1. In this state, the first constant current switch SW1 is in a turned-on state and the second constant current switch SW2 is in a turned-off state. Then, when the voltage level of the rectified voltage Vrec supplied to the LED light emitting unit 400 reaches the forward voltage level of the first LED group 410, that is, the first forward voltage level Vf1 (at t1 in FIG. 25), a first current I1 starts to flow through the first LED group 410 such that the first LED group 410 is turned on, thereby entering the first operation interval. FIG. 24A shows the control states of the first and second constant current switches SW1, SW2 and the LED group drive current $I_{LED\_G}$ during the first operation interval (from t1 to t2 in FIG. 25). As shown in FIG. 24A, during the first operation interval, the first current I1 flows through the first LED group 410. Thus, the first current I1 corresponds to the first LED drive current $I_{LED1}$ and the first LED group drive current $I_{LEDG\_1}$. Further, during the first operation interval, the first LED drive current $I_{LED1}$ flowing through the first LED group 410 becomes a preset first LED drive current through constant current control of the first constant current switch SW1.

Figure 24B:
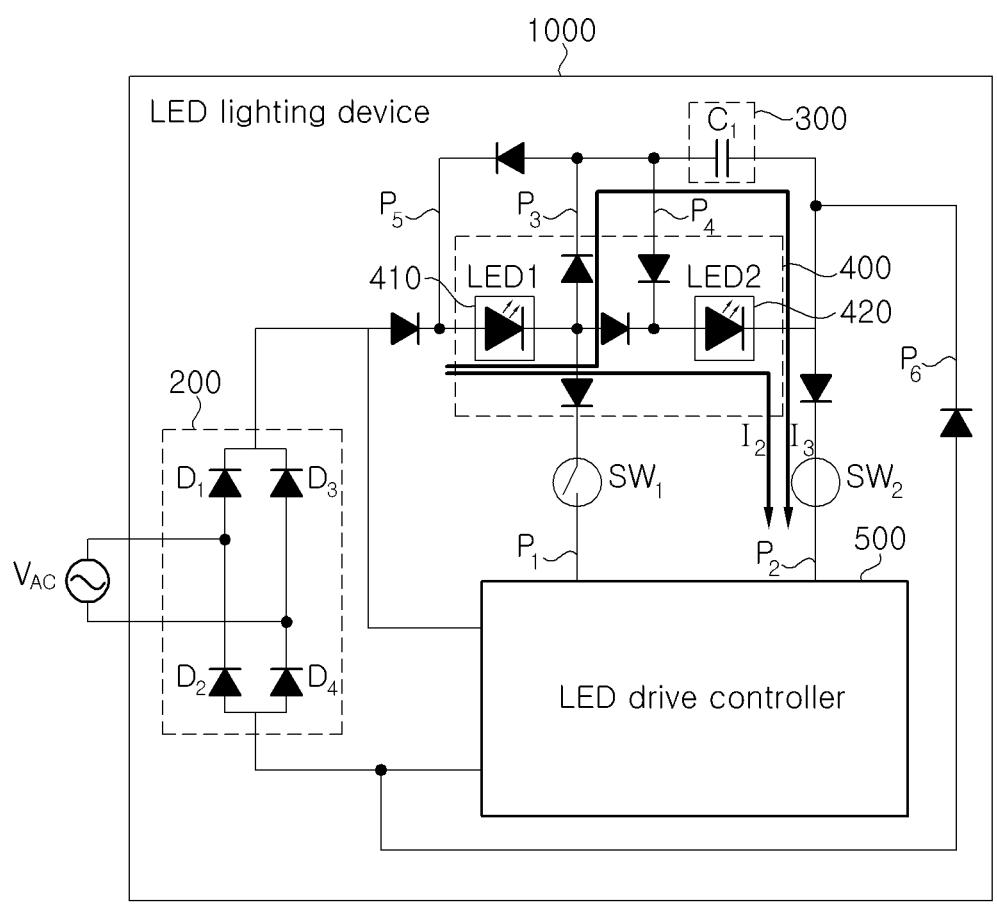

Then, when the voltage level of the rectified voltage Vrec increases and reaches the second forward voltage level Vf2 (at t2 in FIG. 25), the LED drive controller 500 turns off the first constant current switch SW1 to disconnect the first current path P1 and turns on the second constant current switch SW2 to connect the second current path P2, thereby entering the second operation interval. FIG. 24B shows the control states of the first and second constant current switches SW1, SW2 and the LED group drive current $I_{LED\_G}$ during the second operation interval. As shown in FIG. 24B and FIG. 25, during the second operation interval (t2 to t3 and t7 to t8 in FIG. 25), a current corresponding to "second current I2+third current I3" (that is, the first LED group drive current $I_{LEDG\_1}$) flows through the first LED group 410 such that the first LED group 410 emits light, and the second current I2 (that is, the second LED group drive current $I_{LEDG\_2}$) flows through the second LED group 420 such that the second LED group 420 emits light. In addition, during the second operation interval, a charge current (third current I3) flows through the loop-back compensation unit 300 via the charge path P3 such that the loop-back compensation unit 300 is charged therewith. Accordingly, in this exemplary embodiment, the second operation interval corresponds to the charge interval. Furthermore, as shown in FIG. 24B and FIG. 25, during the second operation interval, the first LED group drive current $I_{LEDG\_1}$ flowing through the first LED group 410 corresponds to a current value of "second current I2+third current I3", the second LED group drive current $I_{LEDG\_2}$ flowing through the second LED group corresponds to the second current $I_2$, and the second LED drive current $I_{LED2}$ subjected to constant current control through the second constant current switch SW2 corresponds to the current value of "second current I2+third current I3". Thus, in such the second operation interval, the second LED drive current $I_{LED2}$ (that is, "second current I2+third current I3") becomes a preset second LED drive current through constant current control of the second constant current switch SW2. Furthermore, as can be seen from FIG. 25, since the first LED group 410 and the second LED group 420 are kept in a turned-on state (that is, the number of LEDs emitting light is the same) excluding an initial operation time of the LED lighting device 1000, the preset first LED drive current and the preset second LED drive current for constant current control of the LED drive current can be freely determined. In FIG. 25, the preset first LED drive current and the preset second LED drive current for constant current control of the LED drive current are set to substantially the same current value. In another exemplary embodiment wherein some LED groups are turned off during part of one cycle of the rectified voltage Vrec, an LED drive current value for constant current control of the LED drive current may be inversely proportional or substantially inversely proportional to the number of LEDs emitting light. This exemplary embodiment will be described below with reference to FIG. 26.

Figure 24C:
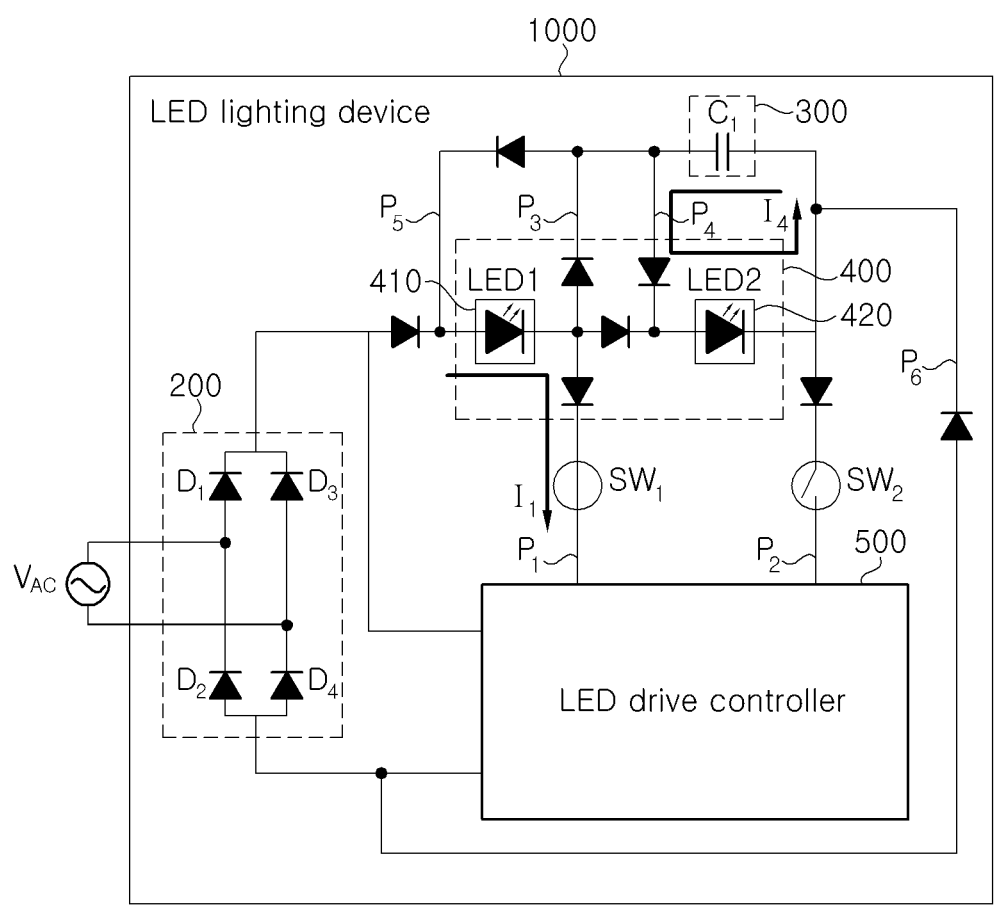

Then, when the rectified voltage Vrec gradually decreases from the highest voltage level to a voltage level less than the second forward voltage level Vf2 (at t3 in FIG. 25), the LED drive controller 500 turns off the second constant current switch SW2 to disconnect the second current path P2 and turns on the first constant current switch SW1 to connect the first current path P1, thereby entering the first compensation interval. FIG. 24C shows the control states of the first constant current switch SW1 and the second constant current switch SW2 and the LED group drive current $I_{LED\_G}$ during the first compensation interval (the interval in which the voltage level of the rectified voltage Vrec is higher than or equal to the first forward voltage level Vf1 and less than the second forward voltage level Vf2, t3 to t4, t6 to t7, and t8 to t9 in FIG. 25). As shown in FIG. 24C and FIG. 25, during the first compensation interval, since the voltage level of the rectified voltage Vrec is higher than or equal to the first forward voltage level Vf1, the first LED group 410 is driven by the rectified voltage Vrec and the second LED group 420 is driven by the second drive voltage supplied from the loop-back compensation unit 300 through the first discharge path P4. As shown in FIG. 24C, as in the first operation interval described above, the first current I1 flows through the first LED group 410 during the first compensation interval. Thus, during the first compensation interval, the first LED group drive current $I_{LEDG\_1}$ corresponds to the first current I1, which becomes a preset first LED drive current through constant current control of the first constant current switch SW1. Conversely, as shown in FIG. 24C, during the first compensation interval, since the second constant current switch SW2 is in a turned-off state, a first discharge circuit composed of the loop-back compensation unit 300→first discharge path P4→the second LED group 420→the loop-back compensation unit 300 is constituted, whereby a fourth current I4 flows through the second LED group 420 via the first discharge circuit, thereby maintaining the second LED group 420 in a turned-on state. Here, in order to reduce or remove deviation in light output between the operation intervals, the fourth current I4 flowing through the second LED group 420 during the first compensation interval may become the same as the second current I2 flowing through the second LED group during the second operation interval.

Figure 24D:
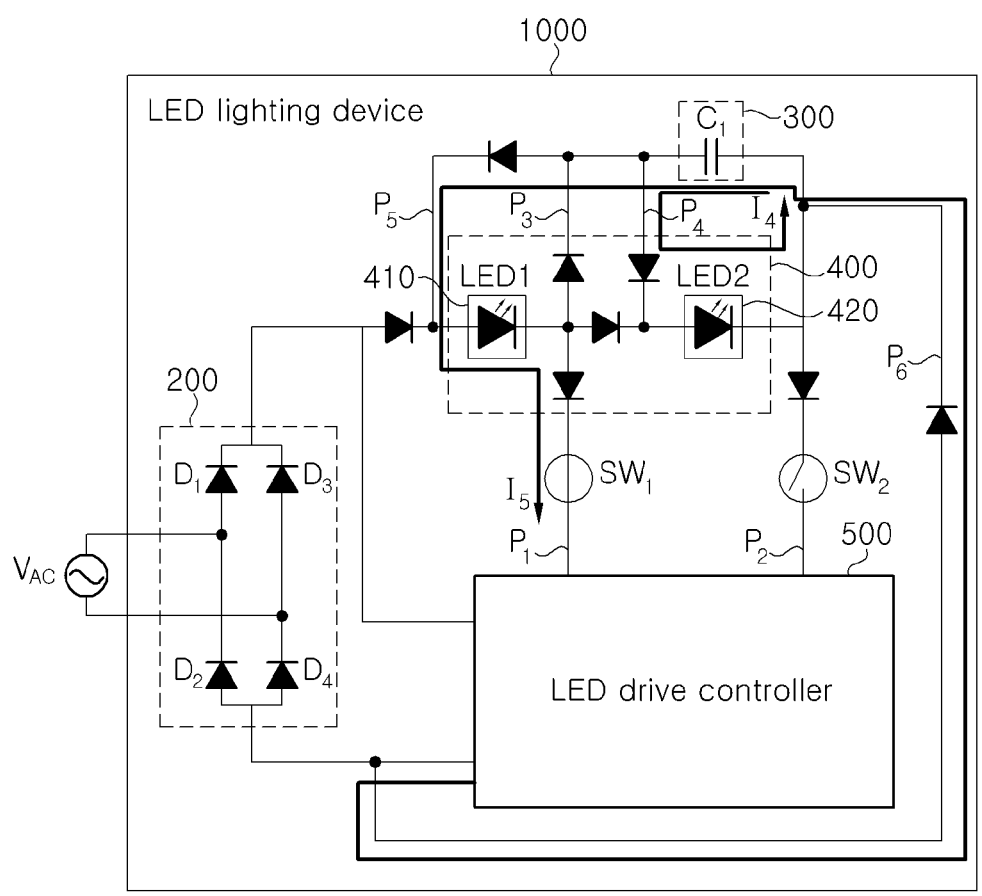

Then, when the rectified voltage Vrec decreases to a voltage level less than the is first forward voltage level Vf1 (at t4 in FIG. 25), the LED drive controller 500 may enter a second compensation interval. FIG. 24D shows the control states of the first constant current switch SW1 and the second constant current switch SW2 and the LED group drive current $I_{LED\_G}$ during the second compensation interval (the interval in which the voltage level of the rectified voltage Vrec is less than the first forward voltage level Vf1, t4 to t6, and t8 to t10 in FIG. 25). The control states of the first and second constant current switches SW1, SW2 during the second compensation interval are the same as those during the first compensation interval, and the first discharge circuit and a second discharge circuit are naturally generated due to potential difference between the voltage level of the loop-back compensation unit 300 and the voltage level of the rectified voltage Vrec. Namely, as shown in FIG. 24D, during the second compensation interval, each of the first and second LED groups 410, 420 is connected to the loop-back compensation unit 300 in parallel to receive the second drive voltage therefrom. More specifically, during the second compensation interval, the second LED group 420 is connected to the loop-back compensation unit 300 through the first discharge circuit as described above and is driven by the fourth current I4. On the other hand, the first LED group 410 is connected to the loop-back compensation unit 300 through the second discharge circuit, which is constituted by way of the loop-back compensation unit 300→second discharge path P5→first LED group 410→first constant current switch SW1→LED drive controller 500→loop-back compensation unit 300. During the second compensation interval, a fifth current I5 flows through the first LED group 410 via the second discharge circuit, whereby the first LED group 410 can be kept in a turned-on state. Thus, the first LED group drive current $I_{LEDG\_1}$ flowing through the first LED group 410 during the second compensation interval is the fifth current I5. Here, in order to reduce or remove deviation in light output between the operation intervals, the fifth current I5 flowing through the first LED group 410 during the second compensation interval may become the same as the first current I1 flowing through the first LED group during the first compensation interval through constant current control of the first constant current switch SW1. This result is shown in FIG. 25.

In addition, as shown in FIG. 24C and FIG. 24D, during the first compensation interval and the second compensation interval, the first and second LED groups 410, 420 are independently driven by separate current paths.

The control states of the first constant current switch SW1 and the second constant current switch SW2 and the LED group drive current $I_{LED\_G}$ during one cycle of the rectified voltage Vrec upon initial operation of the LED lighting device 1000 has been described above. After the initial operation of the LED lighting device 1000, the control procedures of the "second compensation interval of FIG. 24D→first compensation interval of FIG. 24C→second operation interval (charge interval) of FIG. 24B→first compensation interval of FIG. 24C→second compensation interval of FIG. 24D" are sequentially performed according to increase or decrease of the rectified voltage Vrec during one cycle of the rectified voltage Vrec, and such control procedures are periodically repeated in each cycle of the rectified voltage Vrec. In addition, with such configurations, the LED lighting device 1000 according to the thirteenth exemplary embodiment allows the first and second LED groups 410, 420 to be kept in a turned-on state over all intervals of the rectified voltage Vrec after initial operation of the LED lighting device 1000.

Configuration and Function of Fourteenth Exemplary Embodiment of LED Lighting Device 1000

Figure 26:
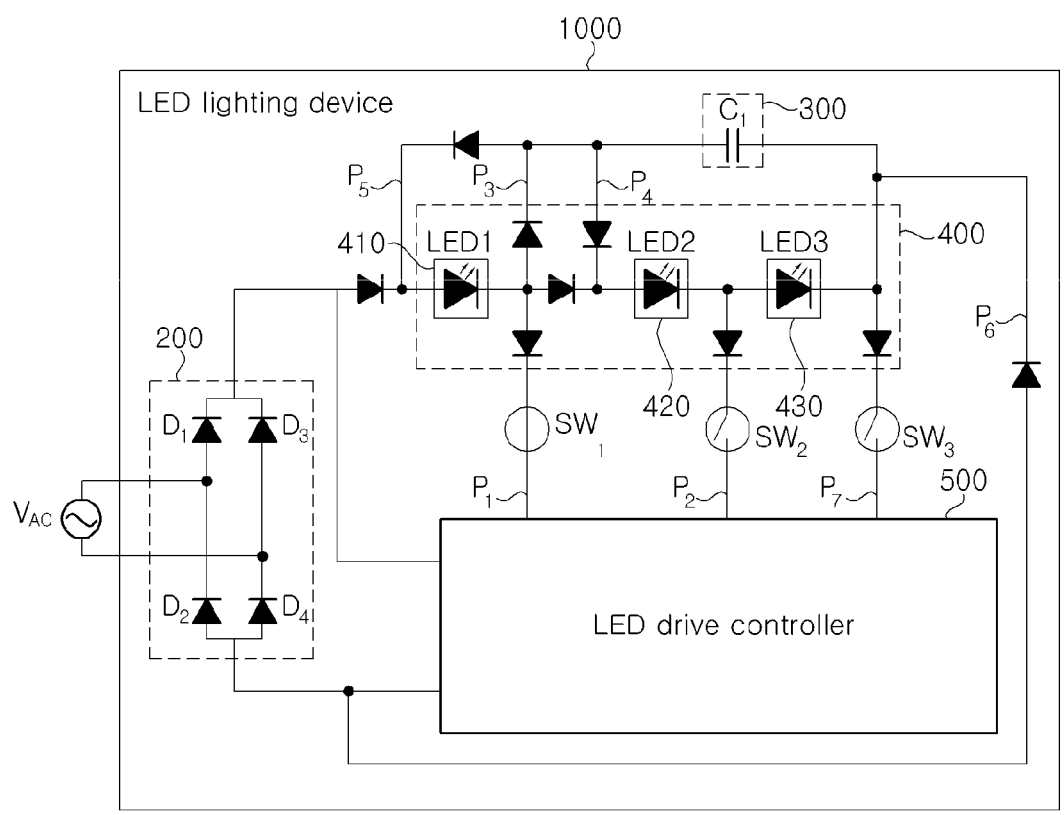
FIG. 26 is a schematic block diagram of an LED lighting device according to a fourteenth exemplary embodiment of the disclosure.

FIG. 26 is a schematic block diagram of an LED lighting device with improved is flicker performance according to a fourteenth exemplary embodiment of the disclosure. The LED lighting device 1000 according to the fourteenth exemplary embodiment shown in FIG. 26 is similar to the LED lighting device 1000 according to the thirteenth exemplary embodiment shown in FIG. 23 except that the LED lighting device 1000 according to the fourteenth exemplary embodiment further includes a third LED group 430, a third constant current switch SW3 and a third current path P7, and the loop-back compensation unit 300 according to this exemplary embodiment is connected at one end thereof to the LED drive controller 500 through the third constant current switch SW3. Thus, repeated components and functions of the LED lighting device 1000 according to the fourteenth exemplary embodiment will be described with reference to the description of the thirteenth exemplary embodiment shown in FIG. 23 and the following description will focus on the features of the fourteenth exemplary embodiment different from those of the thirteenth exemplary embodiment.

The fourteenth exemplary embodiment shown in FIG. 26 is different from the thirteenth exemplary embodiment in that the loop-back compensation unit 300 is charged in the second operation interval and the third operation interval, and during such charge intervals, the LED drive controller 500 controls sequential driving of the second LED group 420 and the third LED group 430 depending upon the voltage level of the rectified voltage Vrec. In addition, the loop-back compensation unit 300 according to this exemplary embodiment may be configured to supply the second drive voltage to the second LED group 420 and the third LED group 430 during an interval in which the voltage level of the rectified voltage Vrec is higher than or equal to the first forward voltage level Vf1 and is less than the second forward voltage level Vf2 (in the first compensation interval), and to supply the second drive voltage to a first set of LED groups (a first LED group 410 in FIG. 26) and a second set of LED groups (a second LED group 420 and a third LED group 430 connected to each other in series in FIG. 26) during an interval in which the voltage level of the rectified voltage Vrec is less than the first forward voltage level Vf1 (in the second compensation interval).

Specifically, upon initial operation of the LED lighting device 1000, the first constant current switch SW1 is in a turned-on state and the second and third constant current switches SW2, SW3 are in a turned-off state. Then, when the voltage level of the rectified voltage Vrec increases and reaches the first forward voltage level Vf1, the first LED drive current $I_{LED1}$ starts to flow through the first LED group 410 such that the first LED group 410 emits light.

Then, when the voltage level of the rectified voltage Vrec reaches the second forward voltage level Vf2, the LED drive controller 500 turns off the first constant current switch SW1 and turns on the second and third constant current switches SW2, SW3, thereby entering the second operation interval. During the second operation interval, the first LED group 410 and the second LED group 420 are turned on to emit light and the charge current is supplied to the loop-back compensation unit 300 through the charge path P3. As in the thirteenth exemplary embodiment, during the second operation interval according to the fourteenth exemplary embodiment, current corresponding to "charge current+second LED drive current $I_{LED2}$" flows through the first LED group 410, the second LED drive current $I_{LED2}$ flows through the second LED group 420, and the charge current flows through the loop-back compensation unit 300. Unlike the thirteenth exemplary embodiment, during the second operation interval according to the fourteenth exemplary embodiment, the second constant current switch SW2 controls only the second LED drive current $I_{LED2}$ to a preset constant current.

Then, when the voltage level of the rectified voltage Vrec reaches the third forward voltage level Vf3, the LED drive controller 500 turns off the second constant current switch SW2, thereby entering the third operation interval. During the third operation interval, the first LED group 410 to the third LED group 430 are turned on and the charge current is supplied to the loop-back compensation unit 300 through the charge path P3. In the fourteenth exemplary embodiment, during the third operation interval, current corresponding to "charge current+third LED drive current $I_{LED3}$" flows through the first LED group 410, the third LED drive current $I_{LED3}$ flows through the second LED group 420 and the third LED group 430, and the charge current flows through the loop-back compensation unit 300. The third constant current switch SW3 controls the current corresponding to "charge current+third LED drive current $I_{LED3}$" to a preset constant current.

Then, when the voltage level of the rectified voltage Vrec decreases from the highest voltage level and reaches the second forward voltage level Vf2 again, the LED drive controller 500 turns on the second constant current switch SW2 to enter the second operation interval.

Then, when the voltage level of the rectified voltage Vrec decreases and reaches the first forward voltage level Vf1 again, the LED drive controller 500 turns off the second and third constant current switches SW2, SW3 while turning on the first constant current switch SW1, thereby entering the first compensation interval. During the first compensation interval, since the voltage level of the rectified voltage Vrec is higher than or equal to the first forward voltage level Vf1, the first LED group 410 is driven by the rectified voltage Vrec, and the second LED group 420 and the third LED group 430 are driven by the second drive voltage supplied from the loop-back compensation unit 300 through the first discharge path P4. Namely, during the first compensation interval, since the second constant current switch SW2 and the third constant current switch SW3 are in a turned-off state, a first discharge circuit composed of the loop-back compensation unit 300→first discharge path P4→second LED group 420→third LED group 430→loop-back compensation unit 300 is constituted, whereby a first discharge current (for example, the fourth current I4 in FIG. 24C) flows through the second LED group 420 and the third LED group 430 via the first discharge circuit, thereby maintaining the second LED group 420 and the third LED group 430 in a turned-on state.

Then, when the rectified voltage Vrec decreases to a voltage level less than the first forward voltage level Vf1, the LED drive controller 500 can enter the second compensation interval. During the second compensation interval, the control states of the first to third constant current switches SW1 to SW3 are the same as those during the first compensation interval, and the first discharge circuit and a second discharge circuit are naturally generated due to potential difference between the voltage level of the loop-back compensation unit 300 and the voltage level of the rectified voltage Vrec. Namely, during the second compensation interval, each of the first set of LED groups (first LED group 410) and the second set of LED groups (the second LED group 420 and the third LED group 430 connected to each other in series) is connected to the loop-back compensation unit 300 in parallel to receive the second drive voltage supplied therefrom. More specifically, during the second compensation interval, the second LED group 420 and the third LED group 430 are connected to the loop-back compensation unit through the first discharge circuit as described above and are driven by the first discharge current. On the other hand, the first LED group 410 is connected to the loop-back compensation unit 300 through the second discharge circuit, which is composed of the loop-back compensation unit 300→second discharge path P5→first LED group 410→first constant current switch SW1→LED drive controller 500→loop-back compensation unit 300. During the second compensation interval, a fifth current I5 (for example, the fifth current I5 of FIG. 24D) flows through the first LED group 410 via the second discharge circuit, whereby the first LED group 410 can be kept in a turned-on state.

After initial operation of the LED lighting device 1000, the control procedures of the "second compensation interval→first compensation interval→second operation interval (charge interval)→third operation interval(charge interval) →second operation interval (charge interval)→first compensation interval→second compensation interval" are sequentially performed according to increase or decrease of the rectified voltage Vrec during one cycle of the rectified voltage Vrec, and such control procedures are periodically repeated in each cycle of the rectified voltage Vrec. In addition, with such configurations, the LED lighting device 1000 according to the thirteenth exemplary embodiment allows the first LED group 410 and the second LED group 420 to be kept in a turned-on state over all intervals of the rectified voltage Vrec after initial operation of the LED lighting device 1000, while allowing the third LED group 430 to be selectively turned on/off depending upon the voltage level of the rectified voltage Vrec.

On the other hand, as described above, in the LED lighting device 1000 according to the fourteenth exemplary embodiment, since the third LED group 430 is selectively turned on/off according to operation interval, there is a difference in the number of LEDs to be emitting light in each operation interval. Thus, in order to remove or minimize light output deviation between the operation intervals, the amount of LED drive current flowing through LED group(s) may be differently set depending upon the operation intervals. For example, during an interval in which all of the first to third LED groups 410 to 430 are turned on (first compensation interval, second compensation interval, third operation interval), the LED drive current may be controlled to a lower current value than the LED drive current during an operation interval (second operation interval) in which only the first LED group 410 and the second LED group 420 are turned on to emit light. Here, the LED drive current may be determined to be inversely proportional or substantially inversely proportional to the number of LEDs emitting light.

Further, since the third LED group 430 is selectively turned on/off, it is desirable that the number of LEDs constituting the third LED group 430 be less than the number of LEDs constituting the first LED group 410 and/or the second LED group 420. Further, since the third LED group 430 is selectively turned on/off, it is desirable that the forward voltage level of the third LED group 430 be less than the forward voltage level of the first LED group 410 and/or the forward voltage level of the second LED group 420.

In the above, the operation of the LED lighting device 1000 according to the fourteenth exemplary embodiment, which includes the first to third LED groups 410 to 430, has been described. However, it should be understood that the same principle can be applied to an LED lighting device according to other exemplary embodiments, which includes a first LED group 410 to an $n^{th}$ LED group (not shown). For example, in an exemplary embodiment, the loop-back compensation unit 300 is connected at one end thereof to the LED drive controller 500 through an $n^{th}$ constant current switch (not shown), and at the other end thereof to a node between the first LED group 410 and the second LED group 420 through the charge path P3, to an anode of the second LED group 420 through the first discharge path P4, and to an anode of the first LED group 410 through the second discharge path P5. In this exemplary embodiment, the charge interval of the loop-back compensation unit 300 ranges from the second operation interval to an $n^{th}$ operation interval, and the second LED group 420 to the $n^{th}$ LED group are sequentially driven during the charge interval. Further, in the compensation interval, the first set of LED groups each connected to the loop-back compensation unit 300 in parallel corresponds to the first LED group and the second set of LED groups corresponds to the second to $n^{th}$ LED groups connected to each other in series. Thus, during the first compensation interval (the interval in which the voltage level of the rectified voltage Vrec is higher than or equal to the first forward voltage level Vf1 and less than the second forward voltage level Vf2), the loop-back compensation unit 300 may supply the second drive voltage to the second to the $n^{th}$ LED groups, and during the second compensation interval (the interval in which the voltage level of the rectified voltage Vrec is less than the first forward voltage level Vf1), the loop-back compensation unit 300 may supply the second drive voltage to each of the first set of LED groups and the second set of LED groups.

In another exemplary embodiment, the LED lighting device 1000 includes a first LED group 410 to a fourth LED group (not shown), and the loop-back compensation unit 300 is connected at one end thereof to the LED drive controller 500 through a fourth constant current switch (not shown), and at the other end thereof to a node between the second LED group 420 and the third LED group 430 through the charge path P3, to an anode of the third LED group 430 through the first discharge path, and to an anode of the first LED group 410 through the second discharge path P5. In this exemplary embodiment, the first set of LED groups corresponds to the first LED group 410 and the second group 420 connected to each other in series, and the second set of LED groups corresponds to the third LED group 430 and the fourth LED group connected to each other in series. Furthermore, in this exemplary embodiment, the charge interval ranges from the third operation interval to a fourth operation interval, and the first compensation interval is an interval in which the voltage level of the rectified voltage Vrec is higher than or equal to the first forward voltage level Vf1 and less than the third forward voltage level Vf3), and the second compensation interval is an interval in which the voltage level of the rectified voltage Vrec is less than the first forward voltage level Vf1. Thus, during the charge interval, the third LED group 430 and the fourth LED group are sequentially driven according to the voltage level of the rectified voltage Vrec, and during the first compensation interval, the first LED group 410 and the second LED group 420 are sequentially driven according to the voltage level of the rectified voltage Vrec. Further, the loop-back compensation unit 300 may supply the second drive voltage to the third LED group 430 and the fourth LED group (that is, the second set of LED groups) during the first compensation interval, and may supply the second drive voltage to each of the first set of LED groups (the first LED group 410 and the second LED group 420 connected to each other in series) and the second set of LED groups (the third LED group 430 and the fourth LED group connected to each other in series) during the second compensation interval.

As described above, it should be noted that the loop-back compensation unit 300 according to the disclosure may be applied to various LED groups and is not limited to specific exemplary embodiments described herein.

Configuration and Function of Fifteenth Exemplary Embodiment of LED Lighting Device 1000

Figure 27:
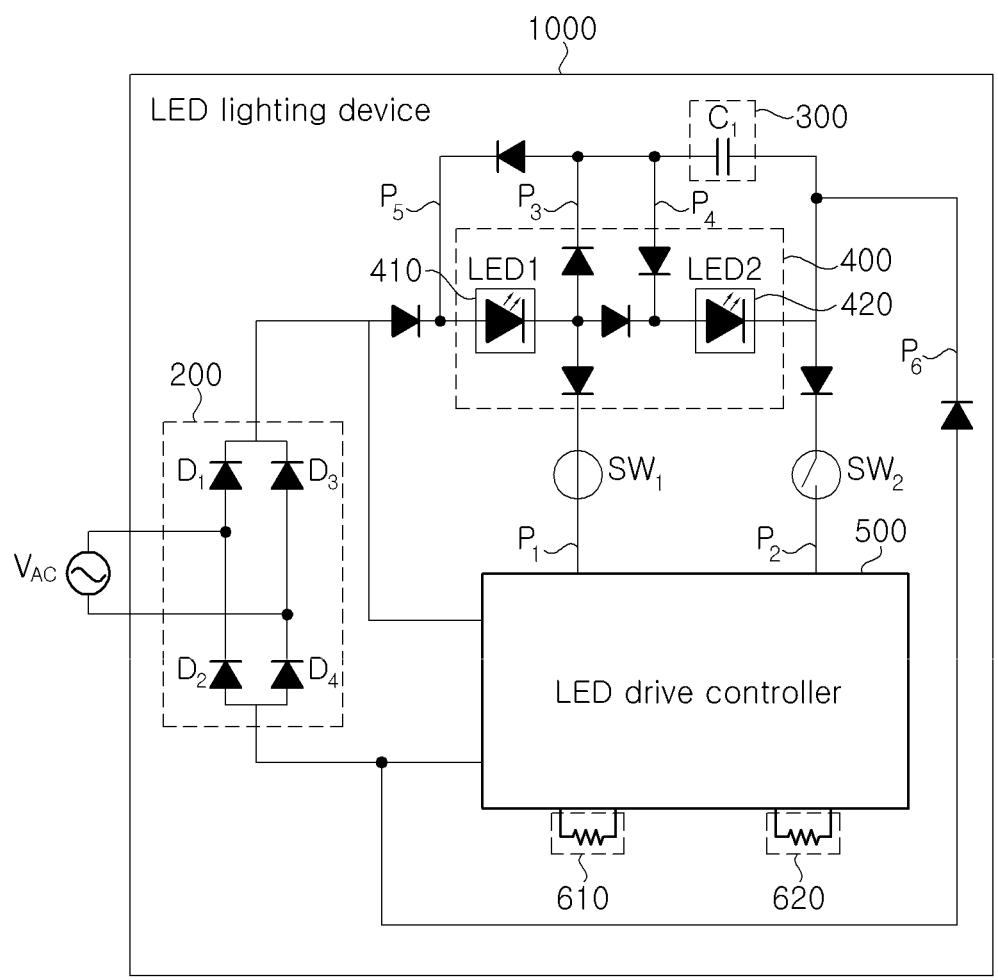
FIG. 27 is a schematic block diagram of an LED lighting device according to a fifteenth exemplary embodiment of the disclosure.

FIG. 27 is a schematic block diagram of an LED lighting device according to a fifteenth exemplary embodiment of the disclosure. Hereinafter, the configuration and functions of the LED lighting device 1000 according to the fifteenth exemplary embodiment will be described in brief with reference to FIG. 27.

Referring to FIG. 27, the LED lighting device 1000 according to the fifteenth exemplary embodiment may further include a first LED drive current setting unit 610 configured to set the first LED drive current $I_{LED1}$ to a desired current value and a second LED drive current setting unit 620 configured to set the second LED drive current $I_{LED2}$ to a desired current value. Except for these features, the LED lighting device 1000 shown in FIG. 27 is similar to the LED lighting device 1000 according to the thirteenth exemplary embodiment shown in FIG. 23. Thus, repeated components and functions of the LED lighting device 1000 according to the fifteenth exemplary embodiment will be described with reference to the description of the sixth exemplary embodiment shown in FIG. 23 to FIG. 25.

The conventional LED lighting device 1000 described with reference to FIG. 2 and FIG. 3 has a problem in that the first LED drive current $I_{LED1}$, the second LED drive current $I_{LED2}$, the third LED drive current $I_{LED3}$, and the fourth LED drive current $I_{LED4}$ cannot be independently set. Namely, since the conventional LED lighting device 1000 is configured to control the LED drive current $I_{LED}$ in a stepwise wave shape in each operation interval, one LED drive current value (for example, the fourth LED drive current $I_{LED4}$) is set and other LED drive current values are set in preset ratios with respect to the preset LED drive current value, respectively. For example, the third LED drive current $I_{LED3}$ is set to 80% to 95% of the fourth LED drive current $I_{LED4}$, the second LED drive current $I_{LED2}$ is set to 65% to 80% of the fourth LED drive current $I_{LED4}$, and the first LED drive current $I_{LED1}$ is set to 30% to 65% of the fourth LED drive current $I_{LED4}$. However, such a conventional LED lighting device 1000 has a problem in that the LED drive current $I_{LED}$ cannot be independently set, and particularly, in that it is more difficult to arbitrarily set the LED drive current for each of the operation intervals than adjustment of the LED drive current in a preset ratio as described above in order to improve flicker performance. Thus, the LED lighting device 1000 according to the fifteenth exemplary embodiment includes the first LED drive current setting unit 610 and the second LED drive current setting unit 620 in order to allow the LED drive current $I_{LED}$ to be independently set, as needed. Although the first LED drive current setting unit 610 and the second LED drive current setting unit 620 are shown as variable resistors in FIG. 27, it will be apparent to those skilled in the art that the drive current setting units can be realized by other suitable devices (for example, capacitors) or suitable circuits.

Configuration and Function of Sixteenth Exemplary Embodiment of LED Lighting Device 1000

Figure 28:
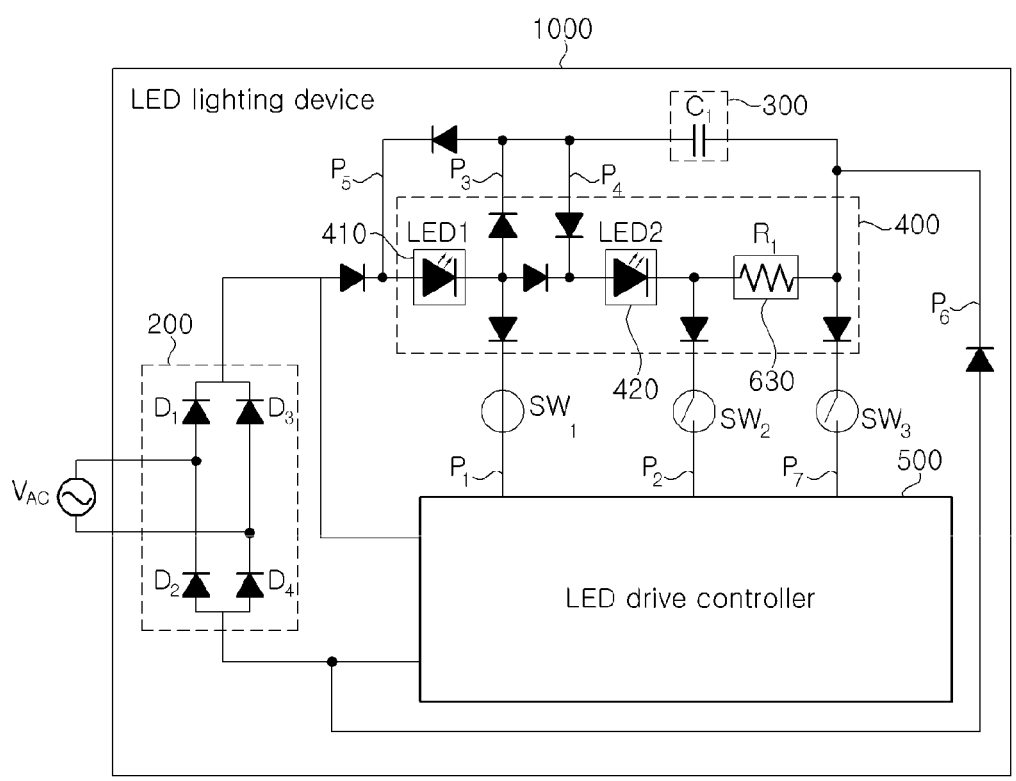
FIG. 28 is a schematic block diagram of an LED lighting device according to a sixteenth exemplary embodiment of the disclosure.

FIG. 28 is a schematic block diagram of an LED lighting device according to a sixteenth exemplary embodiment of the disclosure. Referring to FIG. 28, the configuration and functions of the LED lighting device 1000 according to the sixteenth exemplary embodiment will be described in detail.

The LED lighting device 1000 according to the sixteenth exemplary embodiment shown in FIG. 28 is similar to the LED lighting device 1000 according to the fourteenth exemplary embodiment described with reference to FIG. 26 except that the LED lighting device 1000 according to the sixteenth exemplary embodiment further includes a dummy load 630 instead of the third LED group 430.

In the LED lighting device according to the sixteenth exemplary embodiment shown in FIG. 28, the dummy load 630 is realized by a first resistor R1. In an interval in which the voltage level of the rectified voltage Vrec is higher than or equal to the second forward voltage level Vf2, the dummy load 630 allows electric current to flow therethrough in order to increase a charging amount in the loop-back compensation unit 300 by a voltage applied to the dummy load 630. Thus, since the charging amount in the loop-back compensation unit 300 increases, the dummy load 710 provides an advantage in that the forward voltage level of the first LED group 410, that is, the first forward voltage level Vf1, can be set to a large value. In other words, under the same conditions, the presence of the dummy load 630 can increase the number of LEDs included in the first LED group 410, which is kept in a turned-on state over all intervals of the rectified voltage Vrec, thereby improving flicker performance.

The invention claimed is:

1. A light emitting diode (LED) lighting device comprising:
   a rectification unit connected to an alternating current (AC) power source to output a rectified voltage as a first drive voltage to an LED light emitting unit through full-wave rectification of AC voltage applied thereto;
   the LED light emitting unit comprising a first LED group to an $n^{th}$ LED group (n being a positive integer of 2 or more) and configured to emit light upon receiving the rectified voltage as the first drive voltage from the rectification unit in a non-compensation interval and to emit light upon receiving a second drive voltage from a loop-back compensation unit in a compensation interval;
   the loop-back compensation unit connected at one end thereof to a cathode of one of the first LED group to the $(n-1)^{th}$ LED group through a charge path and to an anode of the one of the first LED group to the $(n-1)^{th}$ LED group through a discharge path, and connected at the other end thereof to an LED drive controller through a constant current switch among a pluarality of constant current switches, the loop-back compensation unit being chargeable with energy using the rectified voltage through the charge path in a charge interval and configured to supply the second drive voltage to the LED light emitting unit through the discharge path in the compensation interval; and
   the LED drive controller configured to detect an LED drive current flowing through the plurality of constant current switches connected to the first LED group to the $n^{th}$ LED group, respectively, and controlling sequential driving of the first LED group to the $n^{th}$ LED group based on the detected LED drive current.

2. The LED lighting device according to claim 1, wherein the loop-back compensation unit is connected to an anode of the first LED group to supply the second drive voltage to the first LED group in the compensation interval.

3. The LED lighting device according to claim 1, wherein the LED drive controller sets the LED drive current (a first LED drive current to an $n^{th}$ LED drive current) in each operation interval based on a total number of LEDs emitting light in each operation interval, and controls the LED drive current to become a constant drive current in a corresponding operation interval according to the set LED drive current in each operation interval such that the first LED drive current to the $n^{th}$ LED drive current are sequentially decreased.

4. The LED lighting device according to claim 1, wherein the LED drive controller sets the LED drive current (a first LED drive current to an $n^{th}$ LED drive current) in each operation interval to be inversely proportional to a total number of LEDs emitting light in each operation interval, and controls the LED drive current to become a constant drive current in a corresponding operation interval according to the set LED drive current in each operation interval.

5. The LED lighting device according to claim 1, wherein the LED light emitting unit comprises a first LED group and a second LED group, and a difference between light output of the first LED group during a first operation interval and light output of the first LED group and the second LED group during a second operation interval is less than or equal to a preset light output deviation.

6. The LED lighting device according to claim 1, wherein the LED light emitting unit comprises a first LED group and a second LED group, and the second drive voltage is higher than or equal to a forward voltage level of the first LED group.

7. The LED lighting device according to claim 1, wherein the LED light emitting unit comprises a first LED group and a second LED group, and a peak value of the rectified voltage is two or more times a forward voltage level of the first LED group.

8. The LED lighting device according to claim 1, wherein the LED drive controller further comprises a first LED drive current setting unit to an $n^{th}$ LED drive current setting unit configured to set corresponding LED drive current values among a first LED drive current to an $n^{th}$ LED drive current, respectively.

9. The LED lighting device according to claim 8, wherein each of the first to $n^{th}$ LED drive current setting units is composed of a variable resistor.

10. The LED lighting device according to claim 1, wherein the LED drive controller comprises: a first constant current switch to an $n^{th}$ constant current switch connected to cathodes of the first LED group to the $n^{th}$ LED group, respectively, so as to connect or disconnect first to $n^{th}$ current paths according to an operation interval and configured to control the LED drive current to become a constant current in each operation interval.

11. The LED lighting device according to claim 10, wherein the LED drive controller further comprises: an $(n+1)^{th}$ constant current switch disposed between the loop-back compensation unit and the LED drive controller to connect or disconnect an $(n+1)^{th}$ current path between the loop-back compensation unit and the LED drive controller and configured to control an $(n+1)^{th}$ LED drive current to become a constant current in the charge interval.

12. The LED lighting device according to claim 11, wherein the LED drive controller determines whether the LED light emitting unit enters or leaves the charge interval based on detection of a charge current flowing through the $(n+1)^{th}$ constant current switch connected to the loop-back compensation unit, turns off the $n^{th}$ constant current switch upon entrance to the charge interval, and turns on the $n^{th}$ constant current switch upon leaving the charge interval.

13. The LED lighting device according to claim 12, wherein the LED drive controller turns on the $(n+1)^{th}$ constant current switch connected to the loop-back compensation unit while detecting the charge current flowing therethrough upon entrance from an $(n-1)^{th}$ operation interval to an $n^{th}$ operation interval as the rectified voltage increases, turns off the $n^{th}$ LED group to enter the charge interval by turning off the $n^{th}$ constant current switch when the detected charge current increases to a preset value or more, and turns on the $n^{th}$ LED group to enter the $n^{th}$ operation interval again by turning on the $n^{th}$ constant current switch when the detected charge current decreases to a preset value or less after entering the charge interval.

14. The LED lighting device according to claim 13, wherein the $(n+1)^{th}$ LED drive current is set to be the same as an $(n-1)^{th}$ drive current.

15. The LED lighting device according to claim 11, wherein the LED light emitting unit comprises a first LED group and a second LED group, and a forward voltage level of the first LED group is higher than that of the second LED group.

16. The LED lighting device according to claim 11, further comprising:
an $(n+2)^{th}$ switch disposed between a node between the $(n-1)^{th}$ LED group and the $n^{th}$ LED group and the loop-back compensation unit to be turned on or off under control of the LED drive controller,
wherein the LED drive controller turns on the $(n+2)^{th}$ switch upon entrance to an $n^{th}$ operation interval and turns off the $(n+2)^{th}$ switch upon entrance to the compensation interval.

17. The LED lighting device according to claim 11, further comprising:
a second compensation unit connected to the $n^{th}$ LED group in parallel and configured to be charged during an $n^{th}$ operation interval and to supply a drive voltage to the $n^{th}$ LED group during a non-luminous interval of the $n^{th}$ LED group.

18. The LED lighting device according to claim 10, wherein the loop-back compensation unit is connected to the $n^{th}$ LED group in parallel and the other end of the loop-back compensation unit is connected together with a cathode of the $n^{th}$ LED group to the LED drive controller through the $n^{th}$ constant current switch.

* * * * *